United States Patent [19]
Girard

[11] Patent Number: 5,832,763
[45] Date of Patent: *Nov. 10, 1998

[54] GRAM LOAD ADJUSTING METHOD FOR MAGNETIC HEAD SUSPENSIONS

[75] Inventor: Mark T. Girard, Hutchinson, Minn.

[73] Assignee: Hutchinson Technology Incorporated, Hutchinson, Minn.

[ * ] Notice: The term of this patent shall not extend beyond the expiration date of Pat. No. 5,687,597.

[21] Appl. No.: 878,350

[22] Filed: Jun. 18, 1997

Related U.S. Application Data

[63] Continuation of Ser. No. 656,639, May 31, 1996, Pat. No. 5,687,597.

[51] Int. Cl.$^6$ .................................................. B21D 11/10
[52] U.S. Cl. ...................... 72/16.3; 72/342.11; 29/603.12
[58] Field of Search ................................. 72/16.2, 16.3, 72/21.4, 31.01, 31.1, 342.1; 29/603.1, 603.12; 148/510

[56] References Cited

U.S. PATENT DOCUMENTS

| | | | |
|---|---|---|---|
| 3,311,733 | 3/1967 | Bitzer, Jr. | 148/510 |
| 4,186,039 | 1/1980 | Bache et al. | 148/510 |
| 4,603,567 | 8/1986 | Smith et al. | 72/8 |
| 5,297,413 | 3/1994 | Schones et al. | 72/342.1 |
| 5,341,303 | 8/1994 | Foroudastan et al. | 72/702 |
| 5,471,734 | 12/1995 | Hatch et al. | 29/603 |
| 5,588,200 | 12/1996 | Schudel | 29/603.01 |

OTHER PUBLICATIONS

Harrison et al., The Double Dimple Magnetic Recording Head Suspension and Its Effect on Fly Height Variability, Journal of Tribology, 94–Trib–39, pp. 1–5.

Hotaling, Measuring Flying Height in an Era of Near–Contact Recording, Data Storage, Mar. 1996, pp. 41–46.

*Primary Examiner*—Lowell A. Larson
*Attorney, Agent, or Firm*—Faegre & Benson LLP

[57] ABSTRACT

A system for adjusting the gram load of a suspension with a high degree of accuracy and repeatability includes a clamp, load-engaging member, actuator, laser and control system. The mounting region of a suspension to be adjusted is releasably received and clamped by the clamp. A load beam of the suspension is engaged and supported at adjust positions with respect to the clamp by the load beam-engaging member. The load beam-engaging member is driven and positioned by the actuator. IR light from the laser is directed to the spring region of the suspension by optical fibers. The control system includes a pre-adjust input terminal, memory and a controller. Information representative of a measured pre-adjust fly height gram load value of the suspension is received at the pre-adjust input terminal. Gram load adjust data representative of load beam adjust positions which will cause the suspension to have a desired post-adjust fly height gram load value after the load beam is stressed relieved is stored in the memory. The controller is coupled to the pre-adjust input terminal, actuator, laser and memory, and controls the system by: 1) accessing the memory as a function of the measured pre-adjust fly height gram load value to determine the load beam adjust position which will cause the suspension to have the desired fly height gram load value after the load beam is stressed relieved, 2) actuating the actuator and causing the load beam-engaging member to position the load beam at the adjust position, 3) actuating the laser to stress relieve the spring region of the load beam while the load beam is positioned at the adjust position, and 4) actuating the actuator and causing the load beam-engaging member to release the load beam after the load beam is stress relieved.

22 Claims, 41 Drawing Sheets

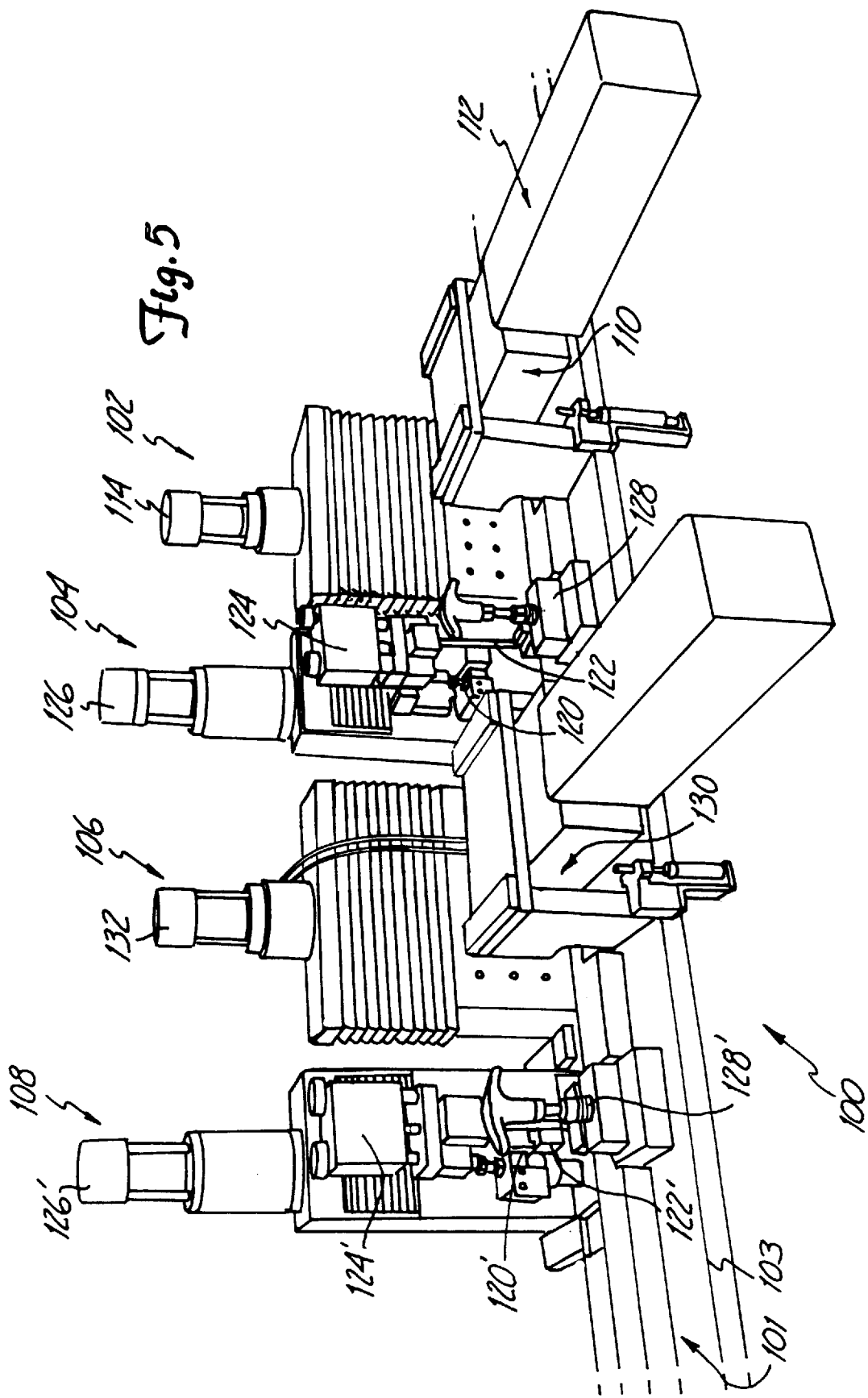

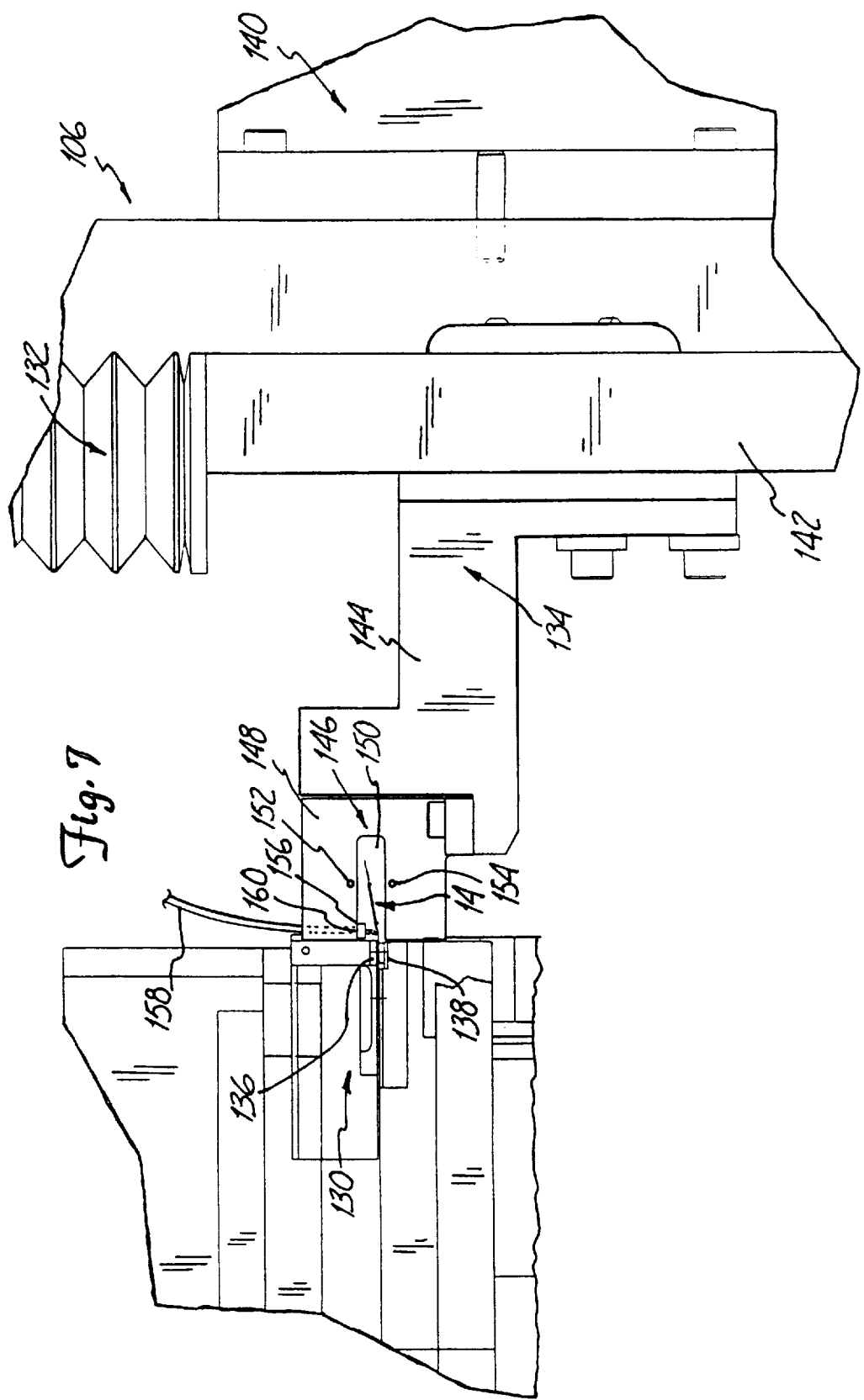

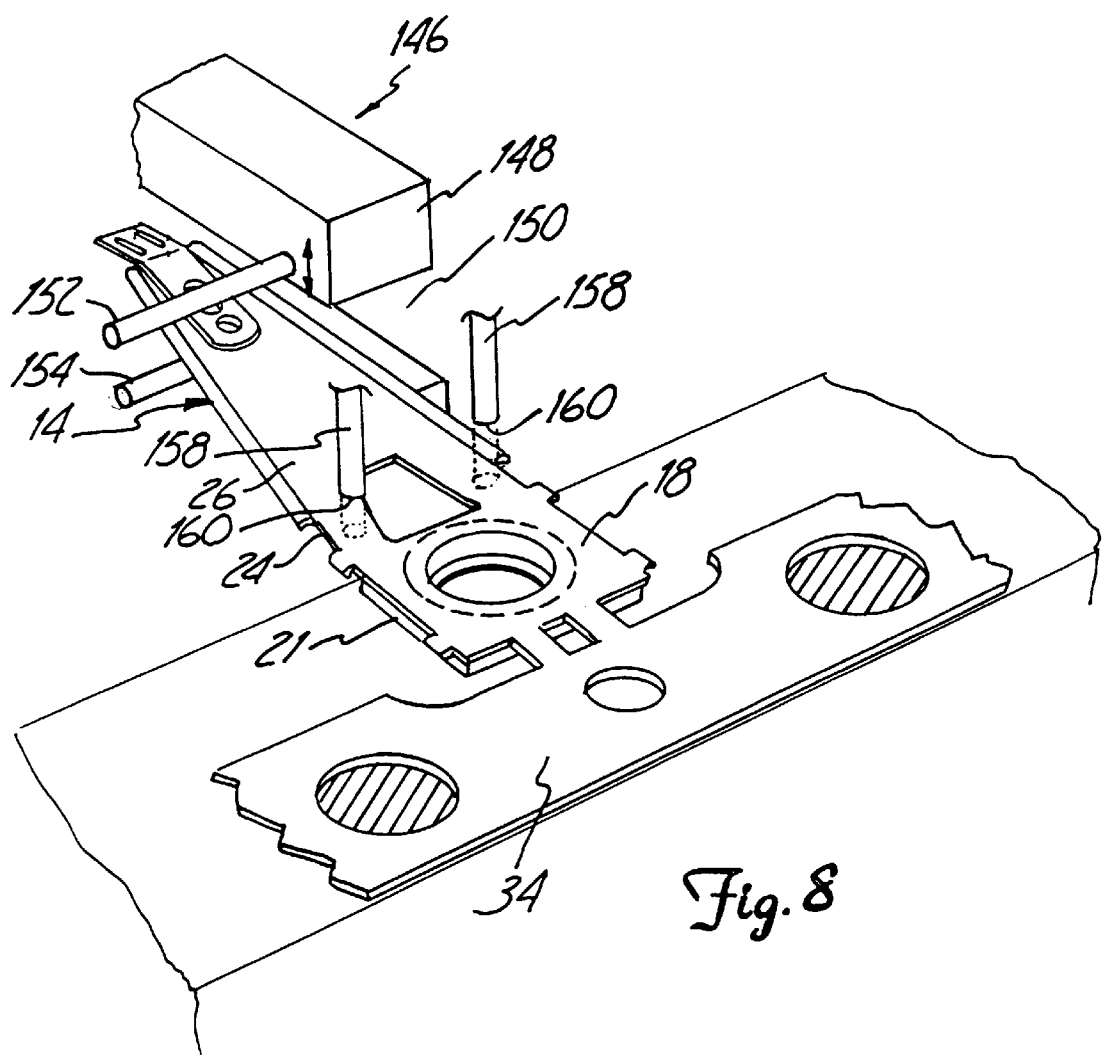

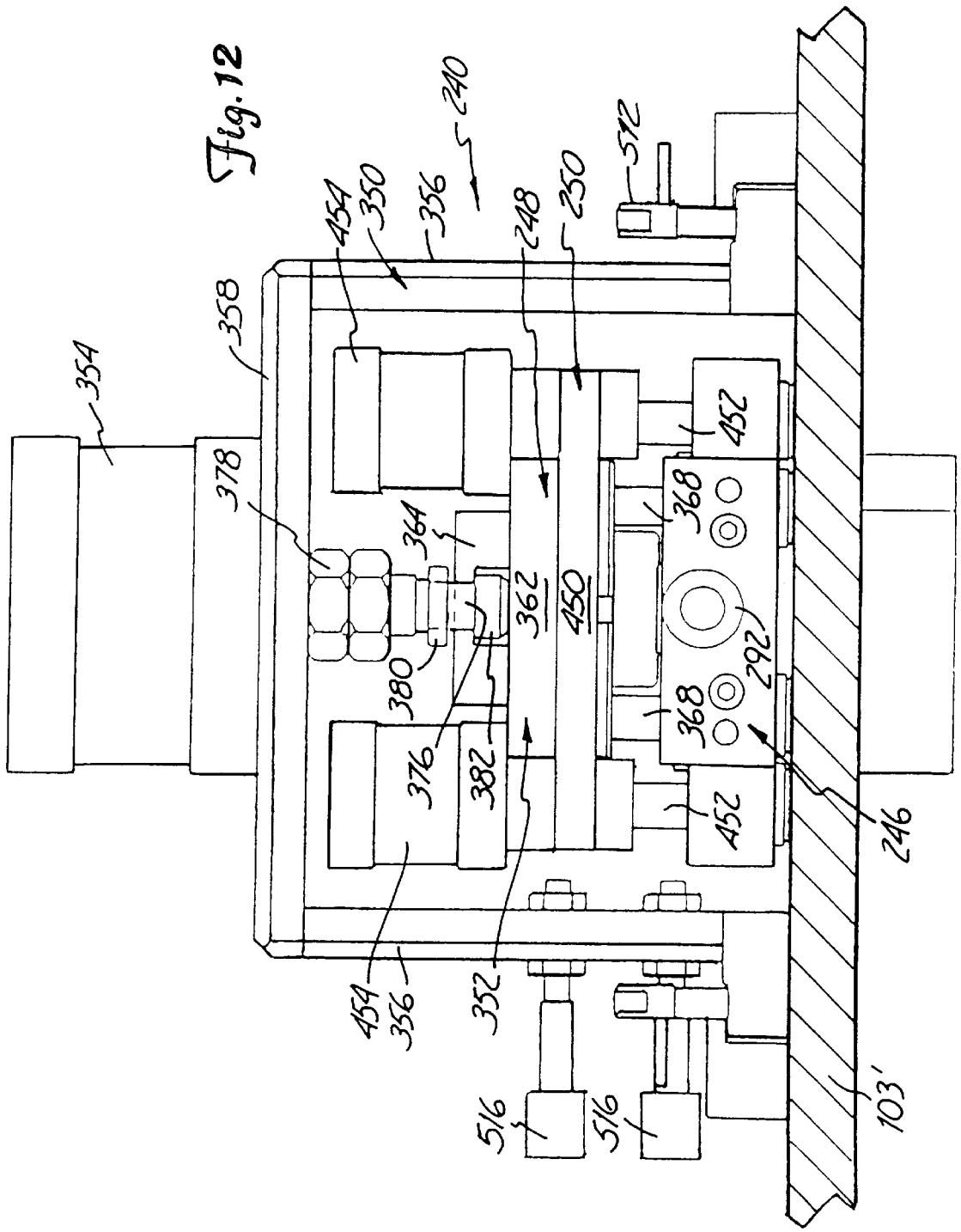

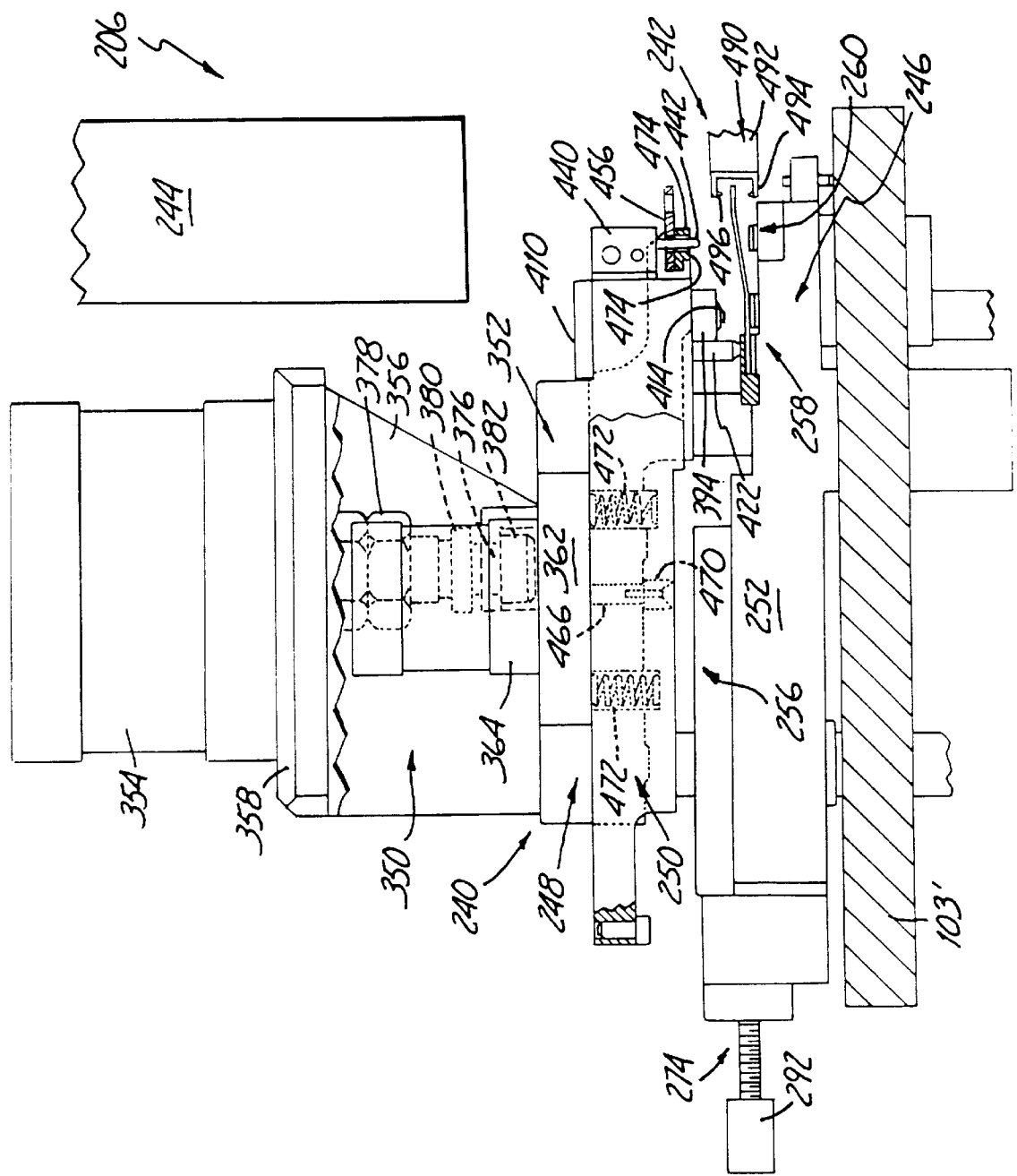

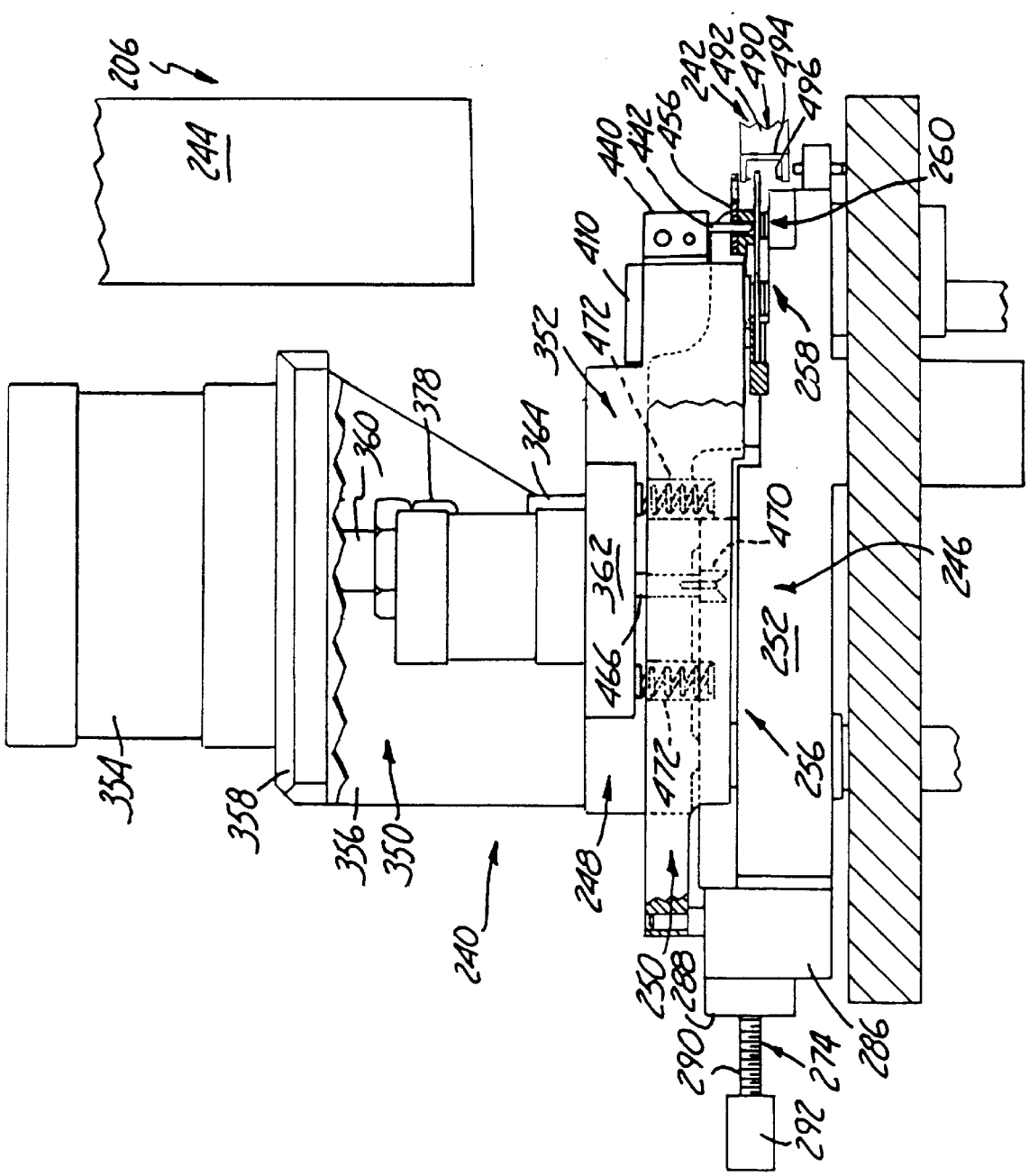

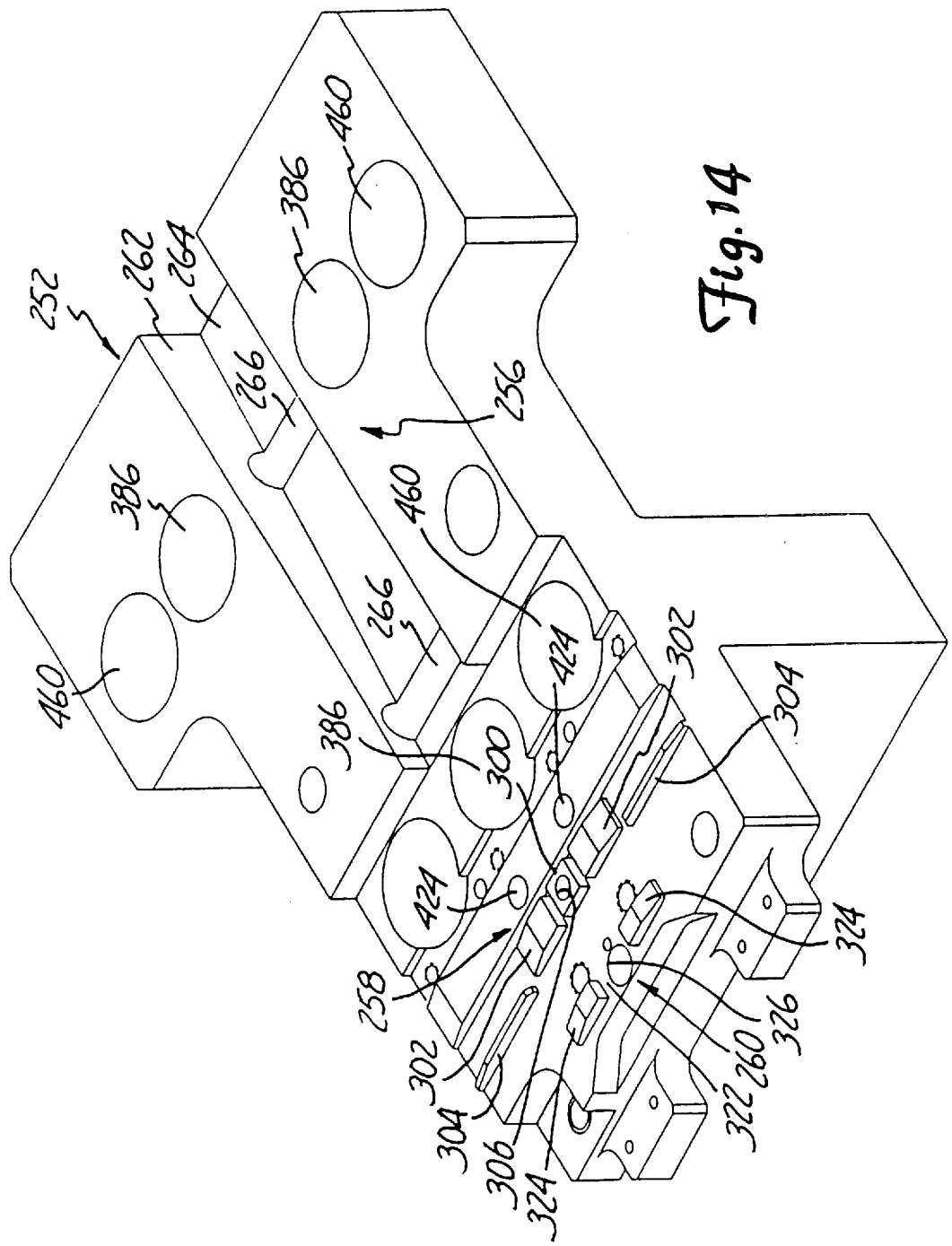

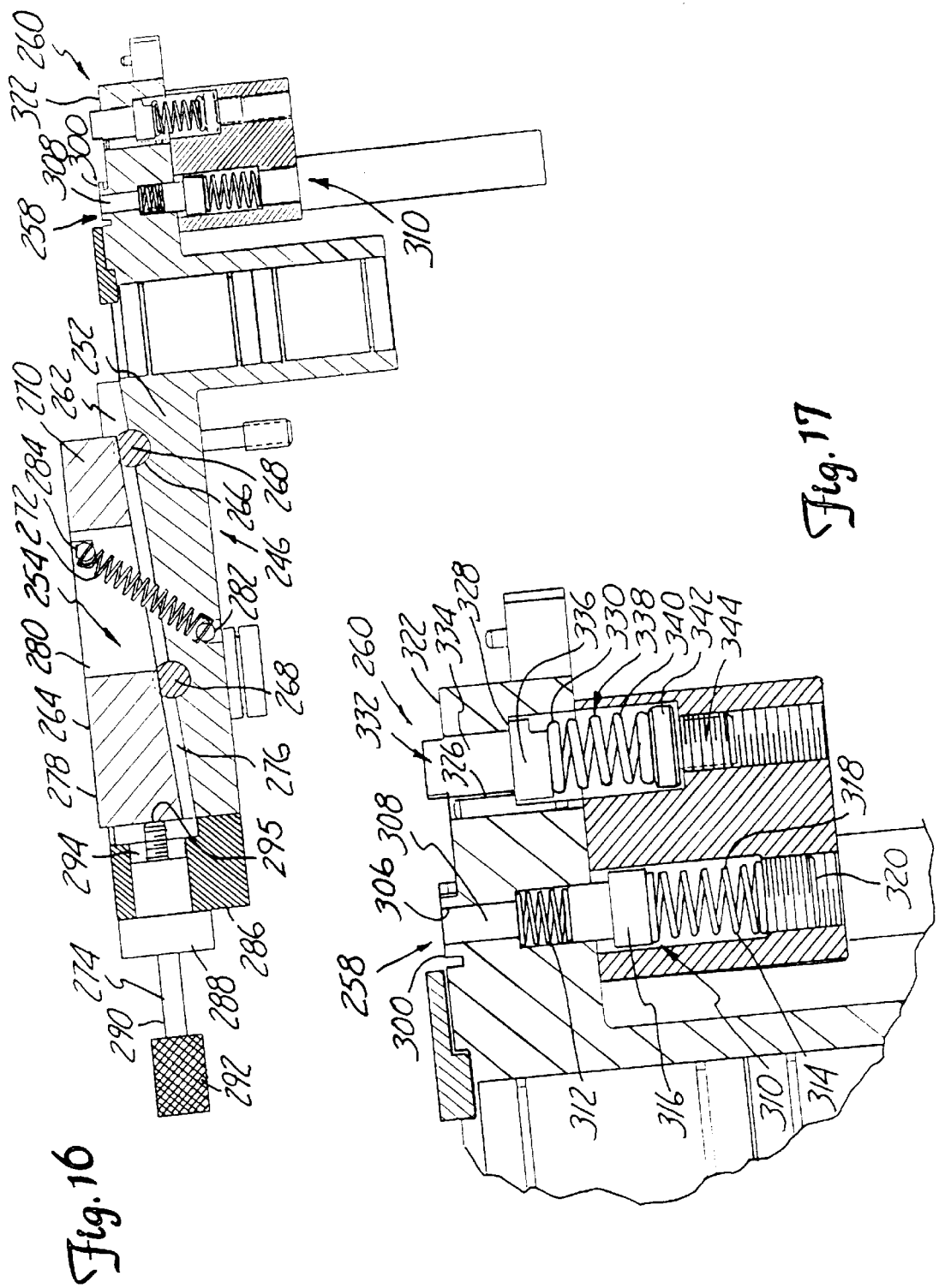

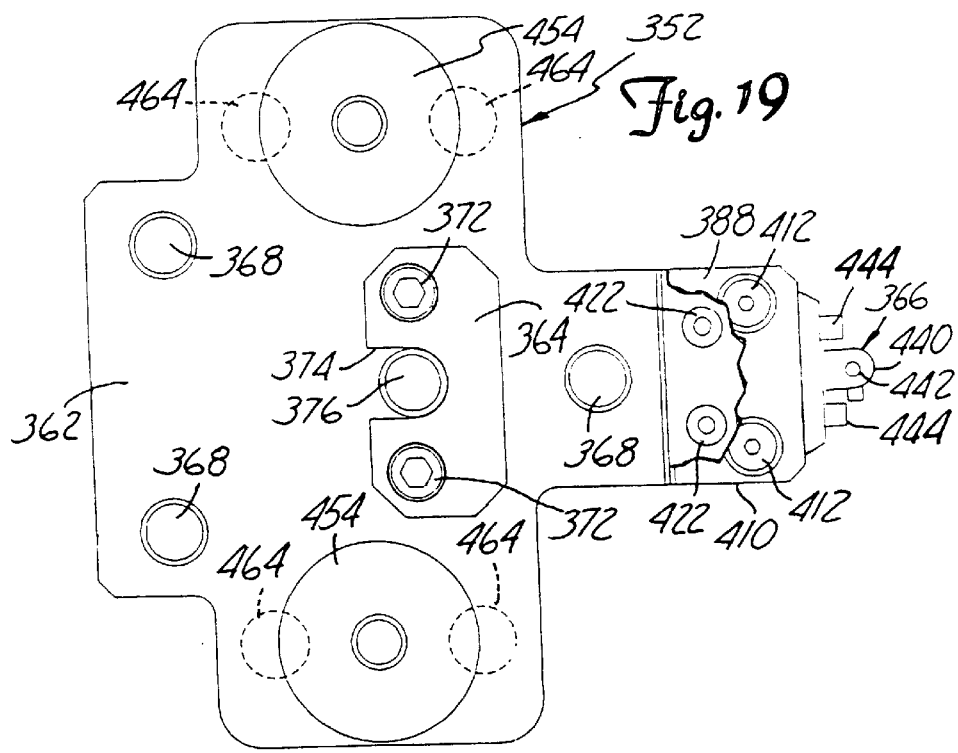
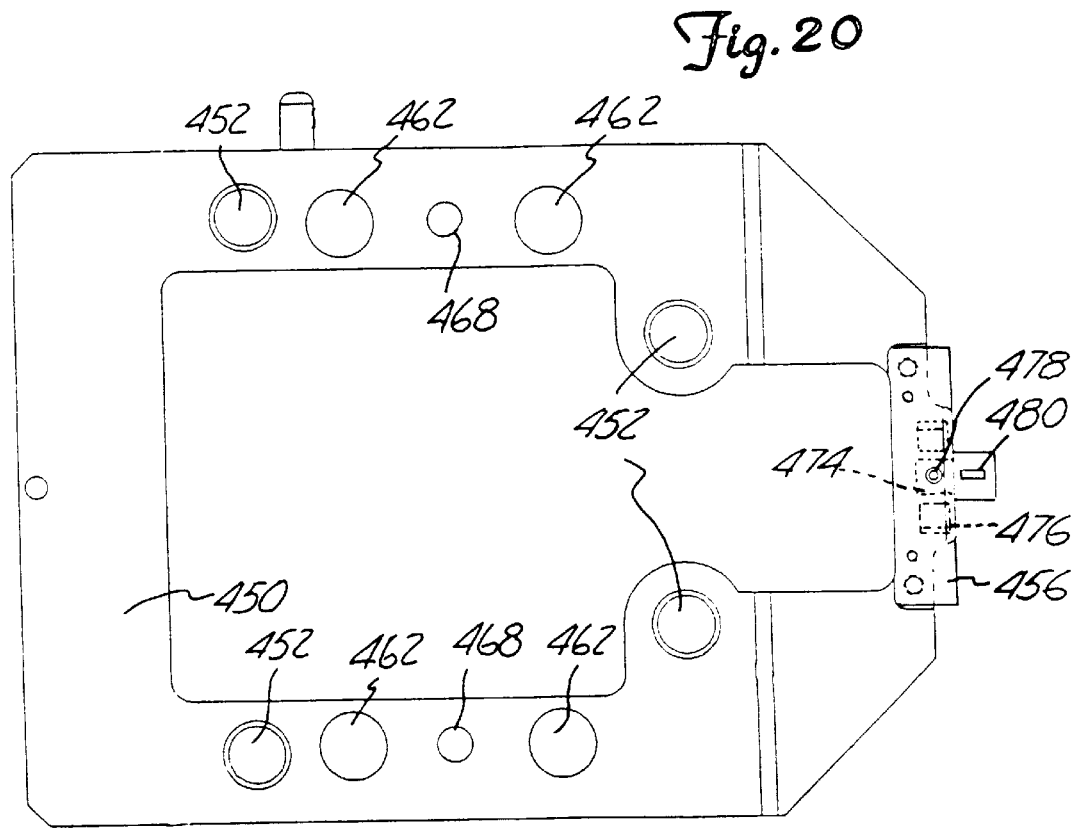

Dpitch = Desired Pitch - Measured Pre-Adjust Pitch    Eq. 1
Dgram = Desired Load - Measured Pre-Adjust Load    Eq. 2
Dheight = Desired Height - Measured Pre-Adjust Height    Eq. 3
Droll = Desired Roll - Measured Pre-Adjust Roll    Eq. 4
Load = Average Position of Pins 616A and 616B    Eq. 5
Bias = Position of Pin 616A - Position of Pin 616B    Eq. 6
Pivot = Position of Pin 616C    Eq. 7
Bump = Position of Pins 496    Eq. 8
Pivot = u + v    Eq. 9

$$\text{Bias} = \frac{\text{Droll} - M}{N} \quad \text{Eq. 10}$$

$$\text{Load} = \frac{\text{Dheight} - A - B \cdot \text{Pivot}^3 - D \cdot \text{Bias}}{C} \quad \text{Eq. 11}$$

$$\text{Bump} = -\left[\left(\frac{\text{Dpitch} - I - J \cdot \text{Pivot}^3 - L \cdot \text{Load}}{K}\right)^2\right] \left[2^{\frac{1}{\text{Power}}}\right] \quad \text{Eq. 12}$$

$$\text{Constant} = E + F \cdot \left[\frac{\text{Dheight} - A - D \cdot \left(\frac{\text{Droll} - M}{N}\right)}{C}\right] + H$$

$$\left[\frac{\text{Dpitch} - I - L \cdot \left(\frac{\text{Dheight} - A - D \cdot \left[\frac{\text{Droll} - M}{N}\right]}{C}\right)}{K}\right] - \text{Dgram} \quad \text{Eq. 13}$$

$$\alpha = -\left[F \cdot \frac{B}{C} + H \cdot \frac{J}{K} - H \cdot L \cdot \frac{B}{C \cdot K}\right] \quad \text{Eq. 14}$$

$$p = \frac{G}{\alpha} \quad \text{Eq. 15}$$

$$q = \frac{\text{Constant}}{\alpha} \quad \text{Eq. 16}$$

$$\text{Det} = \left[\frac{p}{3}\right]^3 + \left[\frac{q}{2}\right]^2 \quad \text{Eq. 17}$$

$$u = \left[\frac{-1}{2} \cdot q + \text{Det}^{(1/2)}\right]^{(1/3)} \quad \text{Eq. 18}$$

$$v = -\left[\left(\frac{-1}{2} \cdot q - \text{Det}^{(1/2)}\right)^2\right]^{(1/6)} \quad \text{Eq. 19}$$

*Fig. 38*

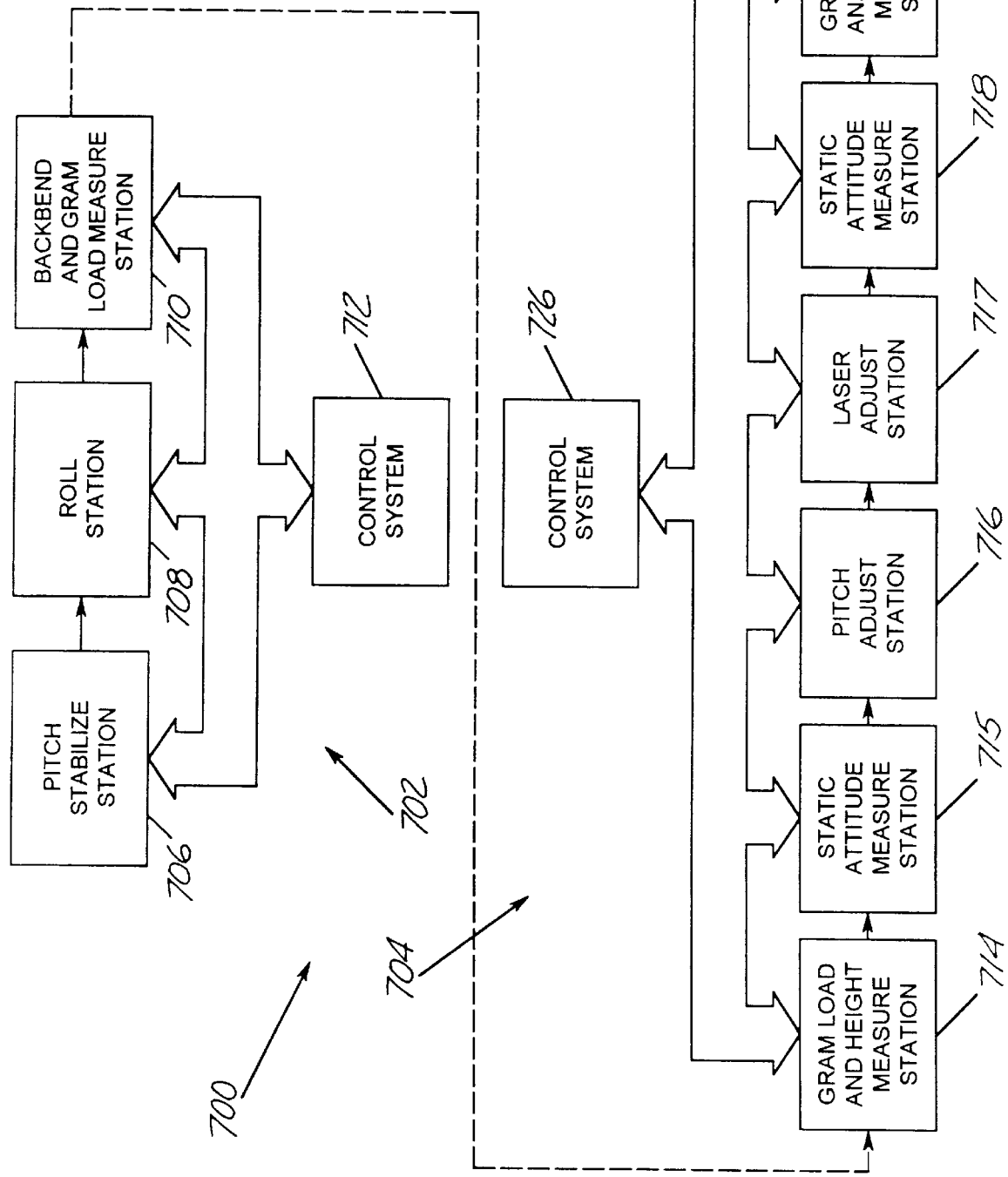

GRAM LOAD ADJUSTING METHOD FOR MAGNETIC HEAD SUSPENSIONS

REFERENCE TO RELATED APPLICATIONS

This is a continuation of U.S. patent application Ser. No. 08/656,639, filed May 31, 1996, and entitled "GRAM LOAD ADJUSTING SYSTEM FOR MAGNETIC HEAD SUSPENSIONS", now U.S. Pat. No. 5,687,597 granted Nov. 18, 1997.

Reference is hereby made to the following commonly assigned and copending applications filed on even date herewith.

1. U.S. application Ser. No. 08/655,899 entitled GRAM LOAD, STATIC ATTITUDE AND RADIUS GEOMETRY ADJUSTING SYSTEM FOR MAGNETIC HEAD SUSPENSIONS, now U.S. Pat. No. 5,682,780 granted Nov. 4, 1997.
2. U.S. application Ser. No. 08/657,778 entitled GRAM LOAD, STATIC ATTITUDE AND RADIUS GEOMETRY ESTABLISHING SYSTEM FOR FLAT MAGNETIC HEAD SUSPENSIONS.

Reference is also hereby made to the commonly assigned U.S. application Ser. No. 08/878,497, filed on Jun. 18, 1997, and entitled "METHOD FOR ADJUSTING GRAM LOAD, STATIC ATTITUDE AND RADIUS GEOMETRY FOR MAGNETIC HEAD SUSPENSIONS.

BACKGROUND OF THE INVENTION

1. Field of the Invention

The present invention is a machine for adjusting the characteristics of suspensions used in rigid magnetic disk drive head gimbal assemblies. In particular, the present invention is a machine for adjusting the gram load of rolled suspensions and head gimbal assemblies.

2. Description of the Related Art

Head gimbal assemblies (HGAs), also sometimes known as head suspension assemblies (HSAs), are commonly used in rigid magnetic disk drives to support magnetic heads in close proximity to the rotating disk surfaces. One such gimbal assembly 10 is illustrated in FIG. 1. As shown, gimbal assembly 10 includes an air bearing head slider assembly 12 mounted to a suspension 14. The suspension 14 includes a load beam 16 having a mounting region 18 on its proximal end and a gimbal or flexure 20 on its distal end. When incorporated into a disk drive (not shown), the mounting region 18 is configured to be mounted to an actuator or positioning arm which supports the gimbal assembly 10 over the rotating disk. A baseplate 21 which includes a mounting boss 23 is typically welded to the mounting region 18 to increase the rigidity of the mounting region and to provide a mechanism for securely mounting the gimbal assembly to the positioning arm. The load beam 16 is an elongated and often generally triangularly-shaped member which includes a spring region 24 adjacent to the mounting region 18, and a rigid region 26 which extends from the spring region. The spring region 24 of the embodiment shown in FIG. 1 includes a central aperture which forms the spring region into two legs. In this embodiment the flexure 20 is manufactured as a separate member, and welded to the distal end of the rigid region 26. The air bearing head slider assembly 12 contains a magnetic head (not visible in FIG. 1) and is typically bonded to the flexure 20 by adhesive.

During the manufacture of suspensions 14, elongated carrier strips having a plurality of flat and unformed load beam blanks extending therefrom are chemically etched from thin sheets of stainless steel or other spring material. Carrier strips with flat and unformed flexure blanks are etched in a similar manner from sheets of stainless steel. During subsequent manufacturing operations any side rails 30, wire lead captures 32, load point dimples (not visible) and any other structures which extend upwardly or downwardly from the generally planar surface of the load beam 16 (i.e., in what is known as the z-height direction), along a z-axis are formed on the load beam blanks by mechanical bending procedures. Any structures on the flexure blanks requiring z-height deformation (e.g., load point dimples, not shown) are formed in a similar manner. After forming, the flexures 20 are welded to the distal ends of the load beams 16. The carrier strip is then cut or detabbed from the flexures 20. Baseplates 21 also are welded to the mounting regions 18 of the load beams 16 following the forming operations.

The suspension 14 illustrated and described above is known as a three-piece design in that it includes a load beam 16, flexure 20 and baseplate 21, all of which are separately fabricated and formed before being welded together. In another suspension design known as a two-piece design or integrated gimbal suspension (not shown), the flexure is etched in the distal end of the rigid region of the load beam. Portions of the integrated gimbal which extend from the planar surface of the load beam in the z-height direction are formed along with other structures on the load beam during the forming operation. A baseplate is typically welded to the mounting region after these load beam and integrated gimbal etching and forming operations.

As shown in FIG. 2, the products of these etching, forming and welding operations are carrier strips 34 with generally flat suspensions 14 extending therefrom (i.e., the mounting region 18, spring region 24 and rigid region 26 of load beam 16 are generally coplanar and at the same z-height). During subsequent manufacturing operations the spring region 24 of each load beam 16 is rolled around a curved mandrel or otherwise bent in such a manner as to plastically bend or deform the spring region. As illustrated in FIGS. 3 and 4, this rolling operation imparts a curved shape to the spring region 24 and causes the flexure 20 to be offset from the mounting region 18 in the z-height direction when the suspension 14 is in its unloaded or free state. Equipment and methods for performing these rolling operations are generally known and disclosed, for example, in the Smith et al. U.S. Pat. No. 4,603,567 and the Hatch et al. U.S. Pat. No. 5,471,734.

As noted above, the suspension 14 supports the slider assembly 12 over the magnetic disk. In reaction to the air pressure at the surface of the spinning disk, the slider assembly 12 develops a aerodynamic force which causes the slider assembly to lift away from and "fly" over the disk surface. To counteract this hydrodynamic lifting force, the head gimbal assembly 10 is mounted in the disk drive with the suspension 14 in a loaded state so the bent spring region 24 of the suspension forces the head slider assembly 12 toward the magnetic disk. The height at which the slider assembly 12 flies over the disk surface is known as the "fly height." The force exerted by the suspension 14 on slider assembly 12 is known as the "gram load." High performance disk drive operation requires the air bearing head slider assembly 12 to closely follow the rotating magnetic disk surface at a constant height and attitude. To meet this critical requirement, the gram load of suspensions 14 must be adjusted to a relatively tight specification range (defined in terms of upper and lower range specification gram loads above and below, respectively, the desired or nominal gram load).

Techniques for adjusting the gram load of suspensions 14 after they have been rolled are generally known and disclosed, for example, in the Smith et al. U.S. Pat. No. 4,603,567 and the Schones et al. U.S. Pat. No. 5,297,413. Briefly, one such method is known as a "thermal adjust" or "light adjust" technique. A known property of stainless steel members such as load beams is that the force they exert in response to attempts to bend them can be reduced (stress relieved) through exposure to thermal energy. The functional relationship between the amount of force reduction and the amount of heat to which a member is exposed can be empirically determined. The light adjust method makes use of this empirically determined relationship to "downgram" or lower the gram load of load beams that have been purposely manufactured (e.g., through rolling operations of the type described above) to have an initial gram load greater than the desired gram load range.

Equipment for performing the light adjust method includes a clamp for clamping the mounting region 18 of the suspension 14 to a fixed base or datum, and a load cell for measuring the gram load of the suspension. A computer controlled actuator moves the load cell into engagement with the flexure 20 and elevates the flexure to a z-height or offset with respect to the datum which corresponds to the specified fly height for the suspension (i.e., the gram load is measured at fly height). In practice, the measured gram load quickly rises toward its then-current value as the flexure 20 is elevated. When the measured gram load reaches an upper range specification, the computer actuates or turns on a high intensity infrared lamp to apply heat to the load beam 16. Since the applied heat reduces the actual gram load of the suspension 14, the measured gram load quickly peaks. Continued application of heat causes the measured gram load to decrease with time. The computer deactuates or turns off the lamp when the measured gram load has decreased to a predetermined set point, typically a load between the nominal or desired gram load and the lower range specification. Once the lamp has been turned off, the measured decrease in gram load quickly slows and reaches its minimum value (often at a gram load below the lower range specification) as the heat in the suspension 14 dissipates. However, as the load beam continues to cool, the measured gram load increases and stabilizes at an equilibrium or final load value that is preferably well within the specification range, and ideally close to the nominal specification. The final gram load is also measured following the light adjust procedure. This measurement is used by the computer to continually update the stored model (e.g., the setpoint) of the functional relationship between the amount of heat applied (e.g., lamp on time) and the gram load reduction, to optimize the accuracy of the results obtained by the gram adjust procedure.

Computer controlled mechanical bending procedures are also used to adjust the gram load on load beams 16. The mechanical bending method makes use of an empirically determined relationship between the amount that the load beam 16 is mechanically bent and the associated change in gram load. For a range of gram load adjustments that are typically performed by this technique, a simple linear regression line has been found to accurately describe this relationship. In practice, this technique is implemented by a computer coupled to a stepper motor-driven bending mechanism and a load cell. A model of the relationship between changes in gram load and the number of motor steps (i.e., the associated amount or extent of bending required) is stored in the computer. After the then-current gram load of the suspension is measured by the load cell, the computer calculates the required load correction (i.e., the difference between the measured and desired loads). The computer then accesses the model as a function of the required correction to determine the number of motor steps required to achieve the required load correction, and actuates the stepper motor accordingly. Once the load beam has been bent, the then-current gram load is again measured and used to update the model. Measured data from a given number of the most recently executed mechanical bends is used to recompute the regression line data prior to the execution of the next mechanical bend.

The air bearing head slider assemblies 12 are mounted to the flexure 20, and the lead wires clamped to the load beam 16, after the gram load of the suspension has been initially set using methods such as those described above. Unfortunately, the mechanical handling and assembly procedures involved in this manufacturing operation sometimes forces the gram loads of the assembled head suspension assemblies 10 beyond the specification range. Since the gram load specification is so critical to proper disk drive operation, these out-of-specification head suspension assemblies cannot be used unless the gram load is readjusted to the specification range. A machine which uses both the light-adjust and mechanical bending procedures described above to "regram" suspensions is shown in the Schones et al. U.S. Pat. No. 5,297,413.

Another critical performance-related criteria of a suspension is specified in terms of its resonance characteristics. In order for the head slider assembly 12 to be accurately positioned with respect to a desired track on the magnetic disk, the suspension 14 must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension 14 causes the position of the head slider assembly 12 to deviate from its intended position with respect to the desired track. Since the head suspension assemblies 10 must be driven at high rates of speed in high performance disk drives, the resonant frequencies of a suspension should be as high as possible.

As discussed in the Hatch et al. U.S. Pat. No. 5,471,734, the position, shape and size of the roll or bend in the spring region 24 of a suspension 14, sometimes generally referred to as the radius geometry or profile of the suspension, can greatly affect its resonance characteristics. The radius geometry of a suspension must therefore be accurately controlled during manufacture to optimize the resonance characteristics of the part. The radius geometry of a suspension is characterized by parameters referred to as offset and bump in the Hatch et al. Patent. However, it is known to define the radius geometry of a suspension using different parameters. By way of example, Hutchinson Technology Incorporated, the assignee of the present application, has often characterized the radius geometry of suspensions such as 14 using a number of parameters including those referred to as "height" and "depth" or "rippel." As shown in FIG. 4, the height parameter is the z-height distance between the surfaces of the load beam 16 at the mounting region 18 and a point on the rigid region 26. The location on the rigid region 26 at which the height is measured is referenced to the proximal end of the load beam 16 by a distance parameter referred to as the "height location." The depth is the z-height distance between the surfaces of the load beam 16 at the mounting region 18 and a point on the spring region 24. The location on the spring region 24 at which the depth is measured is referenced to the proximal end of the load beam 16 by a distance parameter referred to as the "low point location." Typically, the low point location is the position at which the depth is at its maximum for the suspension 14.

Yet another important performance-related criteria of a suspension 14 is known as its static attitude. The attitude of a head slider assembly 12 refers to the positional orientation of slider assembly with respect to the surface of the disk over which it is flying. The head slider assembly 12 is designed to fly at a predetermined orientation (typically generally parallel) with the surface of the disk. Deviations from this parallel relationship which result in the front and back edges of the slider being at a different heights from the disk (i.e., a rotation about a y-axis transverse to the longitudinal x-axis of the suspension) are known as pitch errors. Deviations from the parallel relationship which result in the opposite sides of the slider being at different heights from the disk (i.e., a rotation about the longitudinal x-axis of the suspension) are known as roll errors. Any pitch or roll errors in the desired flying attitude of the slider can degrade the performance of the disk drive.

One source of these pitch and roll errors is static attitude errors of the suspension. Static attitude errors and the use of static attitude compensation dimples or protuberances to minimize these errors are disclosed in the Harrison et al. article *The Double Dimple Magnetic Recording Head Suspension and its Effect on Fly Height Variability.*

There remains a continuing need for improved head suspension adjusting equipment and methods. In particular, there is a need for equipment and methods for adjusting suspension parameters such as gram load, height or other profile characteristics, roll and/or pitch. Equipment and methods for adjusting several of these parameters would be especially desirable. To be commercially viable, any such equipment and methods must capable of achieving a high degree of accuracy and repeatability.

SUMMARY OF THE INVENTION

The present invention is a method for adjusting a suspension parameter, such as gram load, with a high degree of accuracy and repeatability. One embodiment of the method includes providing parameter adjust data representative of suspension adjust positions which will cause the suspension to have a desired post-adjust parameter value after the load beam is stress relieved. Information representative of a desired pre-adjust parameter value of the suspension is received. The parameter adjust data is accessed to determine the suspension adjust position which will cause the suspension to have the desired parameter value after the load beam is stress relived. The load beam is positioned at the adjust position. Heat is applied to stress relieve at least the spring region of the load beam while the load beam is positioned at the adjust position.

BRIEF DESCRIPTION OF THE DRAWINGS

FIG. 5 is an isometric view of a first embodiment of the suspension adjust equipment in accordance with the present invention.

FIG. 7 is a detailed side view of the suspension gram adjust station shown in FIG. 5.

FIG. 8 is a detailed schematic view of a suspension and portions of the suspension gram adjust station shown in FIG. 7, illustrating the suspension gram adjust procedure implemented by the suspension gram adjust station.

FIG. 12 is a view of the rear side of the suspension clamp assembly of the static attitude measure and pitch adjust station shown in FIG. 11.

FIGS. 13A–13C are side views of the static attitude measure and pitch adjust station with portions thereof broken away and shown in section, illustrating the clamp assembly in its transfer, functional clamping and load beam clamping positions, respectively.

FIG. 14 is an isometric view of the base of the suspension clamp assembly shown in FIG. 12.

FIG. 16 is a sectional side view of the base assembly shown in FIG. 15.

FIG. 17 is a detailed sectional side view of the functional clamping region and load beam clamping region of the base assembly shown in FIG. 16.

FIG. 19 is a top view of the clamp frame assembly of the functional clamp assembly shown in FIG. 18.

FIG. 20 is a top view of the adjustment frame of the load beam clamp assembly shown in FIG. 18.

FIG. 38 describes the mathematical equations of the algorithm used by the control system shown in FIG. 25 to control the pitch adjust procedures performed at the static attitude measure and pitch adjust station shown in FIGS. 13A–13C, and the laser adjust procedures performed at the laser adjust station shown in FIGS. 28–30.

FIG. 39 is a block diagram of suspension adjust equipment in accordance with a third embodiment of the present invention.

DETAILED DESCRIPTION OF THE PREFERRED EMBODIMENTS

Figure 1:
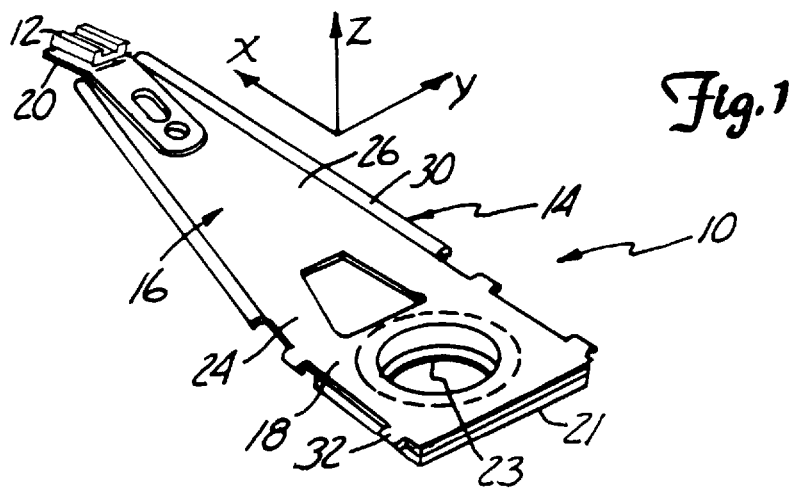
FIG. 1 is an isometric view of a head gimbal assembly.

Suspension adjust equipment 100, a first embodiment of the present invention, is illustrated generally in FIG. 5. Equipment 100 rolls and gram load adjusts generally flat (i.e., unrolled) suspensions. As described above in the Background of the Invention section, suspensions of these types typically have already been formed and are attached to carrier strips at this stage of their manufacture. For purposes of example, therefore, the following description of equipment 100 (as well as equipment 200, 700 and 900 described below) is provided with reference to carrier strips 34 of suspensions 14 such as those described above. However, equipment 100 can also be used to roll and gram load adjust individual suspensions such as 14 which are not attached to carrier strips such as 34. Furthermore, equipment 100 can be used to gram load adjust head gimbal assemblies such as 10 (i.e., to adjust or readjust the gram load after a head slider assembly such as 12 has been bonded to the suspension).

As shown, equipment 100 includes a walking beam 101 which advances carrier strips 34 (not visible in FIG. 5) through the equipment, and sequentially positions each suspension 14 at a roll station 102, first gram load measure station 104, gram load adjust station 106, second gram load measure station 108 and an out-of-specification part detab station (not shown). At the roll station 102, the spring region 24 of the suspension 14 is rolled around a curved mandrel or otherwise bent to impart the desired radius geometry to the suspension. At the first gram load measure station 104, the suspension 14 is elevated to fly height, and the post-roll fly height gram load of the suspension measured. As described in greater detail below, a gram load adjust procedure is performed at station 106 to adjust the gram load of the suspension 14 if the post-roll gram load measured at station 104 is outside the desired specification range. The post-adjust gram load of the suspension 14 is measured at second gram load measure station 108. If the post-adjust gram load of the suspension 14 is outside the desired specification range, the suspension is rejected and cut from the carrier strip at the out-of-specification detab station. The carrier strips 34 with the remaining in-specification suspensions 14 are then removed from equipment 100 and transported to a clean, heat treat and clean station (not shown). Following the cleaning, heat treating and cleaning operations the suspensions are transported to a final detab station where all the remaining suspensions 14 are cut from the carrier strip 34, and subsequently packaged for shipment to customers. In other embodiments, the suspensions 14 are not heat treated following their adjustment on equipment 100.

Walking beam 101 can be any conventional or otherwise known mechanism for transporting and positioning suspensions 14 at stations 102, 104, 106 and 108. By way of example, one such walking beam mechanism is disclosed in the Smith et al. U.S. Pat. No. 4,603,567. The walking beam 101 and stations 102, 104, 106 and 108 are mounted to a base 103.

Rolling station 102 can be any conventional or otherwise known mechanism for bending the spring region 24 of suspension 14 to the desired profile. Rolling stations such as 102 are generally known and disclosed, for example, in the Smith et al. U.S. Pat. No. 4,603,567 and the Hatch et al. U.S. Pat. No. 5,371,734. Briefly, the embodiment of rolling station 102 shown in FIG. 1 includes a base clamp and radius block mechanism 110, radius block slide 112 and a stepper motor 114 for raising and lowering a roller (not visible). After each suspension 14 is advanced to rolling station 102 by the walking beam 101, the base clamp and radius block mechanism 110 functionally clamps the baseplate 21 of the suspension to a base (not visible) with the spring region 24 positioned under a curved mandrel (also not visible). The curved mandrel has a profile which will impart the desired profile to the spring region of the suspension. Stepper motor 114 is then actuated to raise and drive the roller through a rolling stroke during which the roller engages and rolls the spring region 24 over the mandrel. The extent to which the spring region is rolled over the mandrel (i.e., the length of the rolling stroke) affects the gram load of the suspension 14. In one embodiment of equipment 100, the roll station 102 rolls each suspension 14 a constant predetermined amount. Using an interface terminal of the equipment control system (not shown), an operator sets up the roll station 102 to achieve the desired post-roll gram load (typically a percentage of the desired nominal gram load) in the suspensions 14 emerging from roll station 102. The position of the mandrel with respect to the base clamp, and therefore the position of the roll on the spring region 24, a parameter that affects the resonance characteristics of the suspension, can be adjusted by radius block slide 112. Following the rolling procedure the base clamp is opened to release the suspension 14, and the suspension is subsequently transported to first measure station 104 by walking beam 101.

First and second gram load measure stations 104 and 108, respectively, can be any conventional or otherwise known mechanism for measuring the gram load of suspensions 14 at fly height. One such gram load measure station is disclosed, for example, in the Smith et al. U.S. Pat. No. 4,603,567. The embodiment of measure station 104 shown in FIG. 5 includes load cell 120, elevator 122, elevator actuator 124, stepper motor 126 and base clamp 128. Measure station 108 can be identical to station 104, and similar features are illustrated with identical but primed reference numbers (i.e., "x'").

Figure 6A:
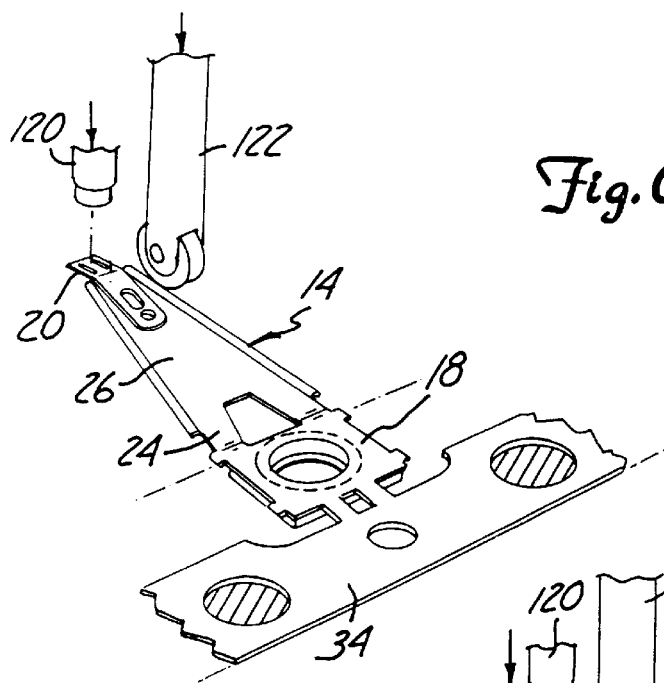
FIGS. 6A–6C are detailed schematic views of a suspension and portions of the gram load measurement stations shown in FIG. 5, and illustrate the operation of the stations to measure the fly height gram load of the suspension.
Figure 6B:
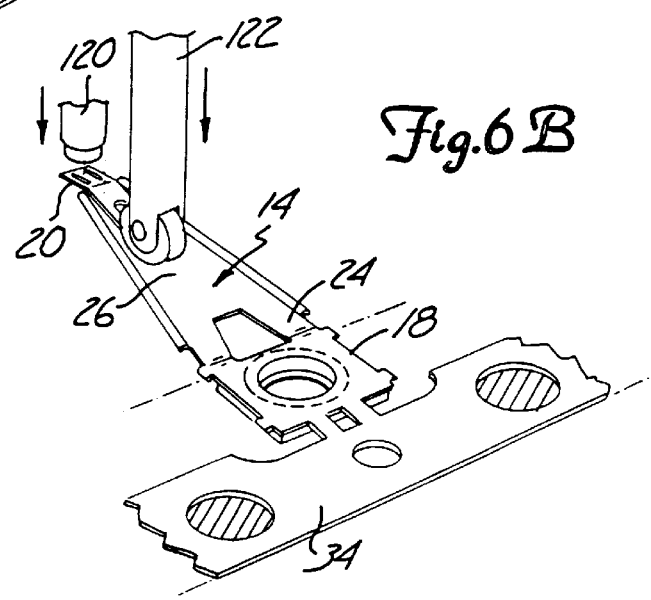
Figure 6C:
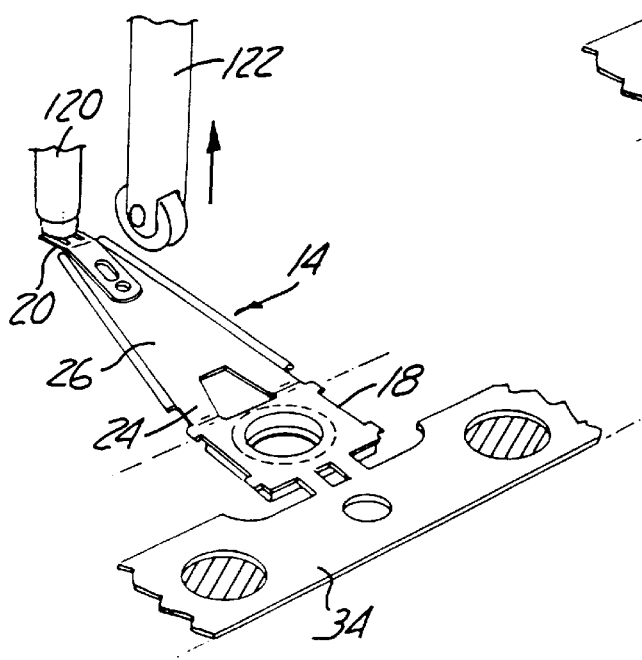

Briefly, after the suspension 14 is advanced to measure station 104 by the walking beam 101, the base clamp 128 rigidly functionally clamps the baseplate 21 of the suspension to a base (not visible) with the load beam 16 and flexure 20 of the suspension positioned below load cell 120 and elevator 122. Stepper motor 126 is then actuated to simultaneously lower load cell 120 and elevator 122 from a retracted position (shown in FIG. 6A) to an extended position (shown in FIG. 6B) at which the load cell is located at a relative z-height measurement position with respect to the base which is equal to the specification fly-height of the suspension 14. As shown in FIG. 6A, when in its retracted position the elevator 122 extends downwardly a greater distance than the load cell 120. As the load cell 120 and elevator 122 are lowered, the elevator will therefore engage the suspension 14 (typically at a location on the rigid region 26 adjacent to flexure 20) before the load cell, and elevate the suspension to a z-height beyond the fly height. After the load cell 120 is lowered to the fly height position, elevator actuator 124 is actuated to lift the elevator 122 and gently position flexure 20 of the suspension 14 on the load cell (shown in FIG. 6C) for the gram load measurement. This procedure is then repeated in the reverse order to return the suspension 14 to its free state. Other embodiments of measurement stations 104 and 108 (not shown) do not include an elevator 122 or elevator actuator 124, and instead use the load cell 120 to elevate the suspension to the fly-height measurement position. Following the gram load measurement procedure the base clamp 128 is opened to release the suspension 14, and allow the suspension to be transported to the next station by walking beam 101.

Gram load adjust station 106 can be described in greater detail with reference to FIGS. 5 and 7–10. As shown, the station 106 includes a clamp assembly 130, stepper motor 132 and suspension positioning assembly 134. Clamp assembly 130 includes a fixed base 136 and a moving clamping member 138. Base 136 is rigidly mounted with respect to the walking beam 101 and has a surface configured to receive and register the baseplate 21 of suspension 14. Clamping member 138 is reciprocally driven between closed and open positions with respect to base 136 in synchronization with the motion of walking beam 101. At the beginning of a gram adjust procedure, clamping member 138 is in its open position (not shown) spaced from base 136. The walking beam 101 then advances the suspension 14 to be adjusted into the clamp assembly 130. After the baseplate 21 has been aligned with the base 136 by the walking beam 101, clamping member 138 is driven to the closed position shown in FIG. 7, functionally clamping the baseplate 21 against the base 136. The mounting region 18 of the suspension 14 is thereby functionally clamped and rigidly held in the adjust station 106 throughout the gram adjust procedure. Following the completion of the gram adjust procedure the clamping member 138 is driven to its open position to release the suspension 14 and allow the suspension to be advanced from the station 106 by walking beam 101.

Stepper motor 132 and suspension positioning assembly 134 are mounted to a fixed base 140. The stepper motor 132 is fixedly mounted to an upper portion of the base 140. The suspension positioning assembly 134 includes a slide mount 142, a support arm 144 and a positioning bar assembly 146. Slide mount 142 is mounted to the base 140 for reciprocal motion in a direction generally parallel to the direction the clamped suspension 14 can be flexed about its spring region 24 (e.g., about a vertical or z-axis in the illustrated embodiment). Support arm 144 is mounted to and extends from slide mount 142. Positioning bar assembly 146 is mounted to an end of support arm 144 opposite the slide mount 142, and is positioned adjacent to the clamp assembly 130. Stepper motor 132 is mechanically connected to and drives the slide mount 142 through its range of reciprocal motion.

Positioning bar assembly 146 includes a pair of spaced and generally C-shaped plates 148 having longitudinally extending gaps 150 which open toward clamp assembly 130. An upper positioning bar 152 extends horizontally between plates 148 above gap 150. Similarly, a lower positioning bar 154 extends horizontally between plates 148 below gap 150 and bar 152. Bars 152 and 154 are positioned on assembly 146 at locations above and below the distal end of the load beam 16 of suspensions 14 clamped at and extending from clamp assembly 130. The positioning bar assembly 146 is shown at a suspension clamping position in FIG. 7. In this suspension clamping position gap 150 is aligned with the clamp assembly 130 enabling suspensions 14 to be advanced into and out of the clamp assembly with the load beam 16 extending between bars 152 and 154.

An optical fiber bracket 156 is fixedly mounted adjacent to the base 136 of clamp assembly 130. Bracket 156 is configured to receive and hold one or more optical fibers 158 with the ends 160 of the fibers positioned at locations directly above the spring region 24 of suspensions 14 clamped at clamp assembly 130. A laser 177 or other source of infrared light (shown in FIG. 9) is coupled to the opposite ends of optical fibers 158. The illustrated embodiment of station 106 includes two optical fibers 158 which are mounted within bracket 156 in such a manner that their ends 160 are positioned above the spaced legs of the spring region 24. In general, the ends 160 of fibers 158 are positioned to direct a relatively uniform intensity of infrared light (i.e., heat) over the spring region 24 of the suspension 14. One embodiment of the present invention uses a ten watt laser diode from SDL of San Jose, Calif., for laser 177.

Figure 9:
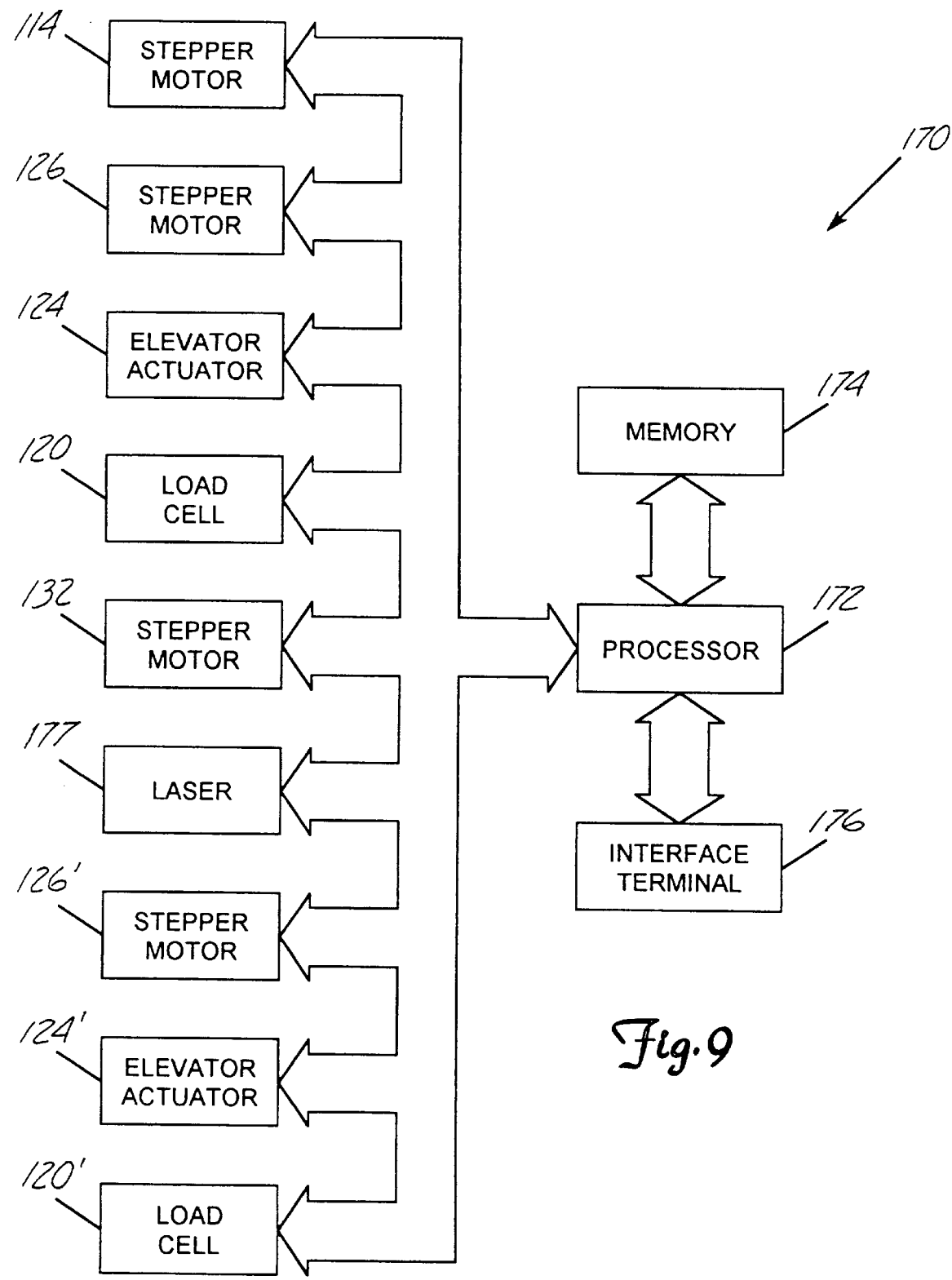
FIG. 9 is a block diagram of a portion of the electrical subsystem of the suspension gram adjust equipment shown in FIG. 5.

A control system 170 for controlling the operation of gram load adjust station 106 is illustrated in FIG. 9. As shown, the control system 170 includes a digital processor 172 coupled to program memory 174 and interface terminal 176. The processor 172 is also interfaced to stepper motor 114 of roll station 102, stepper motor 126, elevator actuator 124 and load cell 120 of gram load measure station 104, stepper motor 132 and a laser 177 of gram load adjust station 106, and stepper motor 126', elevator actuator 124' and load cell 120' of gram load measure station 108. A gram adjust program executed by processor 172 to perform gram load adjust procedures is stored in memory 174. Interface terminal 176, which includes a monitor and keypad (not separately shown) is used by an operator to set up equipment 100 and to monitor the operation of the equipment during production operations.

The gram load adjust procedure is based upon the discovery that the gram load of a suspension can be predictably adjusted to a high degree of accuracy, repeatability and stability if the spring region 24 of the suspension 14 is stressed by lifting or lowering the load beam 16 from its free state (depending on whether it is desired to upgram or downgram the suspension) to a predetermined position, and to relieve the stresses by heating the spring region (e.g., through the application of an infrared laser beam) while the load beam is held in the predetermined position. The magnitude of the gram load change generated by this process is dependent upon the amount of the stress to which the spring region 24 is subjected before being stress relieved, and this stress level can be controlled by the position of the load beam 16 with respect to its free state position.

Accordingly, adjust data representative of desired fly height gram load changes as a function load beam adjust positions is stored in memory 174. The load beam adjust positions are positions to which the load beam 16 of suspension 14 is driven upwardly by bar 154 or downwardly by bar 152 from its free state position. In a preferred embodiment the adjust data characterizes a linear equation describing gram load changes as a function of load beam adjust positions. The load beam adjust positions can be correlated to the number of steps motor 132 must be driven to raise or lower positioning bar assembly 146 from its clamping position to position the bars 154 and 152 at the desired load beam adjust positions. Also stored in memory 174 is data representative of the nominal or desired gram load of suspension 14.

Figure 10:
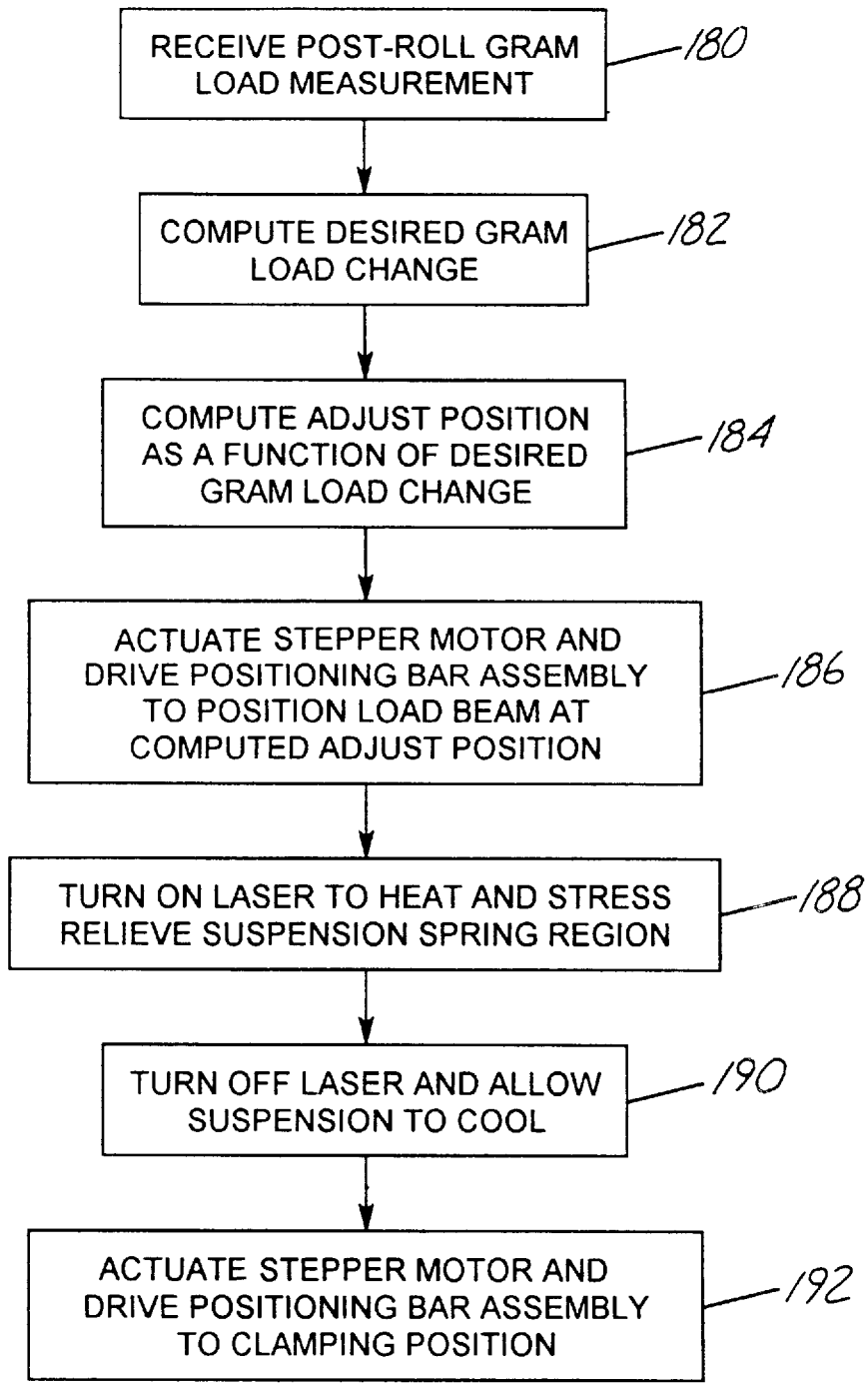
FIG. 10 is a flow chart of the gram adjust procedure performed by the suspension gram adjust station.

FIG. 10 is a flow diagram illustrating the gram load adjust procedure performed by station 106. The adjust procedure begins with the receipt of data from first gram load measurement station 104 representative of the post-roll gram load of the suspension 14 to be gram load adjusted (step 180). The difference between the measured post-roll gram load and the nominal gram load is then computed to determine the desired gram load change (i.e., the amount of the gram load adjustment to be made by station 106) (step 182). Processor 172 then accesses the adjust data as a function of the desired gram load change to determine the load beam adjust position which will produce the desired gram load change. In the embodiment described above in which the adjust data is a linear equation, processor 172 computes the load beam adjust position in terms of the required number of steps that motor 176 must be driven to raise or lower the positioning bar assembly 146 (step 184). Stepper motor 132 is then actuated by processor 172 in such a manner as to drive the positioning bar assembly 146 and cause one of the bars 152 or 154 to position the load beam 16 at the computed adjust position (step 186). With the load beam 16 held at the adjust position, processor 172 actuates laser 177 for an exposure time period and causes the spring region 24 to be heated and stress relieved by the application of infrared light directed to the spring region through optical fibers 158 (step 188). To complete the adjust procedure, processor 172 turns off laser 177 at the end of the exposure period and allows the suspension 14 to cool to ambient temperature (less than one second is usually sufficient) (step 190) before again actuating motor 132 and driving the positioning bar assembly 146 back to the clamping position (step 192).

Control system 170 is set up by an operator through the use of interface terminal 176. In one embodiment, the exposure period of laser 177 is set by observing the physical effects of the infrared light on a test suspension 14. In particular, during exposure trials the exposure period is increased until the applied heat is sufficiently great to oxidize the suspension 14, resulting in a "browning" effect on the suspension. This procedure is known as determining the browning threshold. The exposure period is then set to a period which is a predetermined length of time (e.g., 50 msec.) less than the browning threshold. This set-up procedure will result in the spring region 24 being heated to a temperature between about 600°–900° F. (315°–482° C.) during the exposure period.

The gram load adjust data (e.g., the linear equation coefficients for the preferred embodiment described above) is initially established during set-up procedure in which a number of suspensions 14 having known post-roll gram loads (measured at first gram load measurement station 104) are driven to different set-up adjust positions and stress relieved at adjust station 106. The post-adjust gram loads of the suspensions 14 are then measured at second gram load measurement station 108, and used by processor 172 to compute the changes in gram load induced by the adjust station 106 at these set-up adjust positions. Processor 172 then generates the gram load adjust data by computing a least squares fit (e.g., a Gaussian method) to the measured gram load changes and corresponding set-up adjust positions. In a similar manner, the adjust data can be periodically or continually updated by processor 172 during normal operation of adjust station 106 on the basis of measured differences between the actual post-adjust gram loads and the nominal gram load.

Figure 11:
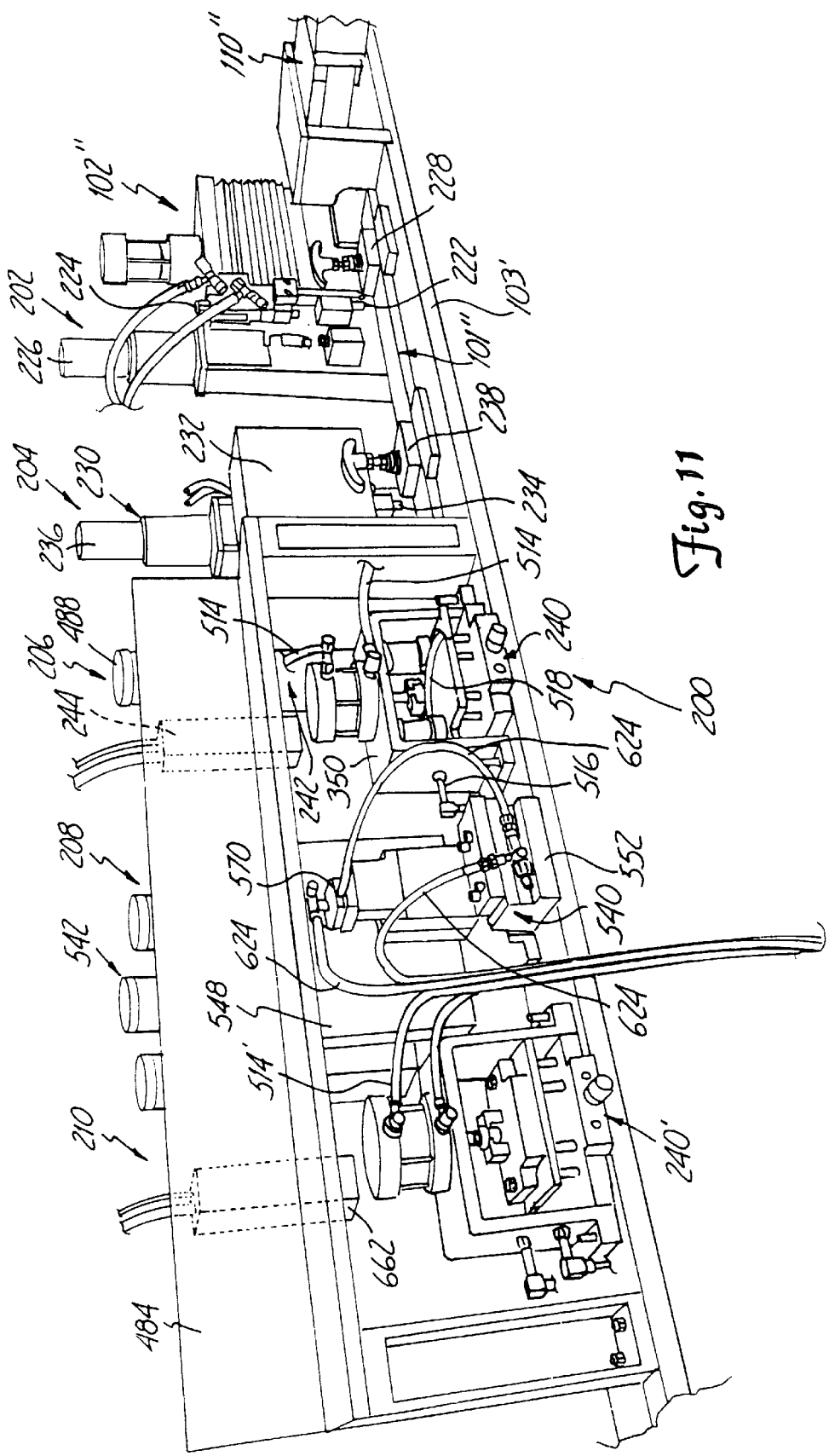
FIG. 11 is an isometric view of a second embodiment of the suspension adjust equipment in accordance with the present invention.

Suspension adjust equipment 200, a second embodiment of the present invention, is illustrated generally in FIG. 11. Equipment 200 rolls and adjusts the gram load, radius geometry and static attitude (both pitch and roll) of generally flat (i.e., unrolled) suspensions. As described above in the Background of the Invention section, suspensions of these types typically have already been formed and are attached to carrier strips at this stage of their manufacture. For purposes of example, therefore, the following description of equipment 200 is provided with reference to carrier strips 34 of suspensions 14 such as those described above. Portions of equipment 200 are similar to those of equipment 100 described above, and these portions are described with reference to identical but twice primed (i.e., "x'"") reference numerals.

As shown, suspension adjust equipment 200 includes a walking beam 101" which advances carrier strips 34 (not visible in FIG. 11) through the equipment. The walking beam 101" sequentially positions each suspension 14 at a roll station 102", backbend station 202, gram load and profile measure station 204, static attitude measure and pitch adjust station 206, laser adjust station 208, static attitude measure station 210 and an out-of-specification part detab station (not shown).

At roll station 102', the baseplate 21 of the suspension 14 is clamped at the base clamp and radius block mechanism 110", and the spring region 24 rolled around a curved mandrel to bend the spring region to the desired profile and impart a desired post-roll gram load to the suspension. Upon the completion of the rolling operation, the suspension 14 is released from the mechanism 110' and transported to backbend station 202 where the suspension is backbent to reduce its gram load a predetermined amount (i.e., bent a predetermined amount beyond its range of elastic deformation in a direction opposite that in which it was rolled).

Any conventional or otherwise known backbending mechanism can be incorporated into station 202. In the embodiment shown in FIG. 11, backbend station 202 is structurally similar to gram load measure station 104 described above with reference to adjust equipment 100, but does not include a load cell. As shown, backbend station 202 includes an elevator 222, elevator actuator 224, stepper motor 226 and base clamp 228. After the suspension 14 is advanced to backbend station 202 by the walking beam 101", the base clamp 228 functionally clamps the baseplate 21 of the suspension to a base (not visible) with the load beam 16 and flexure 20 of the suspension positioned below elevator 222. Stepper motor 226 is then actuated to drive the elevator 222 through a backbend stroke by lowering the elevator from a retracted position to an extended position. As it is driven to the extended position the elevator 222 will engage the suspension 14 (typically at a location on the rigid region 26 adjacent to flexure 20), and elevate the suspension in a direction opposite to the direction that it was rolled. During the backbend operation the load beam 16 is elevated beyond its range of elastic deformation (i.e., beyond the point at which it will "spring back" or return to its original free state when released from the elevator) to bend or plastically deform the spring region 24 and reduce the then-current gram load. The amount of plastic deformation imparted to the load beam 16 during the backbend operation, and therefore the induced gram load reduction, is controlled by the extent to which the load beam is backbent (i.e., the length of the backbend stroke of elevator 222). In one embodiment of adjust equipment 200, the backbend station 202 backbends each suspension 14 a constant predetermined amount (e.g. 0.3 grams for a suspension having a nominal gram load of two to five grams). Using an interface terminal (FIG. 25) an operator set up the backbend station 202 to achieve the desired post-backbend gram load in the suspensions 14 emerging from backbend station. Following the backbending procedures the base clamp 228 is opened to release the suspension 14, and allow the suspension to be transported to the next station by walking beam 101".

Gram load and profile measure station 204 includes a gram load measurement instrument 230 and a z-height measurement instrument 232. Gram load measurement instrument 230 is structurally similar to gram load measure station 104 described above with reference to adjust equipment 100, but does not include an elevator or elevator actuator. As shown, gram load measurement instrument 230 includes a load cell 234, stepper motor 236 and base clamp 238. After the suspension 14 is advanced to station 204 by the walking beam 101", the base clamp 238 functionally clamps the baseplate 21 of the suspension to a base (not visible) with the load beam 16 and flexure 20 of the suspension positioned below load cell 234. Stepper motor 226 is then actuated to drive the load cell 234 into engagement with the flexure 20 and to elevate the suspension 14 to its specification fly height. A measurement of the post-backbend gram load of the suspension 14 can then be provided by load cell 234.

Z-height measurement instrument 232 is positioned and configured to measure the height parameter of suspensions 14 clamped at base clamp 238. As described above in the Background of the Invention section, the height parameter of the suspension 14 can be used to describe the profile geometry and therefore resonance characteristics of the suspension. In the embodiment shown, instrument 232 is an optical point range sensor mounted to station 204 between base clamp 238 and load cell 234, and above suspensions 14 clamped at the base clamp. Optical point range sensors are generally known and commercially available from a number of suppliers including WYKO Corporation of Tucson, Ariz. Briefly, point range sensors of this type generate a light beam which is directed to a measurement target at a non-perpendicular angle. The light beam is then reflected from the target and directed to a detector. The position at which the reflected light beam strikes the detector will vary as a function of the distance between the instrument 232 and the measurement target. On station 204, the instrument 232 is positioned to direct the light beam to the location on the rigid region 26 of suspension 14 at which the height parameter is to be measured (e.g., the height location). Z-height measurement instrument 232 can then provide a height parameter measurement of the suspension 14 when the suspension is elevated to fly height by the load cell 234. Although not shown, station 204 can include alternative measurement instruments for measuring the height parameter of suspensions 14. Furthermore, additional and/or alternative parameters to height can be used to characterize the profile geometry of the suspensions 14.

After the gram load and height parameter of the suspension 14 are measured, stepper motor 236 is actuated to raise the load cell 234 to its retracted position and return the suspension 14 to its free state. The base clamp 238 is opened to release the suspension 14, and allow the suspension to be transported to the next station by walking beam 101".

Static attitude measure and pitch adjust station 206 includes suspension clamp assembly 240, pitch adjust mechanism 242 and static attitude measurement instrument 244. After the suspension 14 is advanced to station 206 by walking beam 101", clamp assembly 240 is actuated and driven from its open position to a baseplate clamping position at which the baseplate 21 of the suspension is functionally clamped and the suspension elevated to fly height. The static attitude of the flexure 20 (both pitch and roll in the illustrated embodiment) is then measured by instrument 244. After the static attitude is measured, clamp assembly 240 is again actuated and driven from the baseplate clamping position to a load beam clamping position. At the load beam clamping position clamp assembly 240 fixedly clamps the rigid region 26 of the load beam 16. Pitch adjust mechanism 242 is then actuated to engage and adjust the pitch of the flexure 20. Following these static attitude measurement and pitch adjust procedures, clamp assembly 240 is opened to release the suspension 14, and allow the suspension to be transported to the next station by walking beam 101". In other embodiments (not shown), pitch adjust mechanism 242 is configured to engage and bend the distal end of load beam 16 to induce pitch changes.

Figure 15:
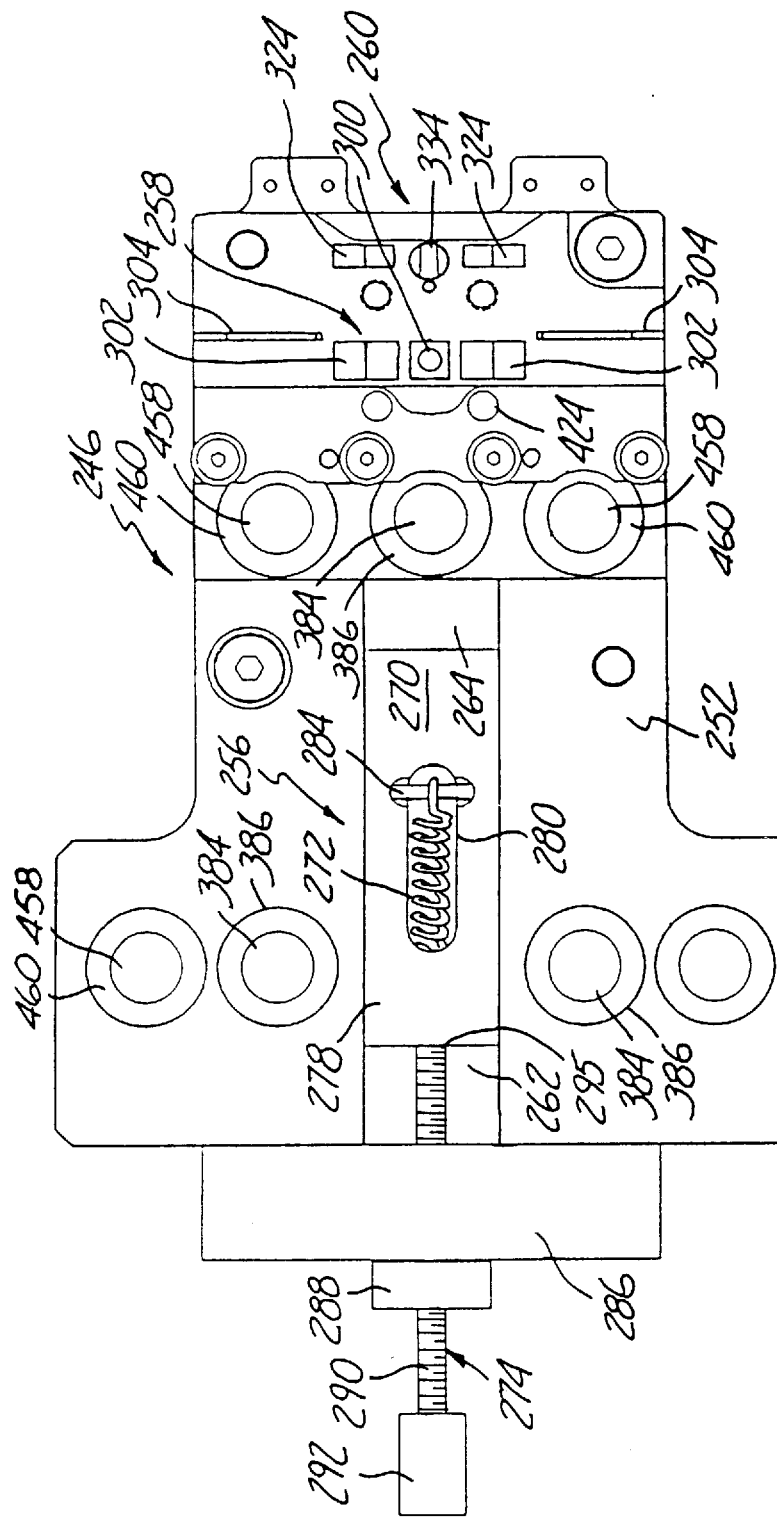
FIG. 15 is a top view of the base assembly of the suspension clamp assembly.
Figure 18:
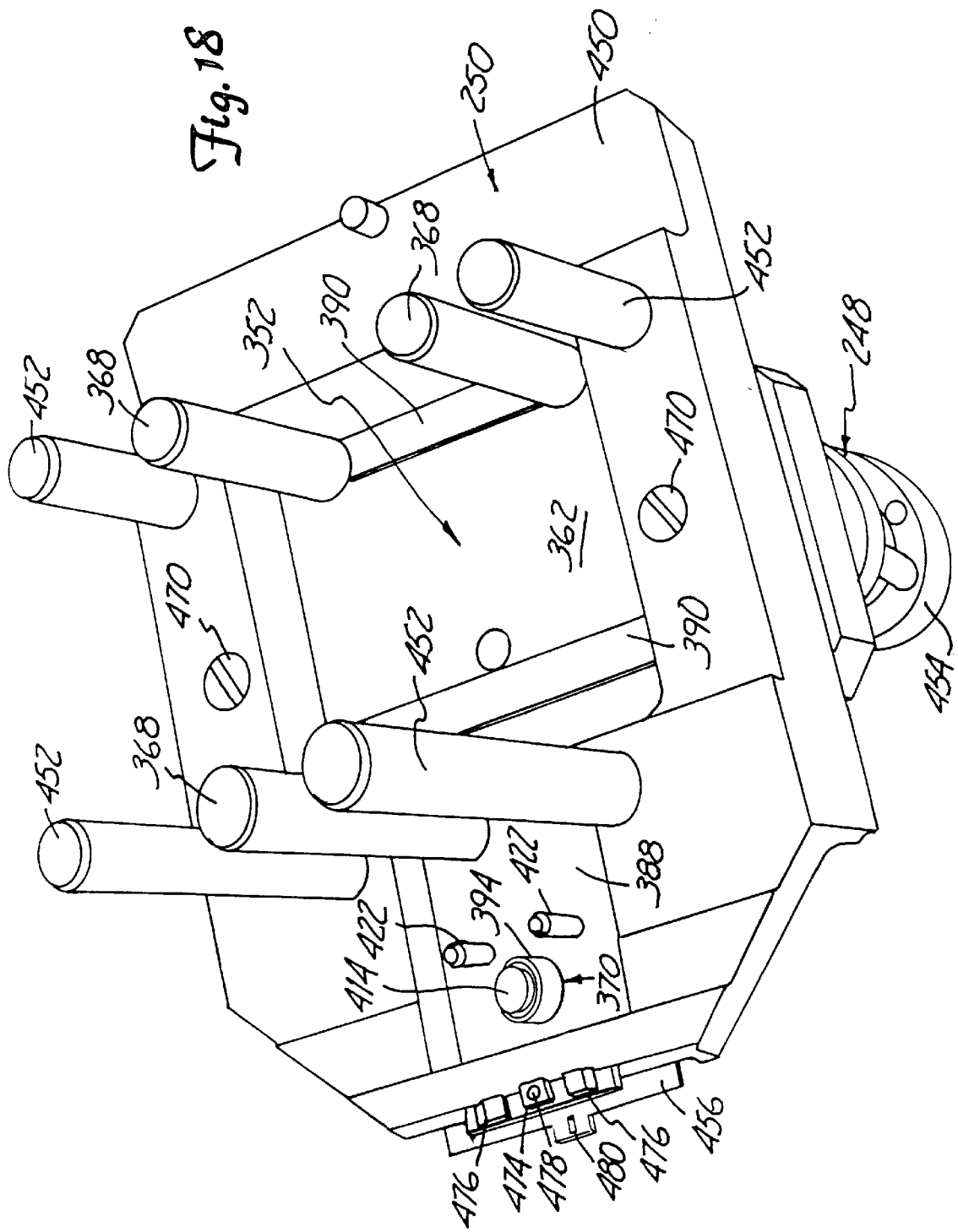
FIG. 18 is an isometric view illustrating the lower portions of the functional clamp assembly and the load beam clamp assembly of the suspension clamp assembly shown in FIG. 12.
Figure 21:
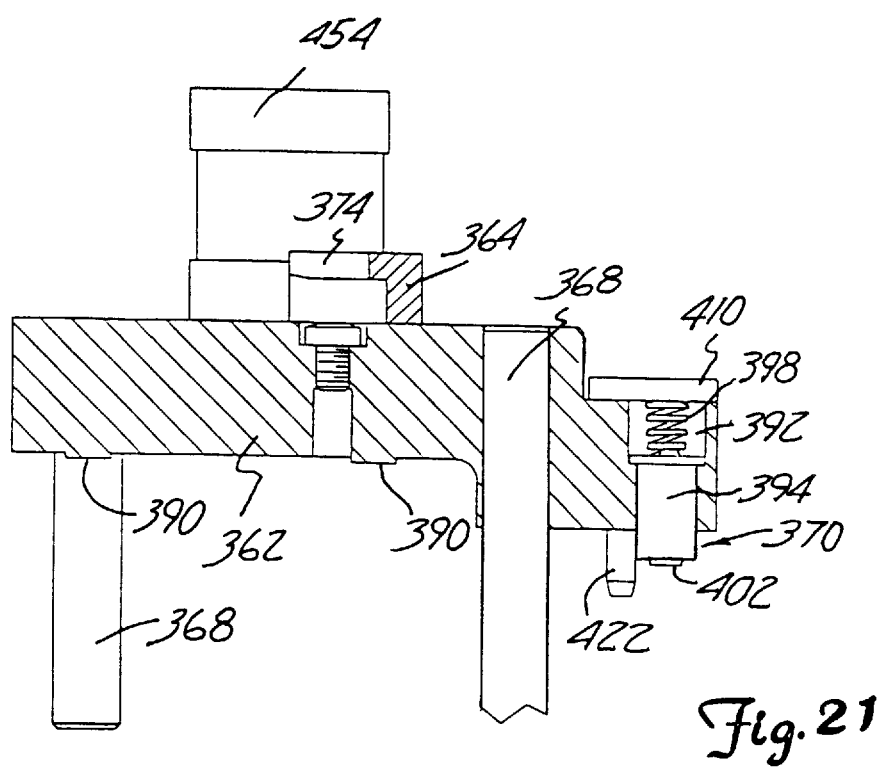
FIG. 21 is a detailed sectional side view of the clamp frame assembly shown in FIG. 19.

As shown generally in FIGS. 12 and 13A–13C, suspension clamp assembly 240 includes a base assembly 246, baseplate clamp assembly 248 and load beam clamp assembly 250. Base assembly 246 can be described in greater detail with reference to FIGS. 14–16, and includes a base 252 and a fly height adjustment stop assembly 254. Base 252 is a machined member with an upper surface which includes a clamp assembly guide region 256, baseplate clamping region 258 and load beam clamping region 260. An elongated channel 262 extends into the clamp assembly guide region 256. Channel 262 has a longitudinal axis which is generally parallel to an axis extending through clamping regions 258 and 260, a lower surface 264 which slopes downwardly with increasing distance from the clamping regions, and a pair of semicircular bearing channels 266 which extend transversely across the channel at spaced locations. Fly height adjustment stop assembly 254 includes a pair of roller bearings 268 mounted within bearing channels 266, stop block 270, spring 272 and height adjustment control 274. Stop block 270 has a lower surface 276 which is generally parallel to the lower surface 264 of channel 262, an upper surface 278 which is generally parallel to the surface of clamp assembly guide region 256, and a central opening 280 which extends between the upper and lower surfaces. The lower surface 276 of stop block 270 is positioned on roller bearings 268 to enable the stop block to slide within channel 262, and thereby vary the position of the upper surface 278 (i.e., the height of the upper surface) with respect to the surface of base 252. A lower end of spring 272 is hooked around pin 282 which is mounted to base 252. An upper end of the spring 272 extends through opening 280 and is hooked around a pin 284 which is mounted to the stop block 270. Spring 272 therefore biases the stop block 270 in a direction away from clamping regions 258 and 260. Height adjustment control 274 includes mounting member 286, threaded insert 288, threaded rod 290 and knob 292. Mounting member 286 is positioned on the rear side of base 252 adjacent the position into which the channel 262 opens, and includes a bore 294 aligned with the channel. Threaded insert 288 is mounted within the bore 295. Shaft 290 is threadedly mounted within insert 288 and has a stop end 295 which extends into channel 262. Shaft 290 thereby limits the motion of stop block 270 within the channel 262. The height of the upper surface 278 of stop block 270 can therefore be adjusted and set using knob 292 to rotate shaft 290.

Baseplate clamping region 258 and load beam clamping region 260 of the base 252 can be described in greater detail with reference to FIGS. 14, 16 and 17. The baseplate clamping region 260 includes a baseplate clamp pad 300, guide pads 302 on opposite sides of the clamp pad and guide ridges 304 between the guide pads and the sides of base 252. Baseplate clamp pad 300 is elevated from the surrounding portions of the base 252, and has a generally planar upper surface which is configured to receive the baseplate 21 of suspensions 14. The guide pads 300 have surfaces which slope upwardly toward the clamp pad 300 to guide the baseplate 21 of suspensions 14 being advanced to and from the clamp pad by the walking beam 101". Similarly, the guide ridges 304 have surfaces which slope upwardly toward clamp pad 300 and guide suspensions 14 being advanced to and from the clamp pad.

A registration bore 306 extends into clamp pad 300 and is sized to receive the mounting boss 23 of suspension 14 clamped to the clamp pad. A rod 308 is mounted within the bore 306 for reciprocal motion, and is biased upwardly by spring assembly 310. In the embodiment shown, spring assembly 310 includes springs 312 and 314 and plunger 316 which are retained in a bore 318 below aperture 306 by screw 320. Spring 314 is positioned between screw 320 and plunger 316. Spring 312 is positioned between the plunger 316 and rod 308. As shown in FIG. 17, spring assembly 310 is configured and positioned within bore 318 in such a manner that in its uncompressed or free state the upper surface of rod 308 is generally coplanar with the upper surface of clamp pad 300. When baseplates 21 of suspensions 14 are clamped to the clamp pad 300 by the baseplate clamp assembly 248, the mounting boss 23 will extend into bore 306 to accurately position the suspension on the clamp pad. This motion forces rod 308 downwardly and compresses springs 312 and 314. When the baseplate 21 of the suspension 14 is subsequently released by the baseplate clamp assembly 248, spring assembly 310 forces rod 308 upwardly, thereby lifting the mounting boss 23 out of bore 306 to allow the suspension to be advanced from the clamp pad 300 by walking beam 101'.

Load beam clamping region 260 includes a clamp surface 322 and a pair of guide pads 324 which are positioned on opposite sides of the clamp surface. The guide pads 324 have surfaces which slope upwardly toward the clamp surface 322 to guide the rigid region 26 of suspensions 14 being advanced to and from the clamp surface by the walking beam 101". Clamp surface 322 is recessed from the surfaces of guide pads 324 and includes a bore 326. As shown in FIG. 17, at shoulder 328 the bore 326 extends into a larger diameter bore 330. A plunger 332 which includes a rod 334 and piston 336 is mounted for reciprocal motion within bores 326 and 330, and is biased upwardly by spring assembly 338. Spring assembly 338 includes spring 340, washer 342 and screw 344. Spring 340 is retained within bore 330 in a compressed state to force plunger 332 upwardly to the extended position shown in FIG. 17 at which piston 336 is engaged with shoulder 328 and the rod 334 extends from aperture 326 to a height above the clamp surface 322. When the rigid region 26 of suspensions 14 are clamped to the clamp surface 322 by the load beam clamp assembly 250, the plunger rod 334 will be forced into bore 326 by the rigid region of the suspension. When the rigid region 26 of the suspension 14 is subsequently released by the load beam clamp assembly 250, spring assembly 338 forces plunger 332 upwardly, thereby lifting the rigid region of the suspension from the clamp surface 322 to allow the suspension to be advanced by walking beam 101".

Baseplate clamp assembly 248 and load beam clamp assembly 250 can be described generally with reference to FIGS. 12, 13A–13C, 14, 15, and 18–22. The baseplate clamp assembly 248 includes a support frame 350, clamping frame assembly 352 and pneumatic actuator 354. Support frame 350 supports both the baseplate clamp assembly 248 and load beam clamp assembly 250 above the base assembly 246 and includes a pair of vertically oriented side members 356 and a cross member 358 which is supported by the side members. Actuator 354 is mounted to the upper surface of the cross member 358 and includes an actuator arm 360 which extends through an aperture (not visible) in the cross member. Clamping frame assembly 352 includes frame plate 362, yoke 364, elevator assembly 366, guide shafts 368 and clamp pad assembly 370. Yoke 364 is mounted to the upper surface of frame plate 362 by screws 372 and has a slot 374 which is sized to receive rod 376. The upper end of rod 376 is fastened to actuator arm 360 by nuts 378, while the lower end of the rod is fastened to yoke 364 by rings 380 and 382 which extend from and engage the rod at positions above and below the yoke.

Guide shafts 368 extend from the lower surface of frame plate 362 and are positioned for reciprocal motion in linear bearings 384 which are mounted within apertures 386 in the base 252. In the embodiment shown, two guide shafts 368 are located on opposite sides at the back of the frame plate 362, while one guide shaft 362 is centrally located in a tongue 388 extending from the front of the frame plate. A pair of spaced and elongated ridges 390 extend downwardly from the surrounding lower surface of the frame plate 362. As perhaps best shown in FIG. 18, ridges 390 extend between the opposite sides of the frame plate 362, with one of the ridges being positioned between the pair of guide shafts 368 at the back of the frame plate and the other located rearwardly of the tongue 388. The guide shafts 368 cooperate with linear bearings 384 to guide frame plate 362 and other components of clamping frame assembly 352 through reciprocal baseplate clamping strokes.

Figure 23:
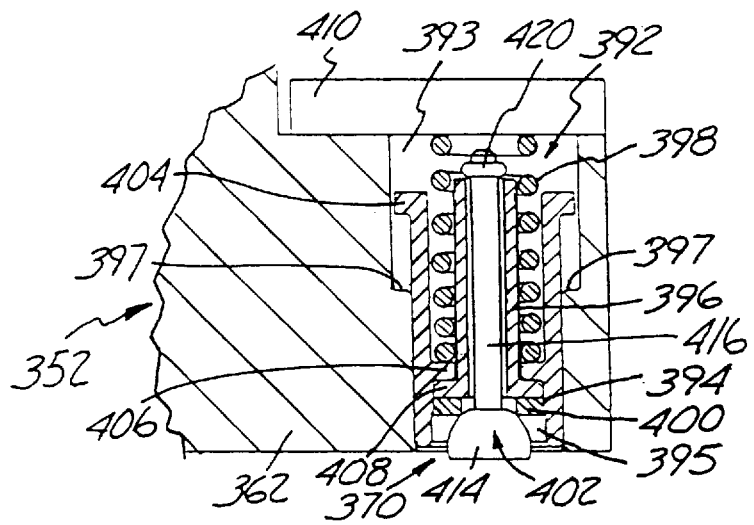
FIGS. 23A and 23B are detailed sectional side views of the clamp pad assembly shown in FIG. 21.
Figure 23:
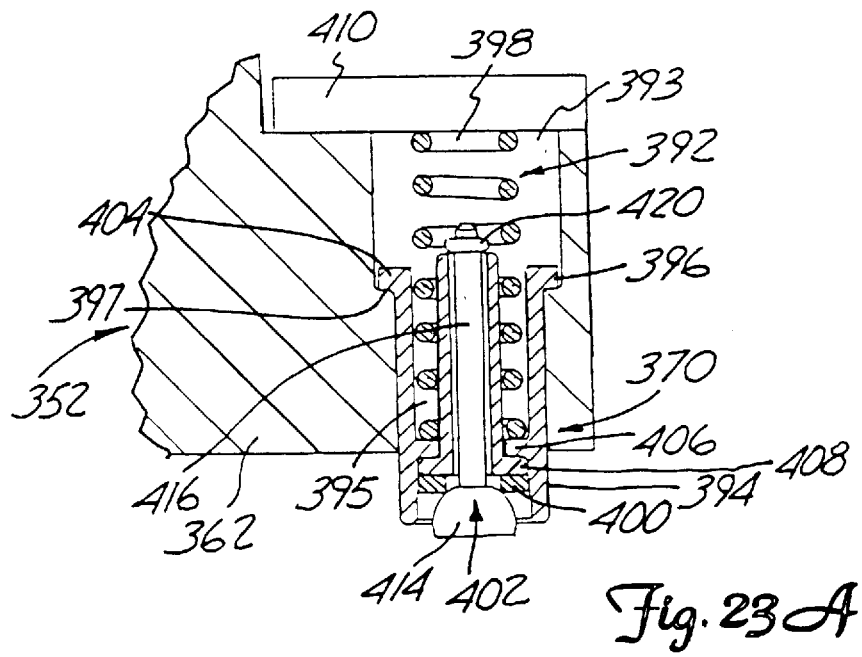
Figure 24:
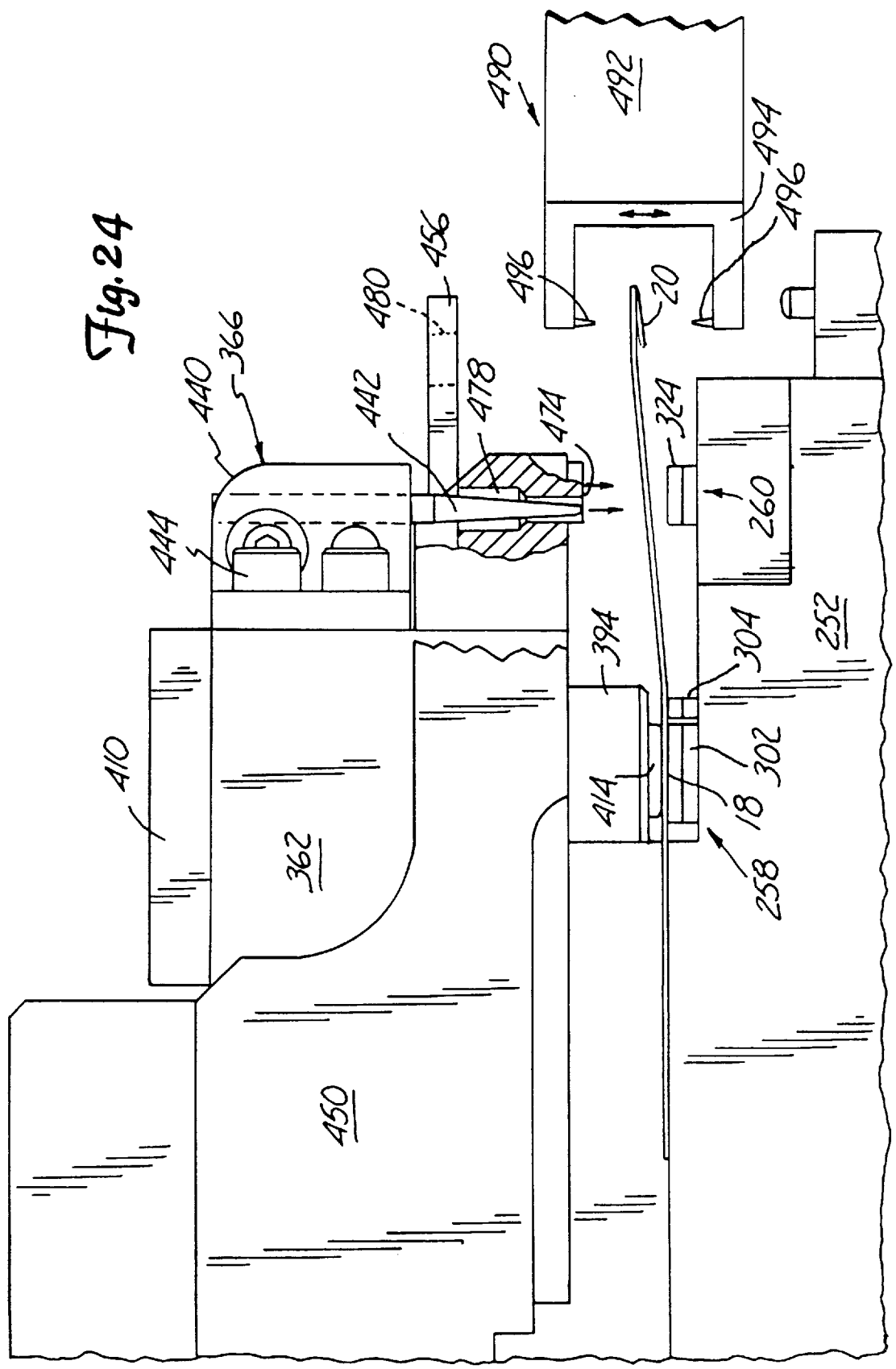
FIG. 24 is a detailed side view of the functional clamp assembly, load beam clamp assembly and flexure bend assembly, with portions thereof shown in section.

Clamp pad assembly 370 can be described with reference to FIGS. 23A and 23B. As shown, the clamp pad assembly 370 is mounted within a chamber 392 centrally located in the front of the tongue 388 of frame plate 362. Chamber 392 is circular in cross section and has an upper portion 393 and a reduced diameter lower portion 395 which are separated by shoulder 397. The clamp pad assembly 370 includes outer tube 394, inner tube 396, spring 398, jewel ring 400 and clamp pad 402. Outer tube 394 is concentrically mounted for reciprocal motion within lower portion 395 of chamber 392 and has an outwardly extending lip 404 on its upper end and an inwardly extending lip 406 at a position spaced from its lower end. Lip 404 extends into upper portion 393 of the chamber 392 and engages shoulder 397 to limit the downward motion of outer tube 394. Inner tube 396 is mounted within outer tube 394 and has an outwardly extending lip 408 on its lower edge. Inner tube 396 is positioned with its lip 408 within outer tube 394 and below the inwardly extending lip 406 of the outer tube. The upward motion of the inner tube 396 is thereby limited when its lip 408 engages the lip 406 of outer tube 394. Spring 398 is concentrically mounted around the inner tube 396 and extends between the inwardly extending lip 406 of the outer tube 394 and a cover plate 410. Cover plate 410 is secured to frame plate 362 by screws 412 (FIG. 19). Spring 398 biases the tubes 394 and 396 and clamp pad 402 to the extended position shown in FIGS. 18 and 23A at which the lower edge of tube 394 projects below the lower surface of frame plate 362.

Clamp pad 402 includes a clamp ball 414, mounting pin 416 and nut 420. The clamp ball 414 is a semi-spherical member having a flat clamping surface. Pin 416 is fixedly mounted to the semi-spherical surface of the clamp ball 414 and extends upwardly through ring 400 and into the inner tube 396. Nut 420 is fastened to the end of pin 416 to hold the pin in the inner tube 396 with the semi-spherical surface of clamp ball 414 engaged with the ring 400 and the flat clamping surface extending below the lower edge of tube 394. As shown in FIGS. 23A and 23B, the outer diameter of the mounting pin 416 is sufficiently less than the inner diameter of the inner tube 396 to enable the pin to rock or swing within the tube while the semi-spherical surface of the clamp ball 414 rotates within the ring 400. Ring 400 and the other components of clamp pad assembly 370 thereby securely engage the clamp ball 414 while allowing the flat clamping surface of the clamp ball to engage the mounting regions 18 of suspensions 14 which lack parallelism with the baseplate clamp pad 300 (FIG. 14) when the suspensions are positioned on the clamp pad (e.g., due to tolerance variations).

Figure 2:
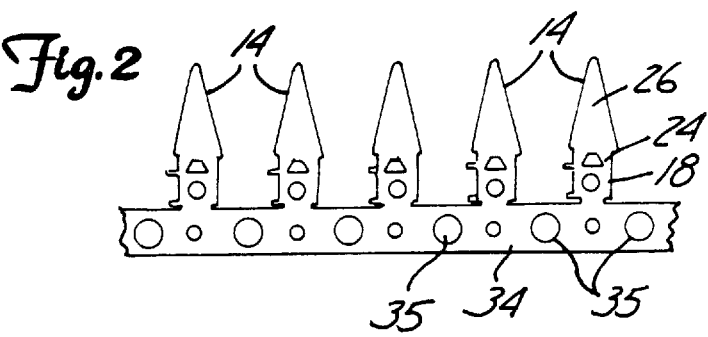
FIG. 2 is an illustration of a carrier strip with a plurality of generally flat suspensions extending therefrom.
Figure 3:
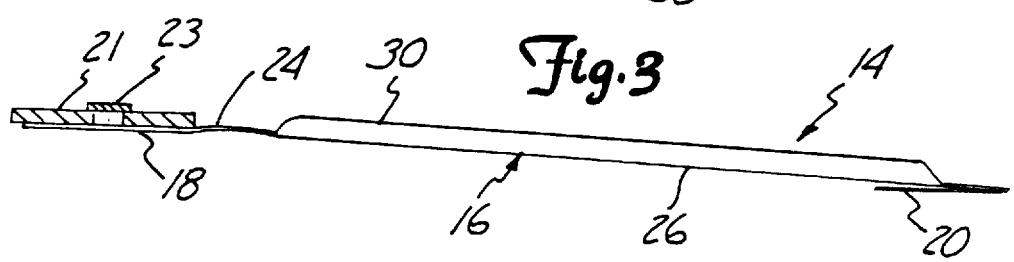
FIG. 3 is a side view of the suspension of the head gimbal assembly shown in FIG. 1, illustrating the profile of the spring region.
Figure 4:
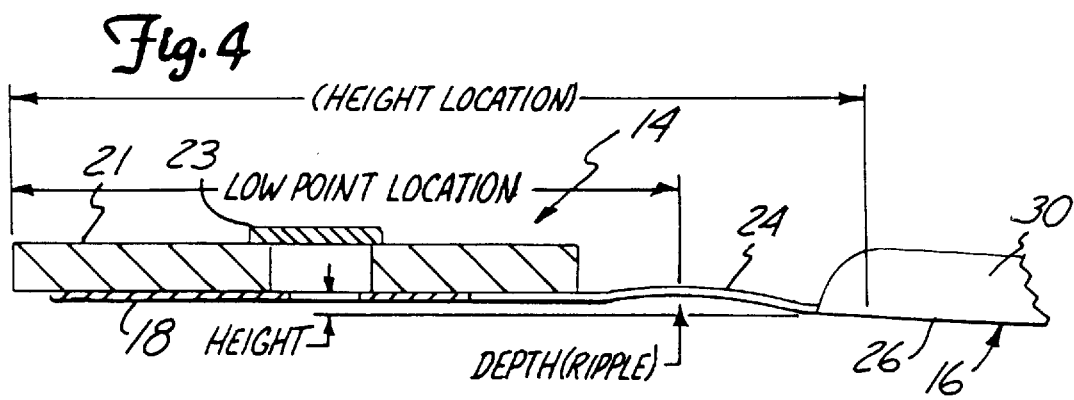
FIG. 4 is a detailed side view of the proximal end the suspension shown in FIG. 3, illustrating parameters used to characterize the profile geometry of the suspension.

A pair of locating pins 422 having tapered lower edges project from the lower surface of frame plate 362. Locating pins 422 are positioned rearwardly and on opposite sides of the clamp pad assembly 370, and are sized to extend through apertures 35 in carrier strips 34 (FIG. 2) and into holes 424 of base 252.

Figure 22:
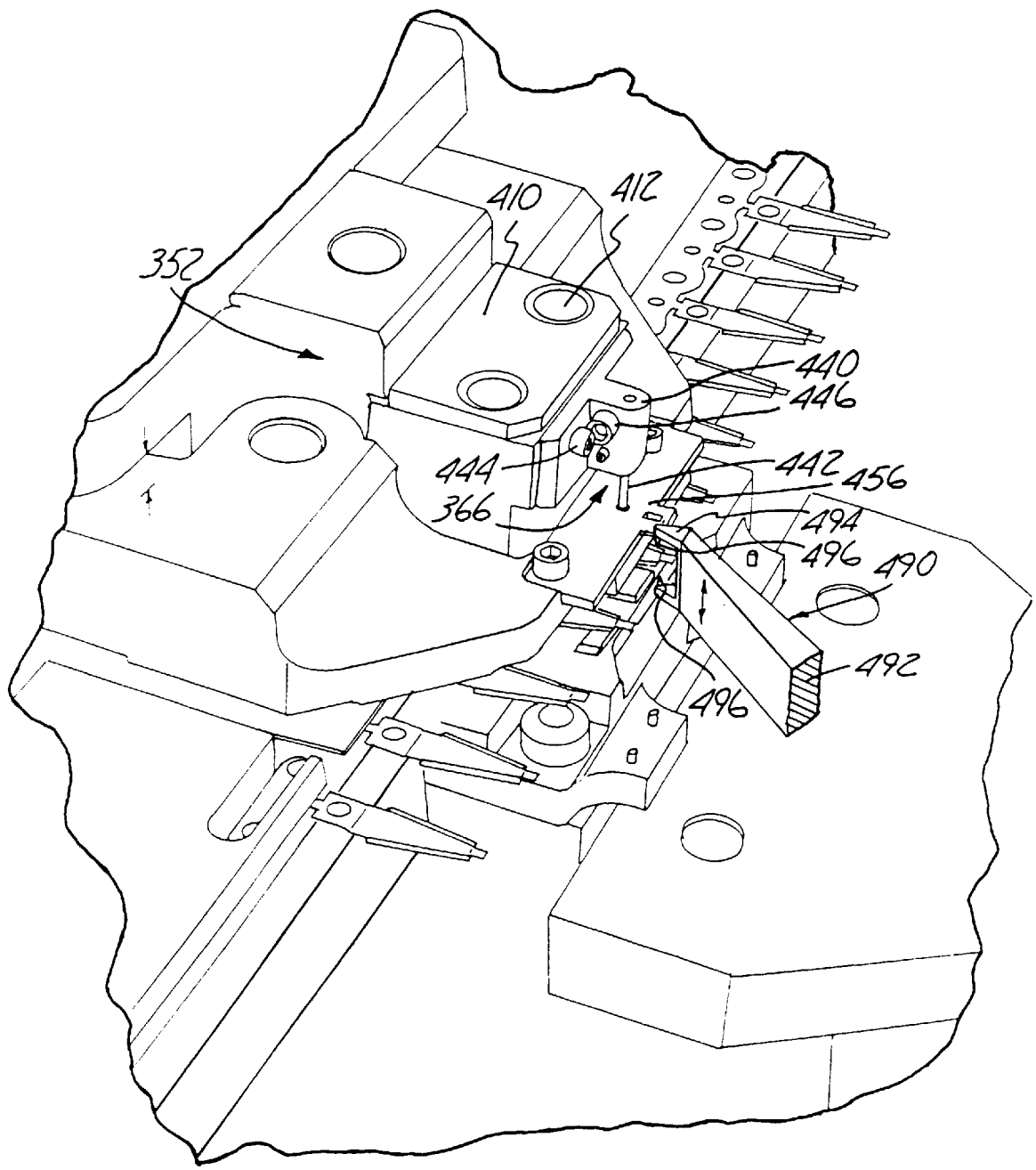
FIG. 22 is a detailed isometric view of the static attitude measure and pitch adjust station.

Elevator assembly 366 can be described with reference to FIGS. 19 and 22. As shown, the assembly 366 includes bracket 440 and elevator pin 442. Bracket 440 is fastened to the forward edge of the frame plate tongue 388 by screws 444. Elevator pin 442 is mounted within an aperture in the bracket 440 by screw 446, and extends downwardly from the bracket.

As shown in FIGS. 12, 13A–13C, 14, 15, and 18–22, load beam clamp assembly 250 includes adjustment frame 450, guide shafts 452 and pneumatic actuators 454. Frame 450 is a generally rectangularly shaped member having a central opening. A clamp base 456 is mounted to the front of frame 450. Guide shafts 452 extend from the lower surface of frame 450 and are positioned for reciprocal motion in linear bearings 458 which are mounted within apertures 460 in the base 252. The adjustment frame 450 is positioned below the frame plate 362 of clamping frame assembly 352 and includes a pair of spaced recesses 462 in the upper surface of both sides. The guide shafts 368 of the clamping frame assembly 352 extend through the central opening of adjustment frame 450 enabling reciprocal motion of the adjustment frame with respect to the clamping frame assembly. A pair of spaced recesses 464 are located in the lower surface of both sides of the frame plate 362 of the clamping frame assembly 352, directly above the recesses 462 in the adjustment frame 450.

Actuators 454 are mounted to the upper surface of frame plate 362 of clamping frame assembly 352 on its opposite sides between recesses 464, and include actuator arms 466 which extend downwardly through the frame plate and into apertures 468 in adjustment frame 450. Ends of the actuator arms 466 are secured to adjustment frame 450 by screws 470. Springs 472 are mounted in associated recesses 462 and 464 to bias adjustment frame 450 downwardly from the frame plate 362 of the clamping frame assembly 352.

Clamp base 456 includes a load beam clamp pad 474 and guide pads 476 on opposite sides of the clamp pad. The load beam clamp pad 474 is elevated from the surrounding portions of base 456, and has a generally planar surface with a central bore 478. The planar surface of clamp pad 474 is configured to engage the rigid region 26 of suspensions 14. The guide pads 476 have surfaces which slope towards the load beam clamp pad 474 to guide the load beam 16 of suspensions 14 being advanced to and from the clamp pad by the walking beam 101". As shown in FIGS. 13A–13C and 22, bore 478 extends through the load beam clamp pad 474 and base 456, and is aligned with the elevator pin 442. Clamp base 456 also includes an aperture 480 in front of the load beam clamp pad 474. As described below, aperture 480 functions as a shutter for the light beam used to measure the static attitude of suspensions 14 clamped by clamp assembly 240.

Static attitude measurement instrument 244 is fixedly mounted to a support frame 484 at a position directly above the aperture 480 in clamp base 456. In the embodiment shown, instrument 244 is an autocollimator. Autocollimators are generally known and commercially available from a number of sources including Sight Systems of Newburry Park, Calif. and WYKO of Tucson Ariz. Briefly, autocollimator instruments of this type generate a collimated beam of light which is directed to a measurement target. The light beam is then reflected from the measurement target and directed to a detector. The incident angle at which the reflected light beam strikes the detector will vary as a function of the orientation of the surface of the target (i.e., its angle) with respect to the light beam. At station 206, instrument 244 is positioned to direct the collimated light beam to the flexure 20 of suspension 14 through aperture 480. Instrument 244 can then provide a measurement of the static attitude of the flexure 20 when suspension 14 is elevated to fly height by baseplate clamp assembly 248 in the manner described below. Although not shown, station 206 can include alternative measurement instruments for measuring the static attitude of flexures 20.

Pitch adjust mechanism 242 includes stepper motor 488 and flexure bending assembly 490. As shown in FIG. 11, the stepper motor 488 is fixedly mounted with respect to base 103' adjacent to suspension clamp assembly 240. As shown in FIGS. 13A–13C, 22 and 24, bending assembly 490 includes an arm 492 which is mounted to and driven by the stepper motor 488. A generally C-shaped member 494 is located on the end of arm 492 and includes a pair of flexure-engaging pins 496. One of pins 496 extends upwardly from the lower surface of member 494, while the other extends downwardly from the upper surface of the member. The flexure bending assembly 490 is shown at a suspension transfer position in FIG. 13A. In this transfer position the gap between the ends of pins 496 is aligned with the upper surface of rod 334 enabling suspensions 14 to be advanced into and out of clamp assembly 240 with the flexures 20 extending between the pins.

Figure 25:
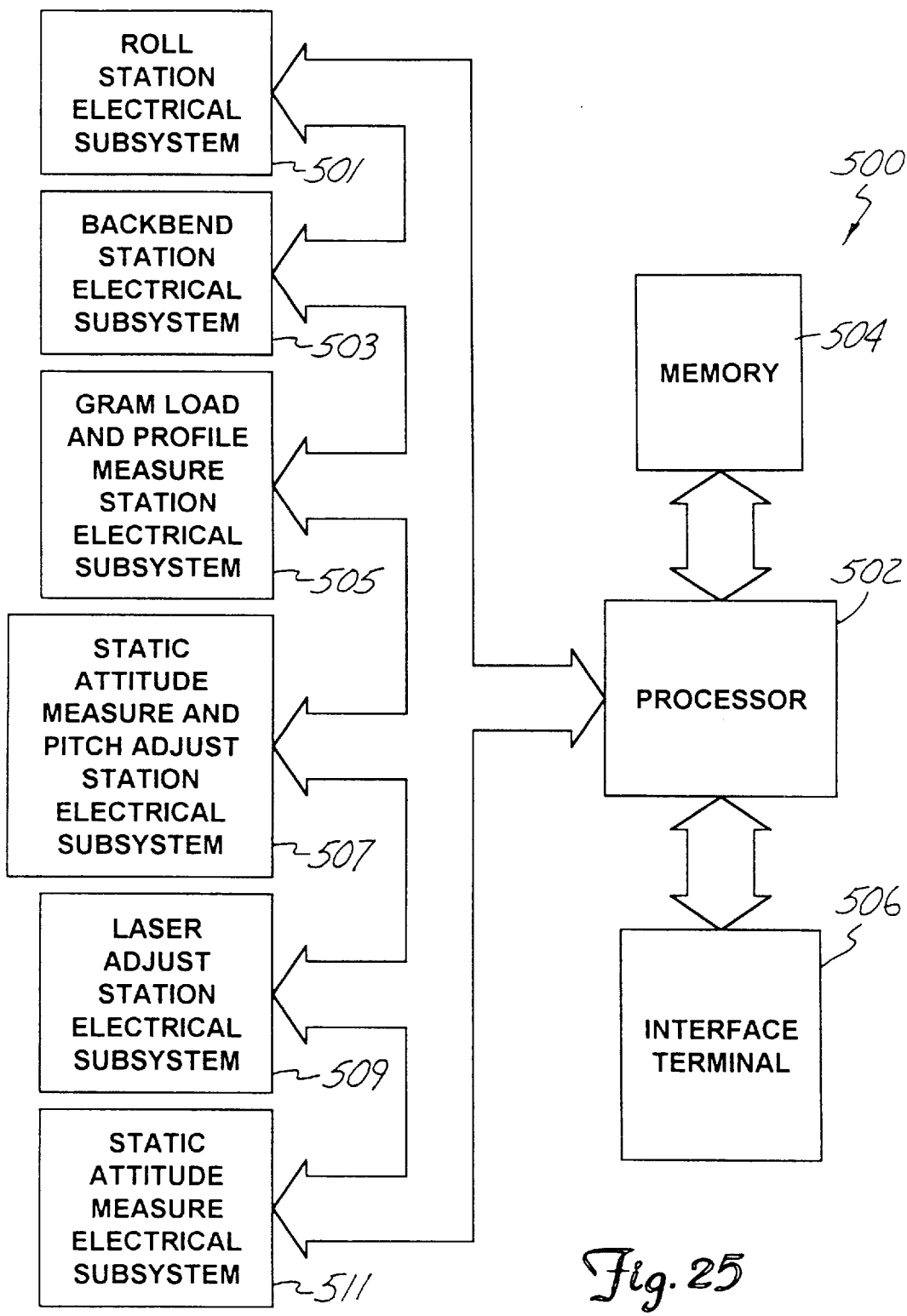
FIG. 25 is a block diagram of the electrical subsystem of the suspension adjust equipment shown in FIG. 11.
Figure 26:
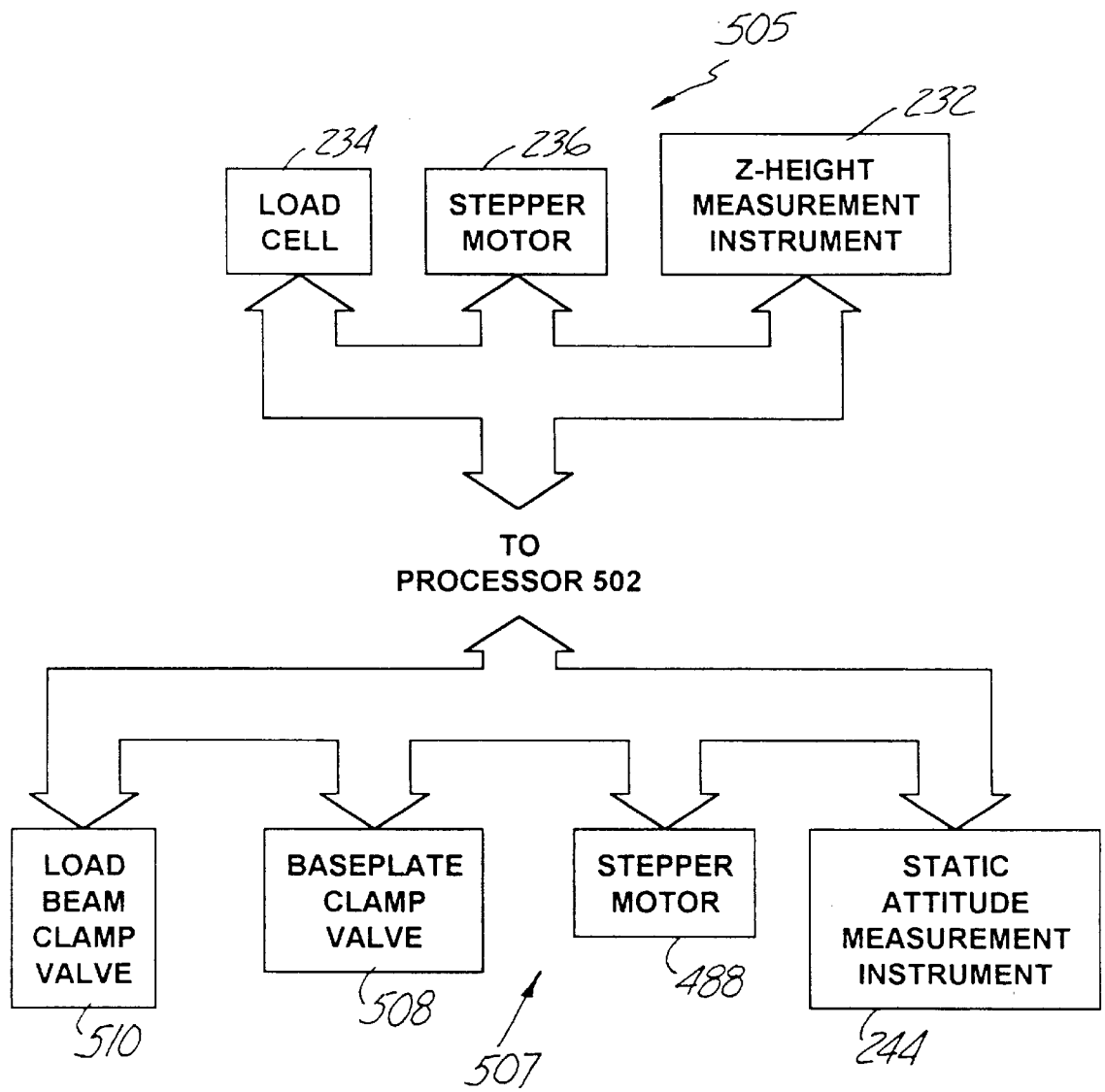
FIG. 26 is a detailed block diagram of the electrical subsystems of the gram load and profile measure station and the static attitude measure and pitch adjust station shown in FIG. 25.

A control system 500 for controlling the operation of adjust equipment 200 is illustrated generally in FIG. 25. As shown, the control system 500 includes a digital processor 502 coupled to program memory 504 and interface terminal 506. The processor 502 is also interfaced to the electrical subsystems (i.e., the electrical components) of each station 102", 202, 204, 206, 208 and 210. In particular, processor 502 is interfaced to roll station electrical subsystem 501, backbend station electrical subsystem 503, gram load and profile measure station electrical subsystem 505, static attitude measure and pitch adjust station electrical subsystem 507, laser adjust station electrical subsystem 509 and static attitude measure station electrical subsystem 511. FIG. 26 illustrates in greater detail the electrical subsystems 505 and 507 of the gram load and profile measure station 204 and static attitude measure and pitch adjust station 206, respectively. As shown, the electrical subsystem 505 of the gram load and profile measure station 204 includes Z-height measurement instrument 232, load cell 234 and stepper motor 236. The electrical subsystem 507 of the static attitude measure and pitch adjust station 206 includes static attitude measurement instrument 244, stepper motor 488, baseplate clamp pneumatic valve 508 and load beam clamp pneumatic valve 510.

A static attitude adjust program executed by the processor 502 to perform static attitude measure and pitch adjust procedures is stored in memory 504. Baseplate clamp valve 508 couples a source of pressurized air (not shown) to pneumatic actuator 345 through fittings such as 512 (FIG. 12) and hoses such as 514 (not shown in FIG. 12). Similarly, load beam clamp valve 510 couples the source of pressurized air to pneumatic actuators 454 through fittings such as 516 and hoses such as 518.

The pitch adjust procedures are based upon the knowledge that the pitch of a flexure 20 of a suspension 14 can be predictably adjusted to a high degree of accuracy, repeatability and stability by bending the flexure upwardly or downwardly a predetermined amount beyond its range of elastic deformation (i.e., plastic deformation) with respect to the adjacent rigid region 26 of the load beam 16. The magnitude of the change in pitch generated by this procedure is dependent upon the distance or degree to which the flexure 20 is bent within its range of plastic deformation.

Accordingly, suspension adjust data representative of desired pitch angle changes as a function of flexure bend positions is stored in memory 504. The flexure bend positions are positions to which the flexure 20 (or load beam 16) of a suspension 14 is driven upwardly or downwardly by pitch adjust mechanism 242 from its then-current position. The flexure bend positions can be correlated to the number of steps motor 488 must be driven to raise or lower bending assembly 490 from its clamping position to position the pins 496 at the desired bend positions. Also stored in memory is data representative of the nominal or desired pitch of flexure 20.

Figure 27:
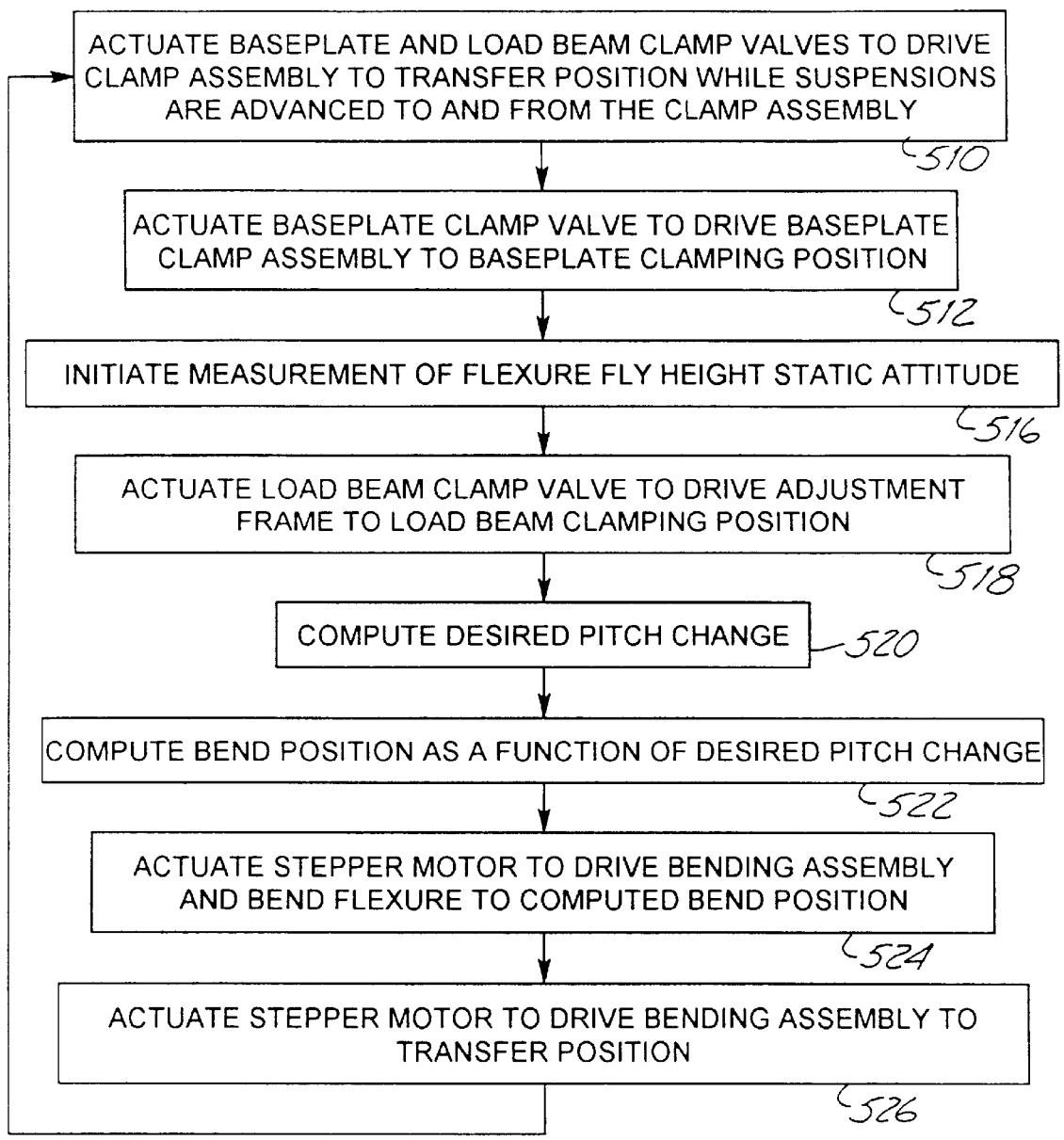
FIG. 27 is a flow diagram of the static attitude measure and pitch adjust procedures performed by the static attitude measure and pitch adjust station shown in FIG. 11.

FIG. 27 is a flow diagram illustrating the static attitude measure and pitch adjust procedures performed by station 206. The procedure begins with the transfer of a suspension 14 to be measured and pitch adjusted into the suspension clamp assembly 240 while the clamp assembly is in the suspension transfer position shown in FIG. 13A (step 510). Processor 502 causes the clamp assembly 240 to be in the suspension transfer position by actuating baseplate clamp valve 508 in such a manner that pneumatic actuator 354 retracts its actuator arm 360 and drives baseplate clamp assembly 248 upwardly to a retracted position. Simultaneously, processor 502 actuates load beam clamp valve 510 in such a manner that pneumatic actuators 454 retract their actuator arms 466 and drive load beam clamp assembly 250 upwardly to a retracted position against the bias forces of springs 472. When the baseplate clamp assembly 248 is in the retracted position the clamp pad assembly 370 will be biased to its extended position shown in FIG. 23A, while the spring assembly 310 will bias rod 308 at the baseplate clamping region 258 on the base 252 to the extended position shown in FIG. 17. The lower surface and ridges 390 of the baseplate clamp assembly frame plate 362 are spaced from the upper surface of the base assembly stop block 270 when the baseplate clamp assembly 248 is in the retracted position. When the load beam clamp assembly 250 is in its retracted position the elevator pin 442 extends through bore 478 and beyond the load beam clamp pad 474. Spring assembly 338 biases plunger 332 upwardly to an extended position shown in FIG. 17 at which it projects beyond the clamp surface 322 when the load beam clamp assembly 250 is in the retracted position. As shown in FIG. 13A, when the clamp assembly 240 is in its retracted position there is sufficient clearance between the baseplate clamp ball 414 and the baseplate clamp pad 300, and between the load beam clamp pad 474 and the load beam plunger 332, to allow suspensions 14 to be advanced into and out of the clamp assembly.

Figure 13B:
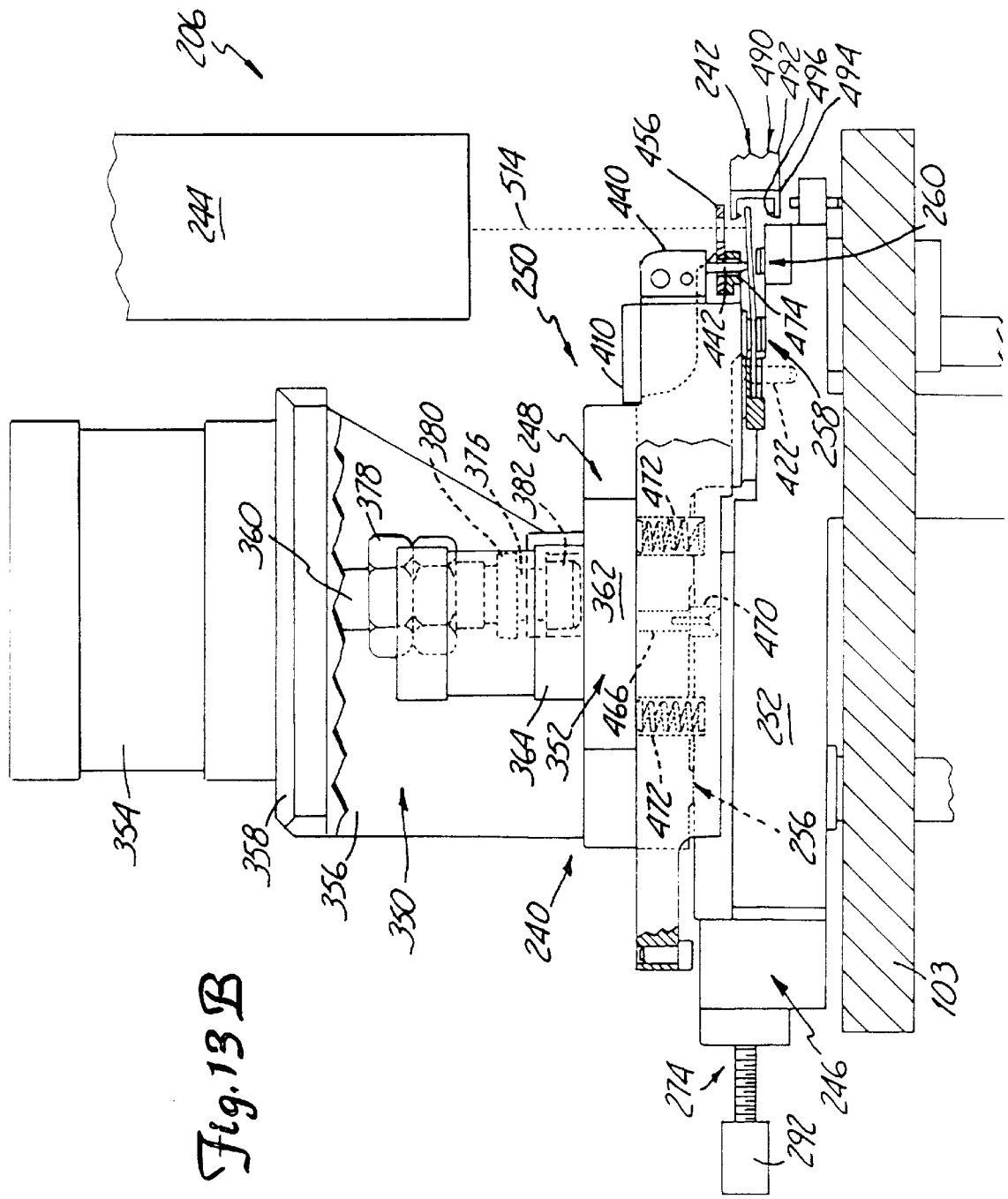

After a suspension 14 to be measured and adjusted has been advanced into the clamp assembly 240, processor 502 actuates baseplate clamp valve 508 in such a manner as to cause pneumatic actuator 354 to extend its actuator arm 360 and drive baseplate clamp frame assembly 352 downwardly through a baseplate clamping stroke to the baseplate clamping position shown in FIG. 13B (step 512). Locating pins 422 extend downwardly from the functional clamp assembly frame plate 362 a greater distance than the clamp pad assembly 370 in its extended position, so as the baseplate clamp frame assembly 352 is moving downwardly, the locating pins will enter apertures 35 in the suspension carrier strip 34 and register the suspension 14 over the baseplate clamp pad 300. With continued downward motion of the clamp frame assembly 352, the flat lower surface of clamp ball 414 will engage the mounting region 18 of the suspension 14 and force the mounting boss 23 into the registration bore 306, thereby forcing rod 308 downwardly against the bias force of spring assembly 310 and urging the baseplate 21 of the suspension into contact with the planar surface of the baseplate clamp pad 300. With still further downward motion of the clamp frame assembly the clamp pad assembly 370 is forced toward its retracted position within the frame plate 362 against the bias force of spring 398 (FIG. 23B) to securely clamp the mounting region 18 of the suspension 14 to the baseplate clamp pad 300 (i.e., functionally clamp). This downward motion also causes elevator pin 442 to engage the rigid region 26 of the load beam 16 and elevate the load beam from its free state.

When the clamp frame assembly 352 is in the baseplate clamping position the ridges 390 on the lower surface of the baseplate clamp assembly frame plate 362 are engaged with the upper surface of the base assembly stop block 270. By adjusting the height of the stop block 270 with respect to the base 252, the position of the tip of elevator pin 442 can be set so the elevator pin drives the suspension 14 to fly height when the clamp frame assembly 352 is in the baseplate clamping position.

After the baseplate 21 of the suspension 14 is functionally clamped to base 252 and flexure 20 elevated to fly height processor 502 actuates static attitude measurement instrument 244. As shown in FIG. 13B, static attitude measurement instrument 244 generates and directs a light beam 514 onto the flexure 20 of the suspension. In the embodiment shown the light beam 514 passes through aperture 480 so that only light reflected off the flexure 20 of the suspension 14 is directed back to the instrument 244. Static attitude data, including both roll data characteristic of the pre-adjust fly height roll of the flexure 20 and pitch data representative of the pre-adjust fly height pitch of the flexure is thereby provided to processor 502 by the instrument 244 (step 516).

After the static attitude measurement is completed, processor 502 actuates load beam clamp valve 510 in such a manner as to cause pneumatic actuators 454 to release their actuator arms 466 and allow springs 472 to force the adjustment frame 450 downwardly through a load beam clamping stroke to the load beam clamping position shown in FIG. 13C (step 518). As the adjustment frame 450 moves through its clamping stroke the load beam clamp pad 474 engages the rigid region 26 of suspension 14 and forces the rigid region downwardly from the fly height position at which it was held by the elevator pin 442 and into engagement with the upper surface of ejector rod 334. With continued motion of the adjustment frame 450 the clamp pad 474 clamps the rigid region 26 of the suspension 14 into clamp surface 322 of the base 252. Ejector rod 334 is forced to a retracted position within base 252 when the rigid region 26 of the suspension 14 is clamped to surface 322.

Following the static attitude measurement, processor 502 also computes the difference between the measured pre-adjust pitch and the nominal pitch to determine the desired pitch change (Dpitch) (i.e., the amount of pitch adjustment to be made by station 206) (step 520). Processor 502 then accesses the suspension adjust data as a function of the desired pitch change to compute or otherwise determine a position referred to as "Bump." Bump is the flexure bend position which will produce the desired pitch change (step 522). As described in greater detail below, Bump is functionally related to the desired changes in the height (Dheight), roll (Droll) and gram load (Dgram) as well as Dpitch. The mathematical algorithm used by processor 502 therefore computes Bump as a function of Pitch, Dheight, Droll and Dgram. In the embodiment described herein, processor 502 computes Bump in terms of the required number of steps that stepper motor 488 must be driven to raise or lower the bending assembly 490 from its transfer position. Stepper motor 488 is then actuated by processor 502 in such a manner to drive the bending assembly 490 and position the tips of pins 496 at the desired flexure bend positions (step 524). Stepper motor 488 is then actuated to drive bending assembly 490 back to the transfer position to complete the pitch adjust procedure (step 526). Flexure 20 is thereby bent to a position that will (after the laser adjust procedure performed at station 208 and described below) provide the flexure with the desired or nominal pitch angle when the flexure is elevated to fly height.

The static attitude measurement and pitch adjust procedure is completed when the baseplate clamp valve 508 and load beam clamp valve 510 are again actuated by processor 502 to drive suspension clamp assembly 240 back to its suspension transfer position by retracting the clamp frame assembly 352 and the adjustment frame 450 (step 510). As the adjustment frame 450 is retracted from its clamping position the spring assembly 338 will return to its extended position and force plunger 332 upwardly to lift the rigid region 26 of the suspension 14 from the clamp surface 322 of base 252. Similarly, as the clamp frame assembly 352 is retracted from its baseplate clamping position the spring assembly 310 will force rod 308 upwardly to lift the suspension baseplate boss 23 from the bore 306 and release the suspension 14 from the clamp assembly 240. The static attitude-measured and pitch-adjusted suspension 14 can then be advanced from the clamp assembly 240. The static attitude measurement and pitch adjust procedure described above can then be repeated on another suspension 14.

Laser adjust station 208 can be described with reference to FIGS. 11 and 28–31. As shown, laser adjust station 208 includes a baseplate clamp assembly 540, load beam positioning assembly 542, load beam clamping assembly 544, optical fibers 546, Z-height measurement instrument 548 and gram load measurement assembly 550. Baseplate clamp assembly 540 includes a fixed base 552 and a moving clamping member 554. Base 552 is rigidly mounted with respect to the walking beam 101" and has a baseplate clamp pad 556 configured to receive and register the baseplate 21 of suspension 14. A spring-biased plunger 558 is located in the center of the clamp pad 556. Moving clamping member 554 includes a clamp pad 560 and is reciprocally driven between transfer (open) and clamping (closed) positions with respect to base 552 in synchronization with the motion of walking beam 101". At the beginning of a laser adjust procedure, clamping member 554 is in its transfer position (not shown) spaced from base 552. The walking beam 101" then advances the suspension 14 to be adjusted into clamp assembly 540. After the suspension baseplate 21 is aligned with the clamp pad 556 by the walking beam 101", clamping member 554 is driven to the clamping position shown in FIGS. 28 and 30, functionally clamping the baseplate between clamp pads 556 and 560. The mounting region of the suspension 14 is thereby clamped and rigidly held in the laser adjust station 208 throughout the laser adjust procedure. Following the completion of the laser adjust procedure and post-adjust Z-height and gram load measurements, the clamping member 554 is driven to its transfer position to release the suspension 14 and allow the suspension to be advanced from the laser adjust station 208 by the walking beam 101".

Z-height measurement instrument 548 can be identical to the instrument 232 described above with reference to gram load and profile measure station 204, and is positioned and configured to measure the height parameter of suspensions 14 clamped at clamping assembly 540. Gram load measurement assembly 550 includes a load cell 562 having a measurement probe 582. Drive assembly 564 includes an arm assembly 566, arm mount 568 and pneumatic actuator 570. Arm mount 568 is supported by a frame 572. Pneumatic actuator 570 is mounted to a frame 574 at a location above the arm mount 568, and includes a piston (not visible) connected by collar 576 to a rod 578 which extends through the arm mount. The end of arm assembly 566 which is located below arm mount 568 is fixedly connected to rod 578 and includes guide shafts 580 which extend upwardly into linear bearings (not visible) in the arm mount. Load cell 562 is mounted to the end of arm assembly 566 adjacent to clamping assembly 540 to position the measurement probe 582 of the load cell above the flexure 20 of suspensions 14 clamped to the clamping assembly.

Pneumatic actuator 570 is actuated by control system 500 to drive arm assembly 566 and load cell 562 between a retracted position and an extended or measurement position. In the retracted position the load cell 562 is raised above the load beam positioning assembly 542 to provide sufficient clearance for the suspensions 14 to be advanced into and out of the laser adjust station 208 by the walking beam 101". In the measurement position the load cell 562 is driven downwardly to engage the measurement probe 582 with the flexure 20 of the suspension 14 and elevate the suspension to fly height. The extent of the downward motion of load cell 562 is limited by the engagement of the collar 576 with a stop block 584 on the top of arm mount 568. The vertical position of the stop block 584 with respect to arm mount 568, and therefore the fly height to which suspensions 14 are elevated when the load cell 562 is driven to its extended position, can be adjusted through the use of micrometer 586.

Load beam clamping assembly 544 includes pneumatic actuator 590, arm 592 and bracket 594. Pneumatic actuator 590 is fixedly mounted to frame 596 and includes a piston 598 mounted to an end of arm 592 by collar 600. Bracket 594 is mounted to the end of arm 592 opposite collar 600. Optical fibers 546 and load beam clamp pad assembly 602 are mounted to bracket 594. In the embodiment shown, load beam clamp pad assembly 602 includes three pogo pins 604 which are biased downwardly toward the load beam positioning assembly 542 by springs 606. As perhaps best shown in FIG. 28, optical fibers 546 are mounted to bracket 594 in such a manner as to position the ends of the fibers above the legs of the spring region 24 of the suspension 14 clamped at station 208. Clamp pad assembly 602 is mounted to the bracket 594 in such a manner as to position the assembly above the rigid region 26 of the suspension 14 clamped at station 208. Pneumatic actuator 590 is actuated by control system 500 and drives the arm 592, optical fibers 546 and clamp pad assembly 602 between a retracted position and an extended or load beam clamping position.

Load beam positioning assembly 542 includes stepper motors 610A–610C and positioning pin assemblies 612A–612C which are driven by the motors. Positioning pin assemblies 612A–612C include arms 614A–614C connected to the respective motors 610A–610C, and positioning pins 616A–616C which are mounted to and extend upwardly from the ends of the arms. As perhaps best shown in FIGS. 29 and 31, the arms 614A–614C are configured to position the pins 616A–616C below the rigid region 26 of suspensions 14 clamped at station 208. In the particular embodiment shown, pins 616A and 616B are positioned below a central portion of the rigid region 26 along a generally transverse load beam axis, and symmetrically spaced from the central longitudinal load beam axis. Pin 616C is positioned on the central longitudinal axis below a rear portion of the rigid region 26 and adjacent to the spring region 24. Stepper motors 610A–610C drive positioning pin assemblies 612A–612C between retracted positions and extended adjust positions. When in the retracted positions, positioning pins 616A–616C are at positions which provide sufficient clearance for suspensions 14 to be advanced into and out of station 208.

Figure 32:
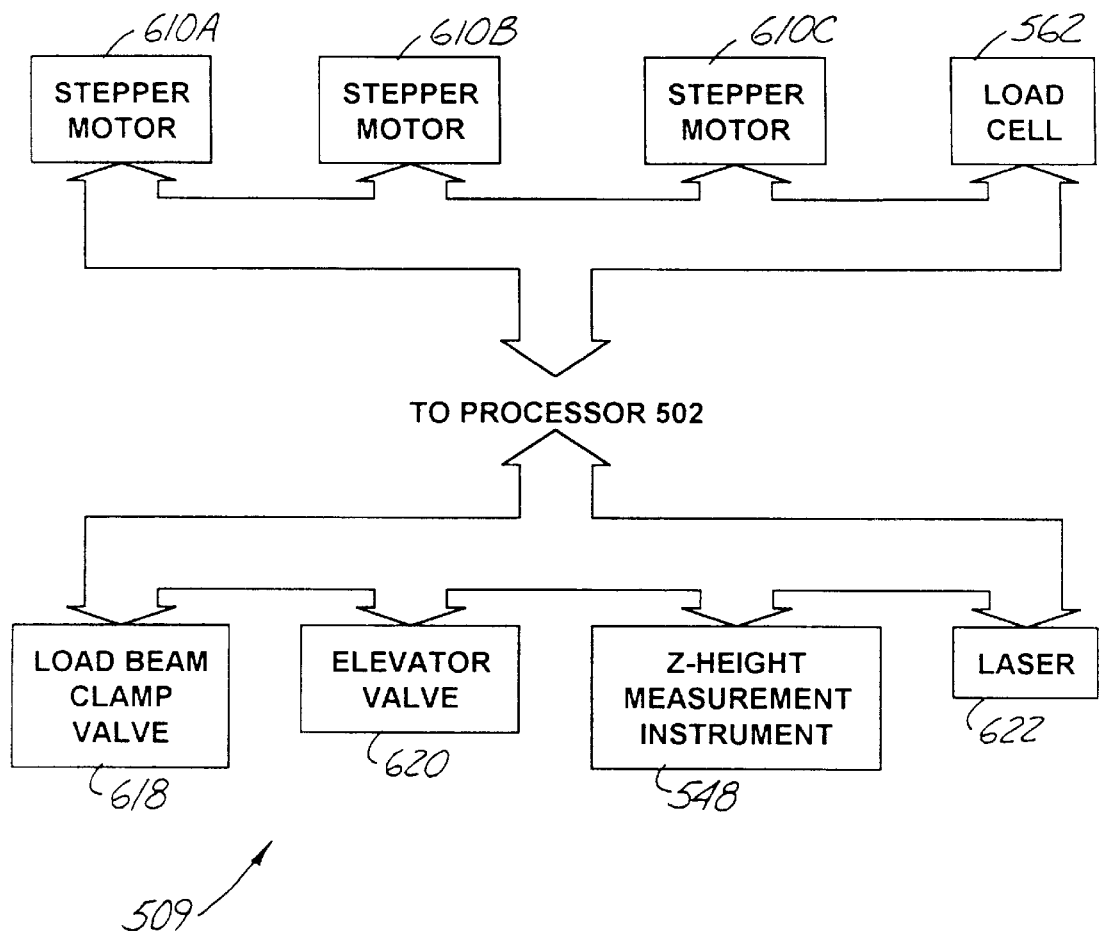
FIG. 32 is a detailed block diagram of the electrical subsystem of the laser adjust station shown in FIG. 25.

The electrical subsystem 509 of laser adjust station 208 is illustrated generally in FIG. 32. As shown, the electrical subsystem 509 includes stepper motors 610A–610C, load cell 562, Z-height measurement instrument 548, load beam clamp valve 618, load cell elevator valve 620 and diode laser 622. Load beam clamp valve 618 couples a source of pressurized air (not shown) to pneumatic actuator 590 through hoses such as 624 (FIG. 11). Similarly, valve 620 couples the source of pressurized air to pneumatic actuator 570 through the hoses 624.

The laser adjust procedure performed by station 208 is based upon the discovery that the height (profile geometry), roll and gram load of suspension 14 can be predictably adjusted to a high degree of accuracy, repeatability and stability by driving the rigid region 26 to a predetermined position and orientation from its free state to stress the spring region 24, and to relieve the stresses by heating the spring region (e.g., through the application of an infrared laser beam) while the load beam is held in the predetermined position and orientation. The magnitude of the Z-height, roll and gram load change generated or induced by this process is dependent upon the amounts and distribution of the stress to which the spring region 24 is subjected before being stress relieved, and this stress level and distribution can be controlled by the position and orientation of the load beam with respect to its free state position and orientation.

Accordingly, adjust data representative of desired fly height gram load, height and roll changes as a function of load beam adjust positions and orientations is stored in the memory 504 of control system 500. The load beam adjust positions and orientations are positions and orientations to which the load beam 26 is driven by positioning assembly 542 from its free state position. In the preferred embodiment described herein the adjust data characterizes a series of linear and nonlinear equations describing gram load, height and roll changes as a function of adjust positions and orientations. The load beam adjust positions are planar positions established by the positioning pins 616A–616C (i.e., the tips of positioning pins 616A–616C define a planar adjust position). Stated another way, in the embodiment described herein the positioning pins 616A–616C are driven to positions which support the load beam 26 of suspensions 14 in planar positions and orientations during the laser adjust procedures. The adjust position of each pin 616A–616C can be correlated to the number of steps motors 610A–610C, respectively, are driven from their retracted positions to position the pins at the desired adjust positions. Data representative of desired or nominal values of fly height gram load, height and roll for suspensions 14 are also stored in memory 504.

Figure 33:
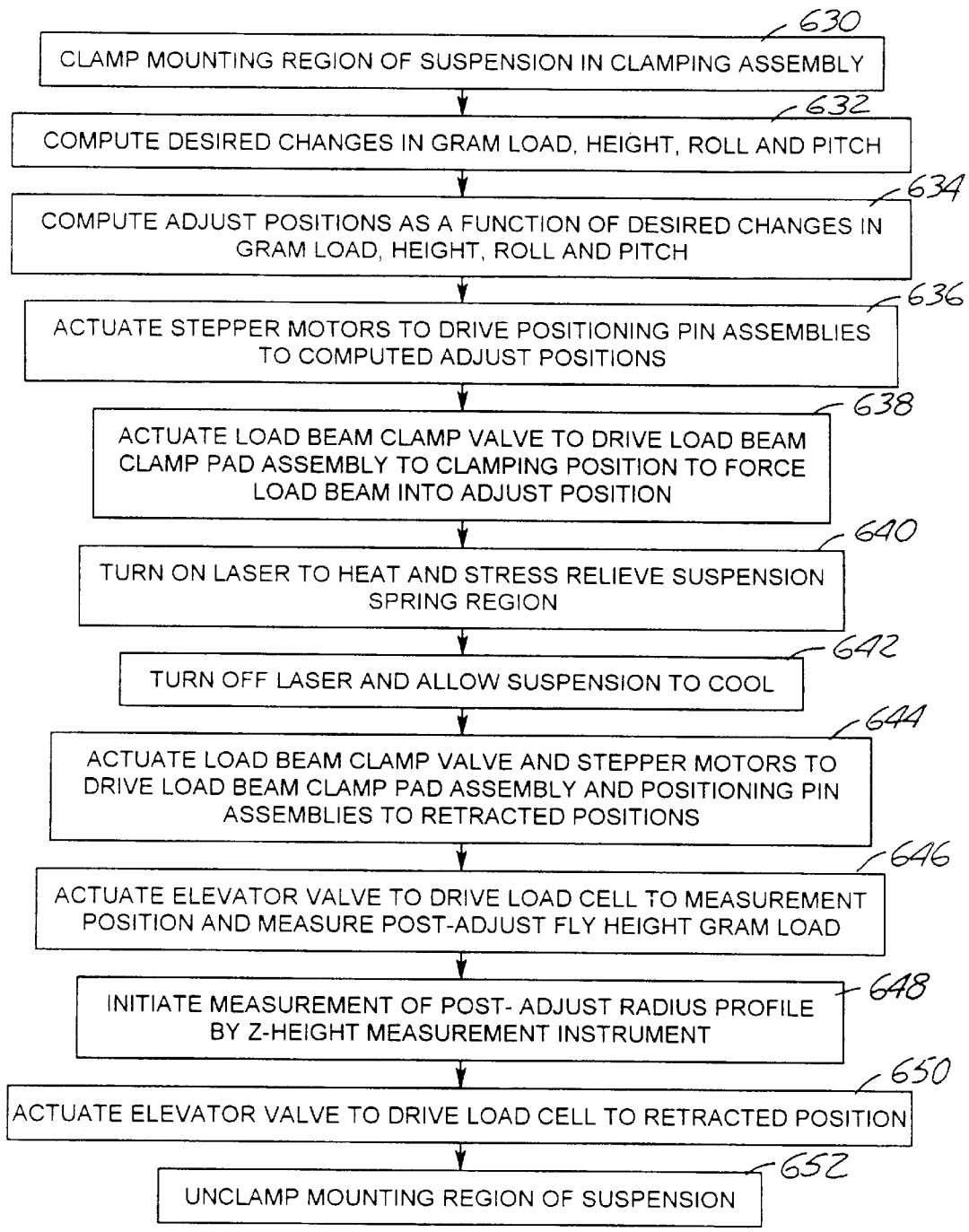
FIG. 33 is a flow diagram of the laser adjust procedure performed by the laser adjust station shown in FIG. 11.

FIG. 33 is a flow diagram illustrating the laser adjust procedure performed by station 208 on suspensions 14 clamped at clamping assembly 540. The procedure begins with the transfer of a suspension 14 to be height, gram load and roll adjusted into the clamping assembly 540 when the clamping member 554 is in its transfer position, and closing the clamping member to functionally clamp the mounting region 18 to base 552 between clamp pads 560 and 556 (step 630). The differences (i.e., desired changes) between the measured pre-adjust and desired or nominal gram load, height, roll and pitch values (Dgram, Dheight, Droll and Pitch, respectively) are computed by processor 502 (step 632). Processor 502 then accesses the adjust data as a function of the desired changes in gram load, height, roll and pitch to compute or otherwise determine the adjust positions of pins 616A–616C (step 634). Stepper motors 610A–610C are then actuated by processor 502 in such a manner as to drive the positioning pin assemblies 612A–612C upwardly and position the pins 616A–616C at the adjust positions (step 636).

Figure 28:
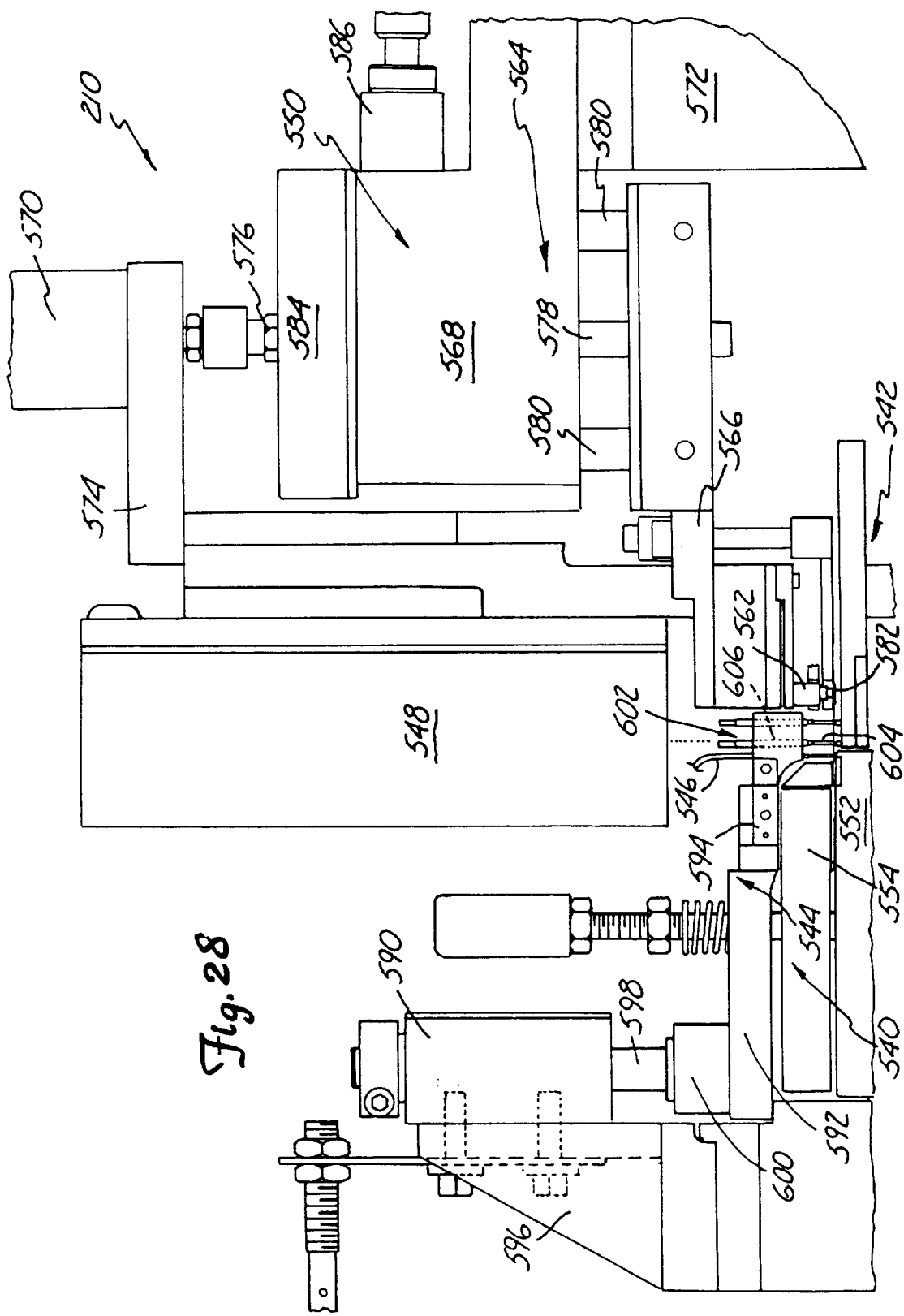
FIG. 28 is a side view of portions of the laser adjust station shown in FIG. 11.
Figure 29:
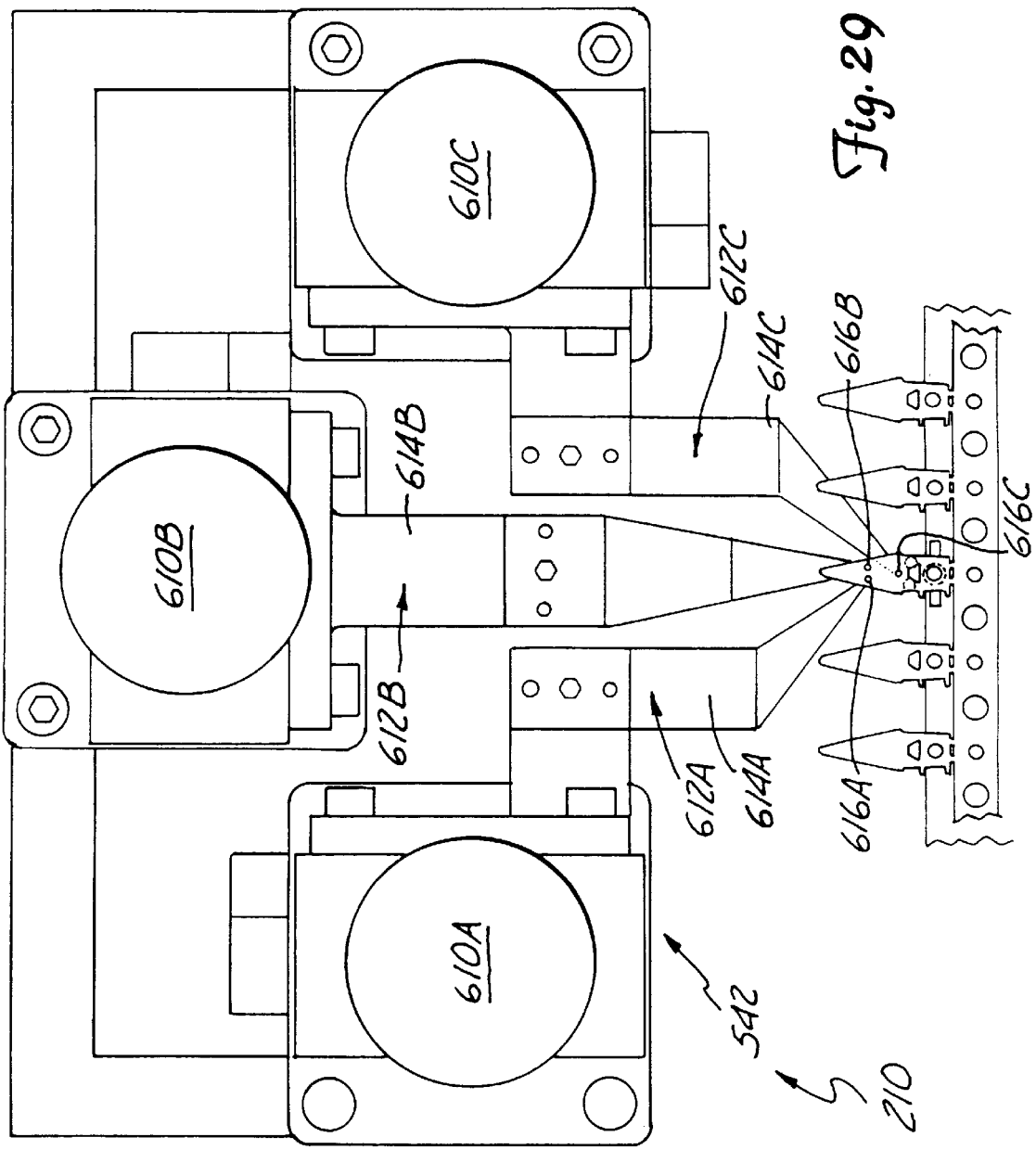
FIG. 29 is a detailed top view of portions of the laser adjust station shown in FIG. 11.
Figure 30:
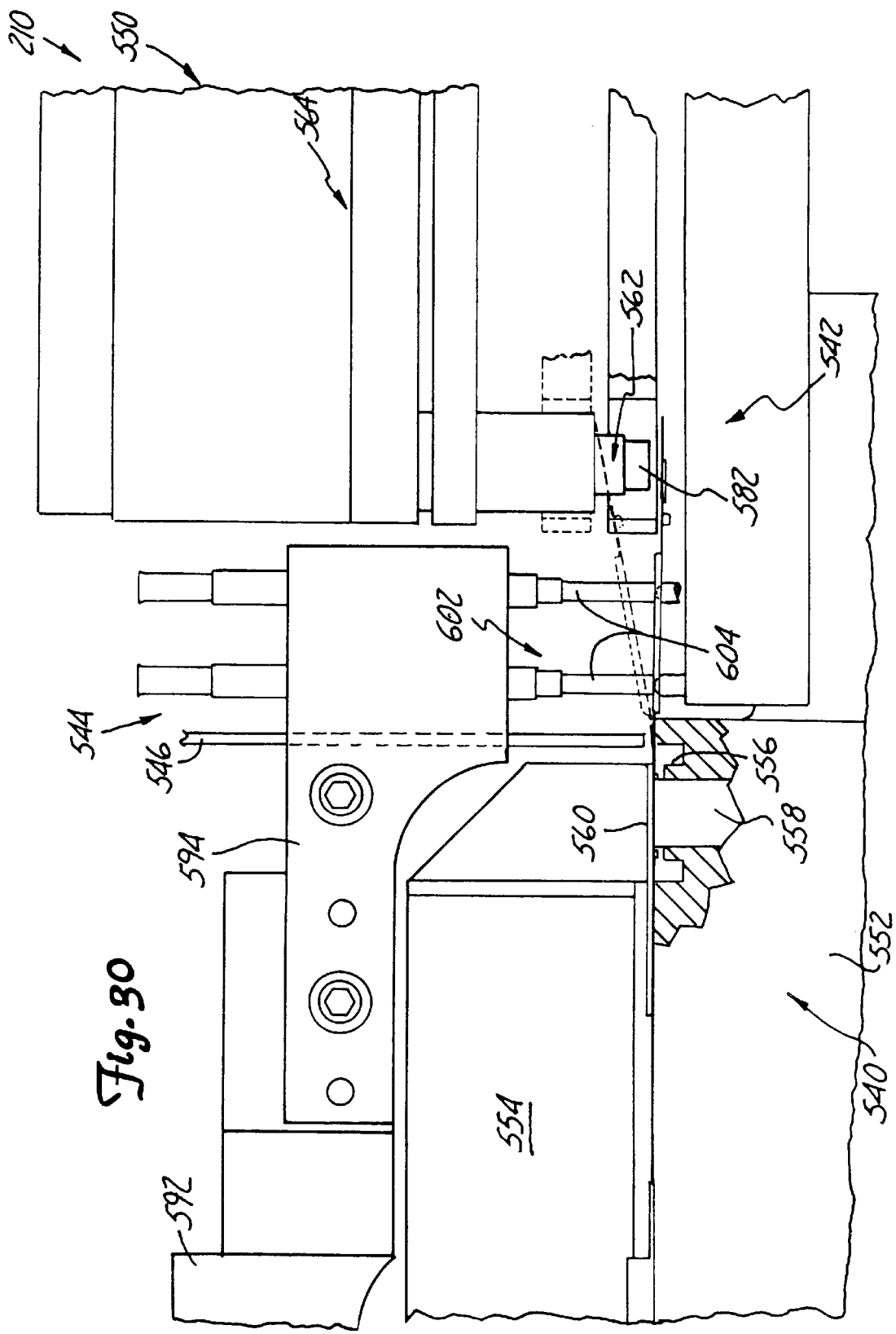
FIG. 30 is a detailed side view of the laser adjust station shown in FIG. 28.
Figure 31:
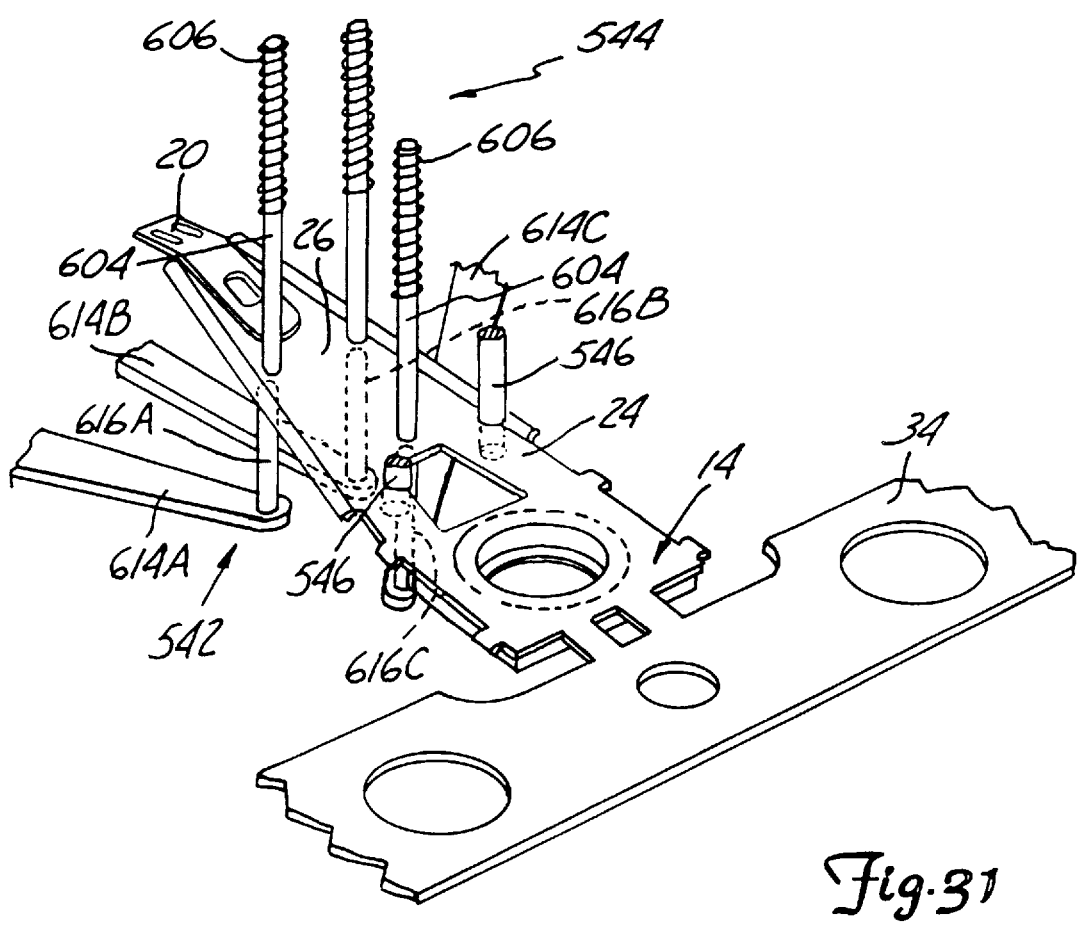
FIG. 31 is a detailed schematic view of a suspension and portions of the laser adjust station shown in FIG. 11, illustrating the laser adjust procedure implemented by the laser adjust station.

After the positioning pin assemblies 612A–612C are driven to their adjust positions, processor 502 actuates load beam clamp valve 618 in such a manner as to cause pneumatic actuator 590 to drive arm 592 and the load beam clamp pad assembly 602 on the end thereof from its retracted position to the load beam clamping position shown in FIGS. 28 and 30 (step 638). The pogo pins 604 of clamp pad assembly 602 are located directly above positioning pins 616A–616C. As the clamp pad assembly 602 is lowered from its retracted position the pogo pins 604 will engage the upper surface of the rigid region 26 of suspension 14 and force suspension into the adjust position with the lower surface of the rigid region engaged with the tips of positioning pins 616A–616C. The springs 606 apply a sufficiently great bias force to the pogo pins 604 that the pogo pins will force the rigid region 26 of the suspension 14 into engagement with positioning pins 616A–616C. With continued downward motion of the clamp pad assembly 602 after the pogo pins have forced the load beam 16 into the adjust position, the pogo pins will retract into bracket 594 against the bias force of the springs 606.

With the load beam 26 held at the adjust position, processor 502 actuates laser 622 for an exposure time period and causes the spring region 24 to be heated and stress relieved by the application of infrared light directed to the spring region through the optical fibers 546 (step 640). Laser 622 is turned off by the processor 502 at the end of the exposure period and the suspension allowed to cool (about 30 msec. in one embodiment) (step 642). To complete this laser adjust procedure processor 502 actuates load beam clamp valve 618 and stepper motors 610A–610C to drive the clamp pad assembly 602 and positioning pin assemblies 612A–612C to their retracted positions (step 644).

Post-adjust gram load and z-height (for profile geometry characterization) measurements are taken at station 208 following the laser adjust procedure. Following the laser adjust procedure the elevator valve 620 is actuated by processor 502 to drive load cell 562 downwardly to the measurement position at which the suspension 14 is elevated to fly height. Processor 502 then takes a post-adjust fly height gram load measurement from the load cell 562 (step 646). With the suspension elevated to fly height processor 502 also actuates the Z-height measurement instrument and takes a post-adjust radius region profile measurement (step 648). Following these post-adjust measurements the processor 502 actuates the elevator valve 620 to drive the load cell back to its retracted position (step 650). Clamping member 554 is then driven to its transfer position (opened) to allow the adjusted and measured suspension 14 to be advanced out of the clamping assembly 540 by walking beam 101" (step 652).

Figure 34:
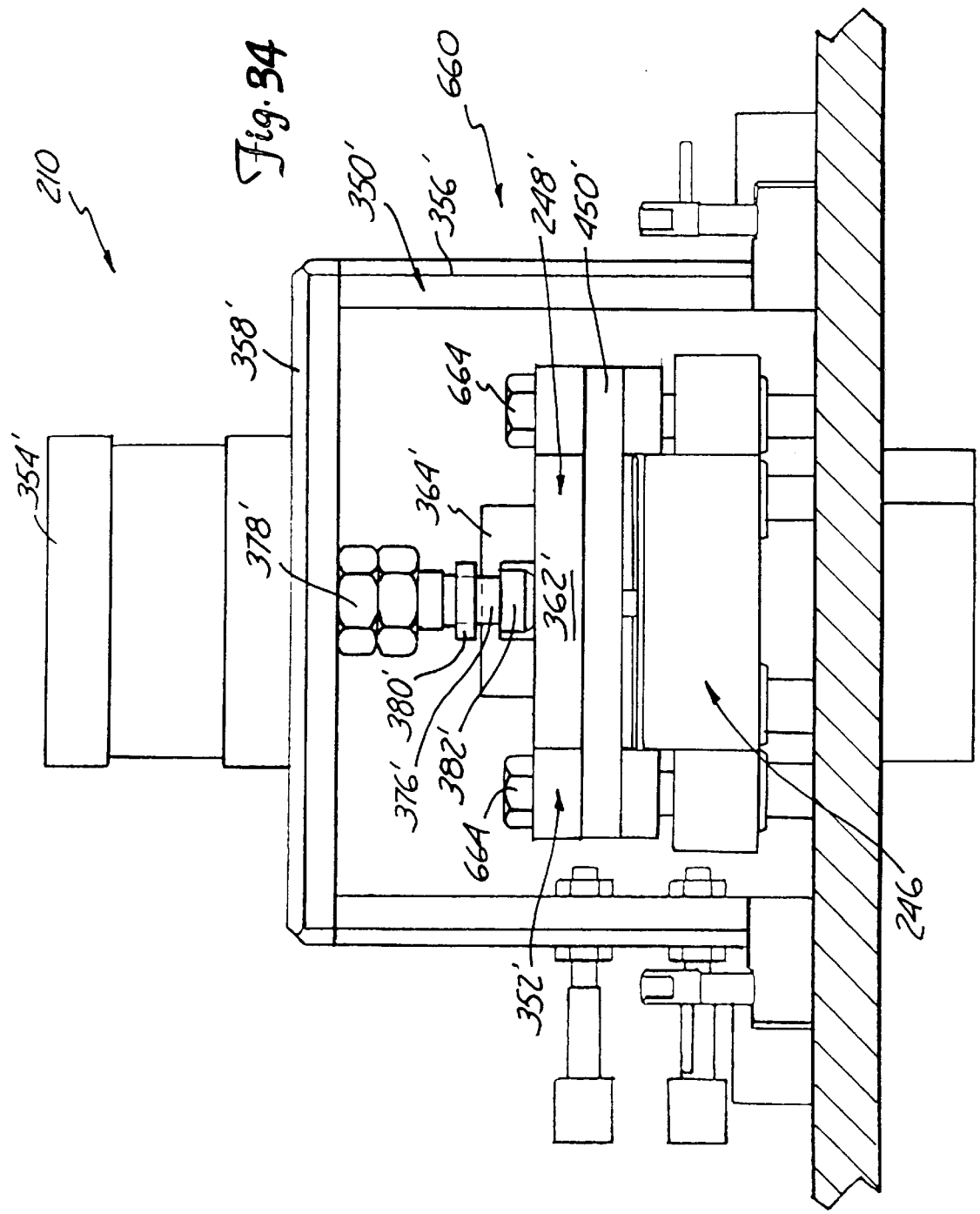
FIG. 34 is a view of the rear side of the suspension clamp assembly of the static attitude measure station shown in FIG. 11.
Figure 35:
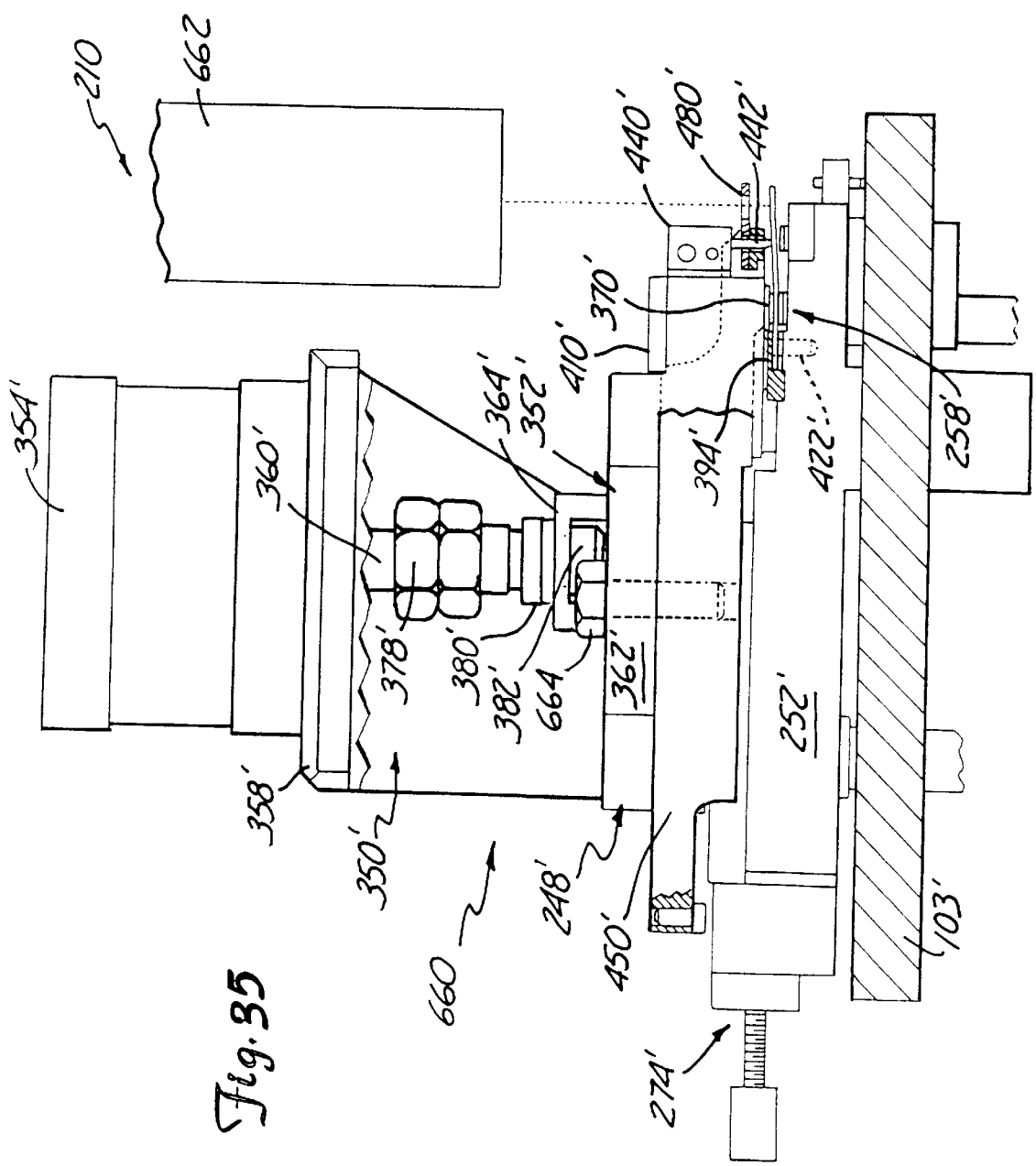
FIG. 35 is a side view of the static attitude measure station with portions thereof broken away and shown in section, illustrating the clamp assembly in its measure clamping position.

Static attitude measurement station 210 can be described with reference to FIGS. 11, 34 and 35. As shown, station 210 includes suspension clamp assembly 660 and static attitude measurement instrument 662. Static attitude measurement instrument 662 can be identical in structure, function and operation to instrument 244 described above with reference to station 206. With the exception of the differences described immediately below, suspension clamp assembly 660 can be identical in structure, function and operation to suspension clamp assembly 240 described above with reference to station 206, and similar features are identified by common but primed (i.e., "x'") reference numerals. The differences between clamp assemblies 660 and 240 are due to the fact that no flexure pitch adjustment is performed at static attitude measurement station. No load beam or adjustment clamping operations are therefore performed by clamp assembly 660, so the adjustment frame 450' is not used and is fixedly mounted to the frame plate 362' of clamping frame assembly 352' by bolts 664. Unlike suspension clamp assembly 240 of station 206, suspension clamp assembly 660 does not include pneumatic actuators such as 454 or biasing springs such as 472 for driving the frame plate 450' to a load beam clamping position.

Figure 36:
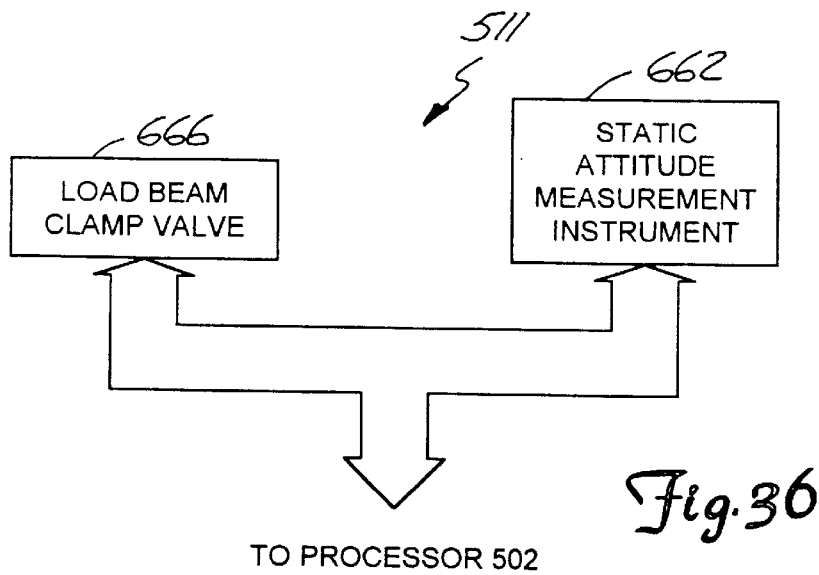
FIG. 36 is a detailed block diagram of the electrical subsystem of the static attitude measurement station shown in FIG. 25.

FIG. 36 is a block diagram of the electrical subsystem 511 of static attitude measurement station 210. As shown, electrical subsystem 511 includes static attitude measurement instrument 662 and functional clamp valve 666, both of which are interfaced to processor 502.

Figure 37:
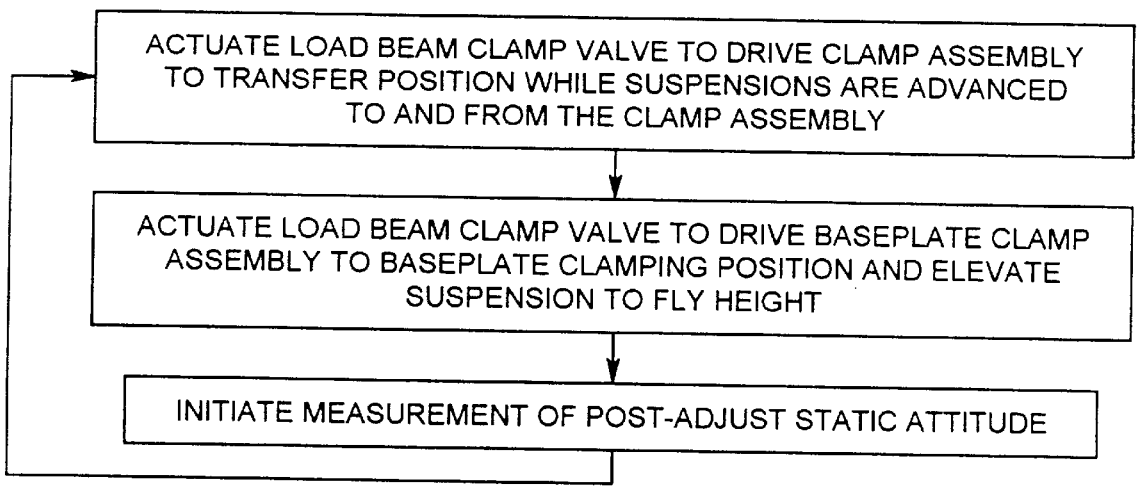
FIG. 37 is a flow diagram of the static attitude measurement procedure performed by the static attitude measure station shown in FIG. 11.

FIG. 37 is a flow diagram illustrating the static attitude measurement procedure performed by station 260. The procedure begins with the transfer of a suspension 14 to be measured into the suspension clamp assembly 660 while the clamp assembly is in the suspension transfer position (not shown) (step 668). Processor 502 causes the clamp assembly 660 to be in the suspension transfer position by actuating load beam clamp valve 666 in such a manner that pneumatic actuator 354' retracts its actuator arm 360' and drives load beam clamp assembly 248' upwardly to a retracted position. After a suspension 14 to be measured has been advanced into the clamp assembly 660, processor 502 actuates load beam clamp valve 666 in such a manner as to cause pneumatic actuator 354' to extend its actuator arm 360' and drive load beam clamp frame assembly 352' downwardly to the baseplate clamping position shown in FIG. 35 (step 670). When the clamp frame assembly 352' is at its clamping position the elevator pin 442' engages the rigid region 26 of the load beam 16 and elevates the load beam 16 from its free state to fly height.

After the baseplate 21 of the suspension 14 is functionally clamped to base 252' and its flexure 20 elevated to fly height processor 502 actuates static attitude measurement instrument 662. As shown in FIG. 35, instrument 662 generates and directs a light beam onto the flexure 20 through aperture 480'. Post-adjust static attitude data, including both roll data characteristic of the post-adjust fly height roll of the flexure 20 and pitch data representative of the post-adjust fly height pitch of the flexure is thereby provided to processor 502 by the instrument 662 (step 672). The post-adjust static attitude measurement is completed when the load beam clamp valve 666 is again actuated by processor 502 to drive suspension clamp assembly 660 back to its suspension transfer position by retracting the clamp frame assembly 352' (step 668). The static attitude-measured suspension 14 can then be advanced from the clamp assembly 660, and the static attitude measurement procedure described above repeated on the next suspension.

If the post-adjust gram load, height or static attitude of the suspension 14 is outside the desired specification ranges, the suspension is rejected and cut from the carrier strip at the out-of-specification detab station. The carrier strips 34 with the remaining in-specification suspensions 14 are then removed from equipment 200 and transported to a cleaning station (not shown). Following the cleaning operations the suspensions 14 are transported to a final detab station where all the remaining suspensions 14 are cut from the carrier strip 34, and subsequently packaged for shipment to customers. In other embodiments, the suspensions 14 are also heat treated following their adjustment on equipment 200.

A detailed description of the algorithm executed by processor 502 to control the pitch adjust procedure at station 206 and the gram load, height and roll adjust procedure (i.e., the laser adjust procedure) at station 208 follows. The mathematical equations included in the algorithm and referred to below are set out in FIG. 38. As mentioned above, the changes in pitch, gram load, height and roll that made at stations 206 and 208 are designated Pitch, Dgram, Dheight and Droll, respectively. These parameters are computed by processor 502 in accordance with Equations 1–4. The embodiment of the algorithm described herein makes use of four response variables designated "Load," "Bias," "Pivot" and "Bump." These response variables are defined in Equations 5–9 in terms of the relative pin positions of the pitch adjust mechanism 242 of station 206 and the load beam positioning assembly 542 of station 208 to minimize the amount of coupling or dependence.

Equations 9–12 are used to calculate Pivot, Bias, Load and Bump, respectively. As described in FIG. 38, in addition to the desired changes in pitch, gram load, height and roll, Equations 9–12 make use of weight factors "A"–"N" as well as computed constants "Constant", "$\alpha$" "p", "q", "Det", "u" and "v" which are set out in Equations 13–19. The numerical system represented by Equations 1–19 has been formatted so that there is only one set of real roots, and two pair of conjugate imaginary sets. This numerical system can be solved directly using a convolute transform, eliminating the need for any type of convergence computational technique.

It has been observed that there are subtle differences in the way that different types or designs of suspensions 14 respond to the pitch adjust procedure performed at station 206. To account for these differences, the exponent in Equation 12 used to calculate Bump includes the variable "Power". This variable Power is set for each type of suspension 14 during a setup procedure performed by processor 502. For example, when adjusting a Type 850 suspension 14 available from Hutchinson Technology Incorporated, Power is set equal to three. When adjusting a Type 1650 suspension 14 available from Hutchinson Technology Incorporated, Power is set equal to thirteen.

During the setup procedure processor 502 executes a teach routine to establish weight factors A–N. Processor 502 performs a full factorial with Load, Bias and Pivot during the setup procedure. Bump is varied independently of Load, Bias and Pivot during this setup procedure. During this setup procedure measured pre-adjust and post-adjust values of gram load, height, pitch and roll, as well as the associated adjust positions are stored and processed by Gaussian regression to compute initial values of weight factors A–N. By way of example, representative numerical values of weight factors A–N for a Hutchinson Technology Incorporated Type 850 suspension are listed below in Table 1. Weight factors A–N, and therefore the computed constants as well, are also updated on the basis of the differences between the desired gram load, height, pitch and roll of the suspensions 14, and the measured post-adjust values of gram load, height, pitch and roll, respectively, and on the basis of the associated adjust positions (i.e., correlation data). In one embodiment, the weight factors A–N are continually updated following the adjustment and post-adjust measurement of each suspension 14 using the historical correlation data from a predetermined number (e.g., eighty in one embodiment) of the most recently processed suspensions 14.

TABLE 1

| | |
|---|---|
| A = | $9.59655 \times 10^2$ |
| B = | 4.224 |
| C = | −33.378 |
| D = | 18.357 |
| E = | $-5.73643 \times 10^2$ |
| F = | −94.246 |
| G = | −56.948 |
| H = | −0.6379 |
| I = | 11.59 |
| J = | −0.05835 |

TABLE 1-continued

| | |
|---|---|
| K = | 0.1114 |
| L = | 0.57972 |
| M = | −3.457 |
| N = | 5.304 |

Suspension adjust equipment 700, another embodiment of the present invention, is illustrated generally in FIG. 39. As shown, equipment 700 includes a roll module 702 and an adjust module 704. Roll module 702 includes a pitch stabilize station 706, roll station 708 and backbend and gram load measure station 710, all of which are interfaced to control system 712. Adjust module 704 includes gram load and height measure station 714, static attitude measure station 715, pitch adjust station 716, laser adjust station 717, static attitude measurement station 718 and gram load and height measure station 719, all of which are interfaced to control system 726.

A walking beam (not shown in FIG. 39) such as that described above with respect to suspension adjust equipment 100 advances carrier strips 34 of formed suspensions 14 (also not shown) through the roll module 702, and sequentially positions each suspension 14 at stations 706, 708 and 710. After being positioned at each station 706, 708 and 710 the baseplate 21 of suspension 14 is functionally clamped at its mounting region 18 and processed before being unclamped and advanced to the subsequent station. The overall operation of the roll module 702, as well as that of its stations 706, 708 and 710, is coordinated and controlled by control system 712.

At the pitch stabilization station 706 the flexure 20 of the suspension 14 is heated to relieve any residual stresses. In one embodiment (the individual components of which are not shown), this stress relieving heating operation is performed by subjecting the flexure 20 to infrared light generated by a laser diode and directed to the flexure by one or more optical fibers. Control system 712 can be set up in a manner similar to that of station 106 of adjusting equipment 100 described above to apply sufficient stress relieving heat, but not brown, the flexure 20. The rigid region 26 of the suspension 14 can also be heated to relieve residual stresses in a manner similar to that of the flexure 20.

At roll station 708 the spring region 24 of the suspension 14 is rolled around a curved mandrel to form the spring region. Rolling station 708 can be structurally and functionally similar to the rolling station 102 of adjust equipment 100 described above.

At backbend and gram load measurement station 710 the suspension 14 is backbent a predetermined set amount to reduce and thereby help stabilize the gram load of the suspension. The backbending mechanism (not separately shown) at station 710 can be structurally and functionally similar to the mechanism used to perform the backbend operation at backbend station 202 of adjust equipment 200 described above. Station 710 also includes a gram load measurement instrument (not separately shown in FIG. 40) for measuring the post-roll gram load of the suspensions 14. The post-roll gram load measurements made at station 710 are used during the roll station 708 setup procedure. The gram load measurement instrument at station 708 can be structurally and functionally similar to that at station 714 and described in greater detail below.

Adjust module 704 also includes a walking beam (not shown) for advancing the carrier strips 34 of suspensions 14 (also not shown) through the module and for sequentially positioning each suspension at stations 714–719. After being positioned at each station 714–719 the suspension 14 is functionally clamped at its mounting region 18 and processed before being unclamped and advanced to the subsequent station. The overall operation of the adjust module 704, as well as that of its stations 714–719 is coordinated and controlled by control system 726.

At the gram load and height measure station 714 the suspension 14 is elevated to fly height. The pre-adjust height (i.e., a profile geometry parameter) and pre-adjust gram load of the suspension 14 are then measured through the use of a load cell and Z-height measurement instrument (not shown in FIG. 39), respectively.

At the static attitude measure station 715 the suspension is again elevated to fly height. The pre-adjust static attitude of the flexure 20 (both roll and pitch) are then measured through the use of a static attitude measurement instrument (not shown in FIG. 39).

At the pitch adjust station 716 the rigid region 26 of the suspension 14 is rigidly clamped. The flexure 20 is then plastically bent upwardly or downwardly by a pitch adjust mechanism (not shown in FIG. 39) to adjust the pitch of the flexure. The pitch adjust mechanism can be structurally and functionally similar to pitch adjust mechanism 242 of adjust equipment 200 described above.

At the laser adjust station 717 a load beam positioning assembly (not shown in FIG. 39) orients and positions the rigid region 26 of the suspension 14 at an adjust position to stress the spring region 24. The spring region 24 is then stress relieved by the application of infrared light generated by a laser and directed to the spring region through optical fibers. The gram load, height and roll of the suspension 14 are thereby adjusted. The load beam positioning assembly can be structurally and functionally similar to load beam positioning assembly 542 of adjust equipment 200 described above. The laser and optical fibers can be similar to the fibers 546 and laser 622 of adjust equipment 200. The algorithm used by control system 726 to control the pitch adjust procedure performed at station 716 and the gram load, height and roll adjust procedure at station 717, and to update the adjust data, can be similar to the algorithm implemented by processor 502 of adjust equipment 200 described above.

At the static attitude measure station 718 the suspension 14 is again elevated to fly height. The post-adjust static attitude of the flexure 20 (both roll and pitch) are then measured through the use of a static attitude measurement instrument (not shown in FIG. 39). Static attitude measurement station 718 can be structurally and functionally similar to station 715.

At the gram load and height measure station 719 the suspension 14 is elevated to fly height. The post-adjust height and post-adjust gram load of the suspension 14 are then measured through the use of a load cell and Z-height measurement instrument (not shown in FIG. 39), respectively. Gram load and height measure station 724 can be functionally and structurally similar to station 714.

Although not shown in FIG. 39, adjust module 704 also includes a reject suspension detab station to which the suspensions 14 are advanced by the walking beam after being measured at station 719. The reject suspension detab station is interfaced to and controlled by control system 726. Out-of-specification suspensions 14 (i.e., suspensions with measured post-adjust static attitude, height or gram load outside a predetermined range of the desired static attitude, height and gram load) are cut from the carrier strip 34 at this station. Detab stations of this type are known and disclosed, for example in the Smith et al. U.S. Pat. No. 4,603,567. The carrier strips 34 with the in-specification suspensions 14 are then manually removed from the walking beam at the gram load and height measure station 719 and transported to a final detab station. All the remaining suspensions 14 are cut from the carrier strips 34 at the final detab station, and subsequently packaged for shipment to customers.

Gram load and height measure station 714 can be described in greater detail with reference to FIG. 40. As shown, station 714 includes a suspension clamp/actuator assembly 728, gram load measurement assembly 730 and z-height measurement instrument 732. Gram load measurement assembly 730 is mounted to a support frame 736 on base 734 and includes stepper motor 738, slide mount 740, support arm 742 and load cell 744. Slide mount 740 is mounted with respect to the support frame 736 for reciprocal motion along a vertical axis and is driven through its range of motion by stepper motor 738. Support arm 742 is mounted to and extends from the slide mount 740. Load cell 744 is mounted to and extends downwardly from the end of the support arm 742, and is positioned directly above the flexure 20 of suspensions 14 clamped at clamp/actuator assembly 728. In response to control signals from control system 726 (FIG. 39), stepper motor 738 drives the load cell 744 between a retracted or transfer position and a fly height measurement position. In the transfer position the load cell 744 is raised sufficiently high that it does not interfere with suspensions 14 being advanced into and out of the suspension clamp/actuator assembly 728. When lowered to the measurement position the load cell 744 engages the flexure 20 and elevates the suspension 14 to fly height to enable fly height gram load measurements by the load cell. Adjustment mechanism 746 can be used to adjust the measurement position of the load cell 744.

Z-height measurement instrument 732 is mounted to base 734 at a position below the rigid region 26 of suspensions 14 clamped at clamp/actuator assembly 728. Instrument 732 is positioned and configured to measure the height parameter of suspensions 14 after the suspensions have been elevated to fly height by the gram load measurement assembly 730. Optical point range sensors such as instrument 232 described above with reference to adjust equipment 200 can be used for this purpose. In one embodiment, instrument 732 is an LC 2430 point range sensor available from Keyence of Osaka, Japan.

Suspension clamp/actuator assembly 728 can be described with reference to FIGS. 40–43. As shown, the assembly 728 is mounted above the walking beam feed shaft 729 and includes base assembly 750, locating pin block assembly 752, functional clamping block assembly 754, load beam actuator block assembly 756 and cam assembly 758. Base assembly 750 include a rigidly mounted base 760 with a baseplate clamping region which includes a baseplate clamp pad 762. A registration bore 766 extends into the clamp pad 762 and is sized to receive the mounting boss 23 of a suspension 14 clamped to the clamp pad. A lifting rod 764 is mounted within the bore 766 for reciprocal motion, and is biased upwardly by spring 768. Guide rods 770 are rigidly mounted to base assembly 750 and extend upwardly and downwardly from the base 760.

Cam assembly 758 includes a splined shaft 776 mounted for rotation within base assembly 750. A locating cam 778, clamping cam 780 and actuator cam 782 are spline mounted to and rotated by shaft 776.

Locating pin block assembly 752 is positioned below the base assembly 750 and includes a guide block 772 mounted for reciprocal vertical motion on guide rods 770 by linear bearings 774. The upper surface of guide block 772 includes a recess 784 in which a cam follower 786 is rotatably mounted to the guide block. The cam follower 786 is positioned for engagement by the locating cam 778 of cam assembly 758. Tension springs (not shown) on the opposite sides of the guide block 772 are connected between the guide block 772 and base assembly 750 to force the locating pin block assembly 752 upwardly and its cam follower 786 into engagement with the locating cam 778.

A locating pin assembly 788 including support arm 790 and pins 792 (only one is visible in FIGS. 40, 41 and 43) is mounted to the front of guide block 772. Pins 792 extend upwardly through apertures in base 760 which are aligned with the apertures 35 in the suspension carrier strip 34 when the baseplate 21 of the suspension is positioned over the clamp pad 762. The support arm 790 and pins 792 are driven through a carrier strip locating stroke between extended and retracted positions in response to the rotation of shaft 776. Locating cam 778 and cam follower 786 cooperate to control the position of pins 792 within their locating stroke.

Functional clamping block assembly 754 is positioned immediately above the base assembly 750 and includes a guide block 794 mounted for reciprocal vertical motion on guide rods 770 by linear bearings 796. The lower surface of the guide block 794 includes a recess 798 in which a cam follower 800 is rotatably mounted to the guide block. The cam follower 800 is positioned for engagement by the clamping cam 780 of cam assembly 758. Tension springs 802 on the opposite sides of the guide block 794 are connected between the guide block 794 and base assembly 750 to force the clamping block assembly 754 downwardly and its cam follower 800 into engagement with the clamping cam 780.

A baseplate clamping assembly 804 including support arm 806 and clamp pad assembly 808 is mounted to the front of guide block 794. Clamp pad assembly 808 is mounted within a chamber 810 in the support arm 806 at a position directly above the clamp pad 762 on base 760. As perhaps best shown in FIG. 43, the clamp pad assembly 808 includes a spring 812, jewel ring 814 and clamp pad 816. Clamp pad assembly 808 is structurally and functionally similar to the clamp pad assembly 370 of adjust equipment 200 described above. The clamp pad assembly 808 is driven through a clamping stroke between a transfer position and a baseplate clamping position in response to the rotation of shaft 776. Clamping cam 780 and cam follower 800 cooperate to control the position of the clamp pad assembly 808 within its clamping stroke.

Load beam actuator block assembly 756 is positioned immediately above the functional clamping block assembly 754 and includes a guide block 820 mounted for reciprocal vertical motion on guide rods 770 by linear bearings 822. The lower surface of the guide block 820 includes a recess 824 in which a cam follower 826 is rotatably mounted to the guide block. The cam follower 826 is positioned for engagement by the actuator cam 782 of cam assembly 758. Tension springs 828 on the opposite sides of the guide block 820 are connected between the guide block 820 and base assembly 750 to force the actuator block assembly 756 downwardly and its cam follower 826 into engagement with the actuator cam 782.

A load beam actuating member or assembly such as elevator assembly 830 is mounted to the front of guide block 820. Elevator assembly 830 includes a support arm 832 which extends from the guide block 820 and positions elevator pin 834 over the rigid region 26 of suspensions 14 clamped between the clamp pad 762 and the clamp pad assembly 808. The elevator assembly 830 is driven through an elevator stroke between a retracted position and an elevated position in response to the rotation of shaft 776. Actuator cam 782 and cam follower 826 cooperate to control the position of the elevator assembly 830 within its elevator stroke.

Figure 40:
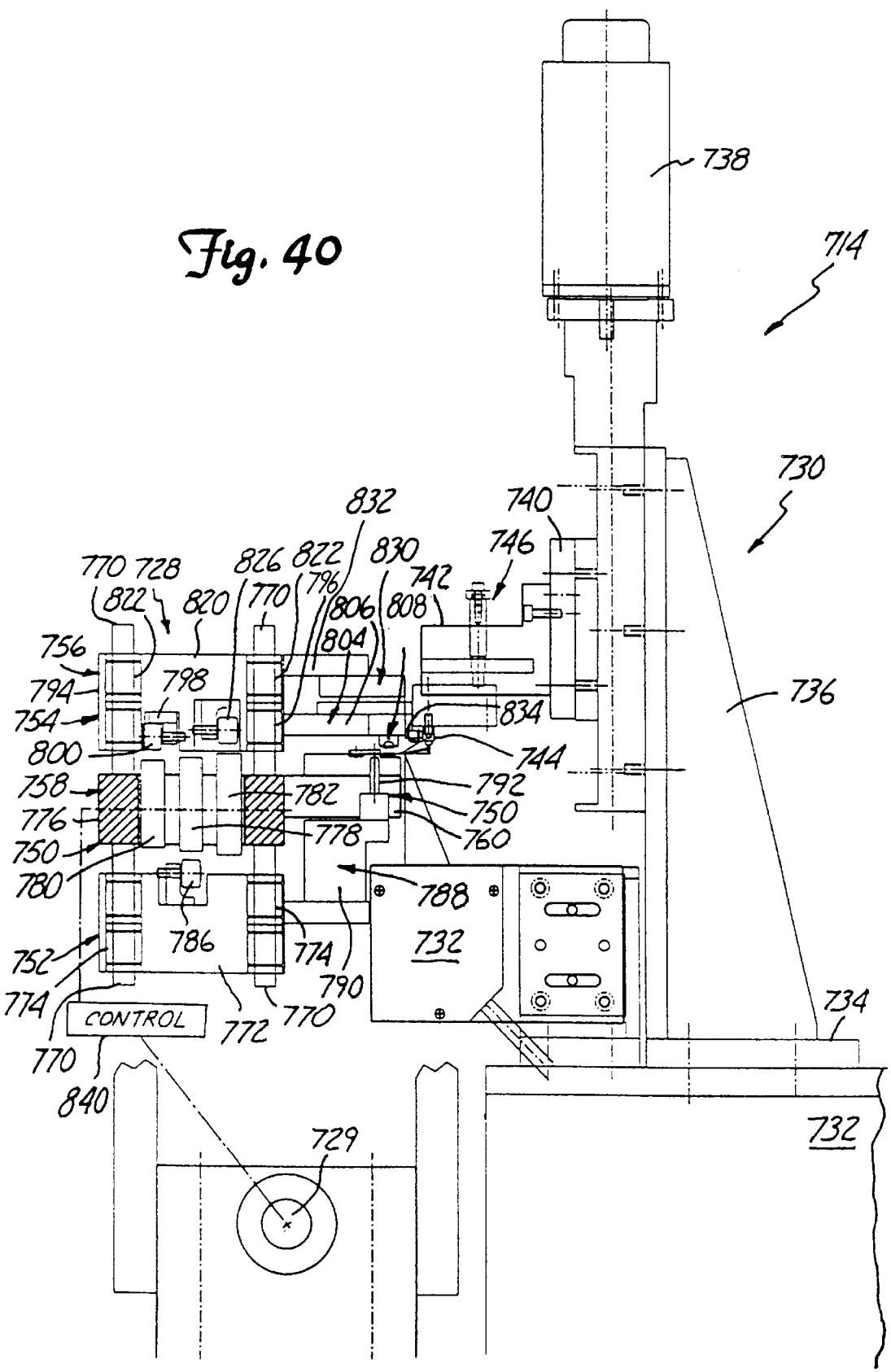
FIG. 40 is a side view of the gram load and height measure station shown in FIG. 39, with portions thereof shown in section.
Figure 41:
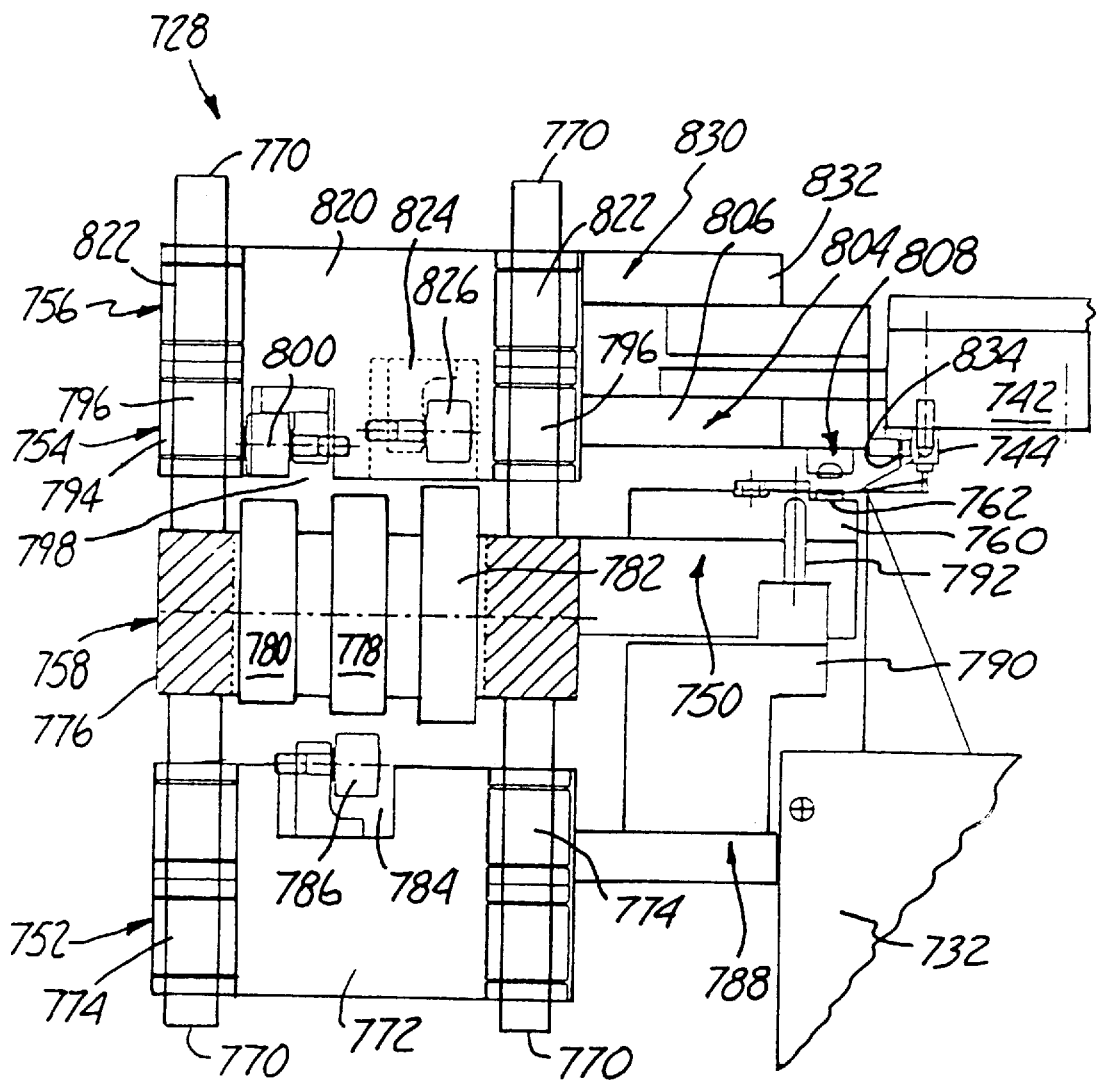
FIG. 41 is a detailed view of the suspension clamp/actuator assembly shown in FIG. 40, with portions thereof shown in section.
Figure 42:
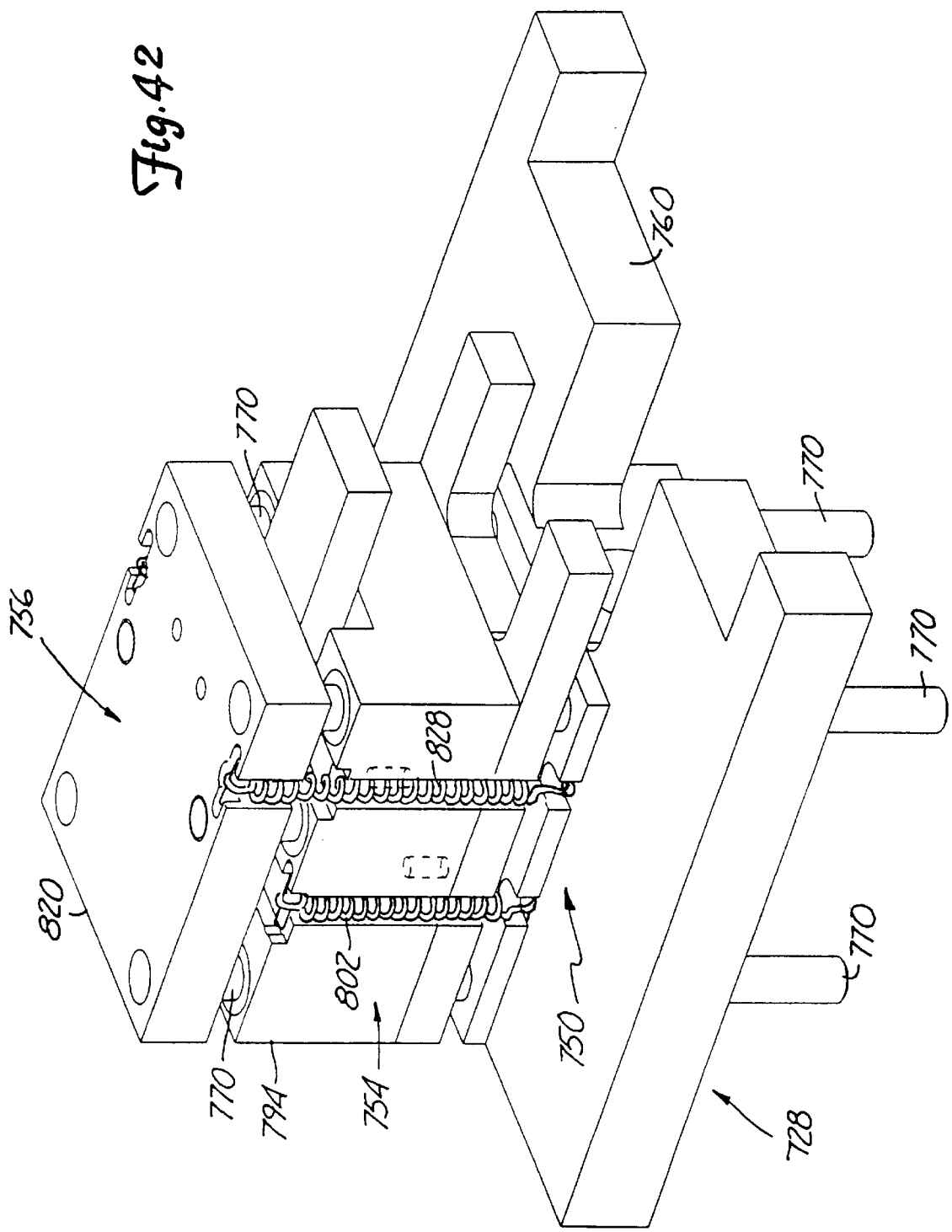
FIG. 42 is an isometric view of the suspension clamp/actuator assembly shown in FIG. 40.
Figure 43:
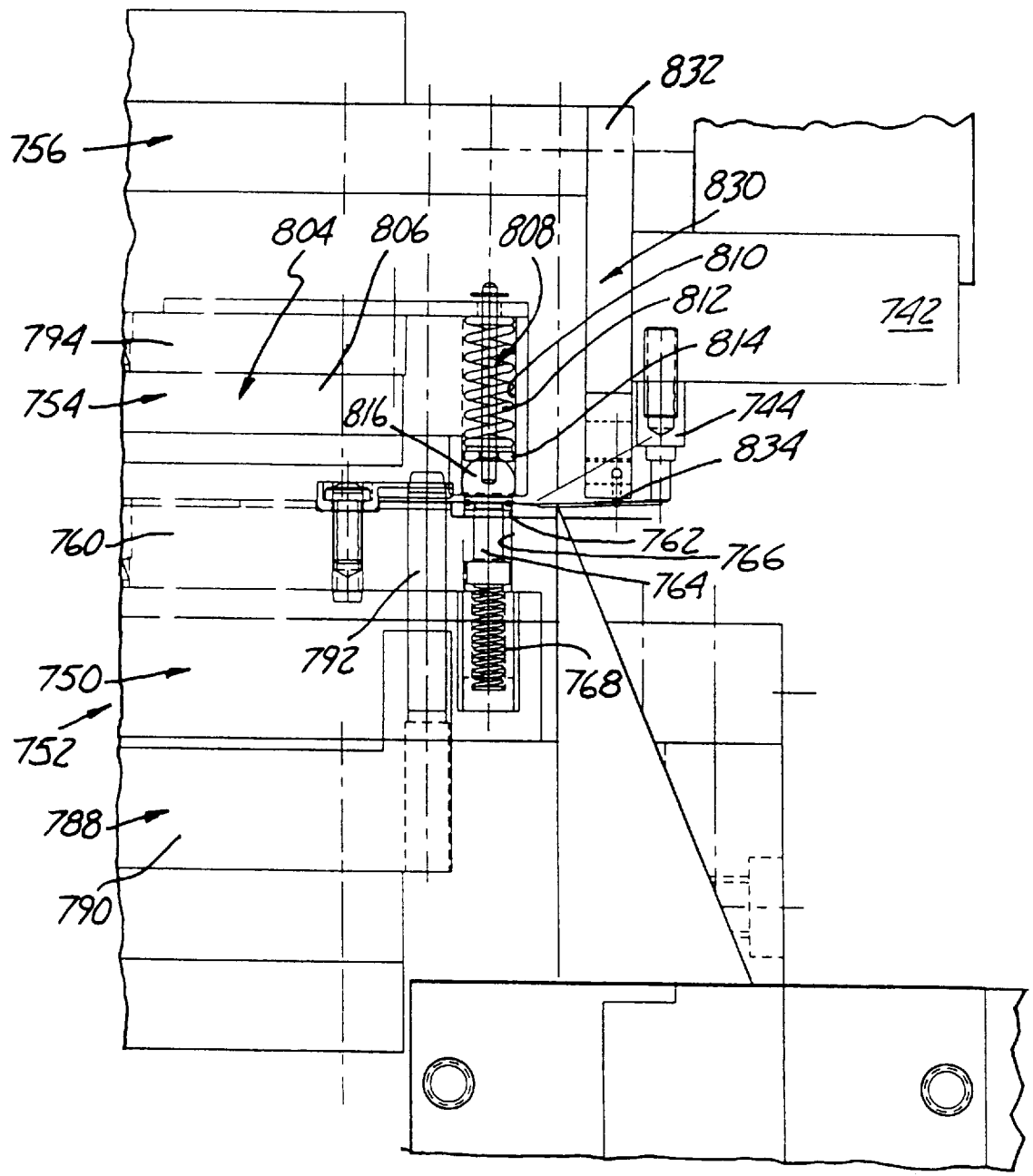
FIG. 43 is a detailed sectional view of the clamp/actuator assembly shown in FIG. 40, illustrating the baseplate clamp.
Figure 44:
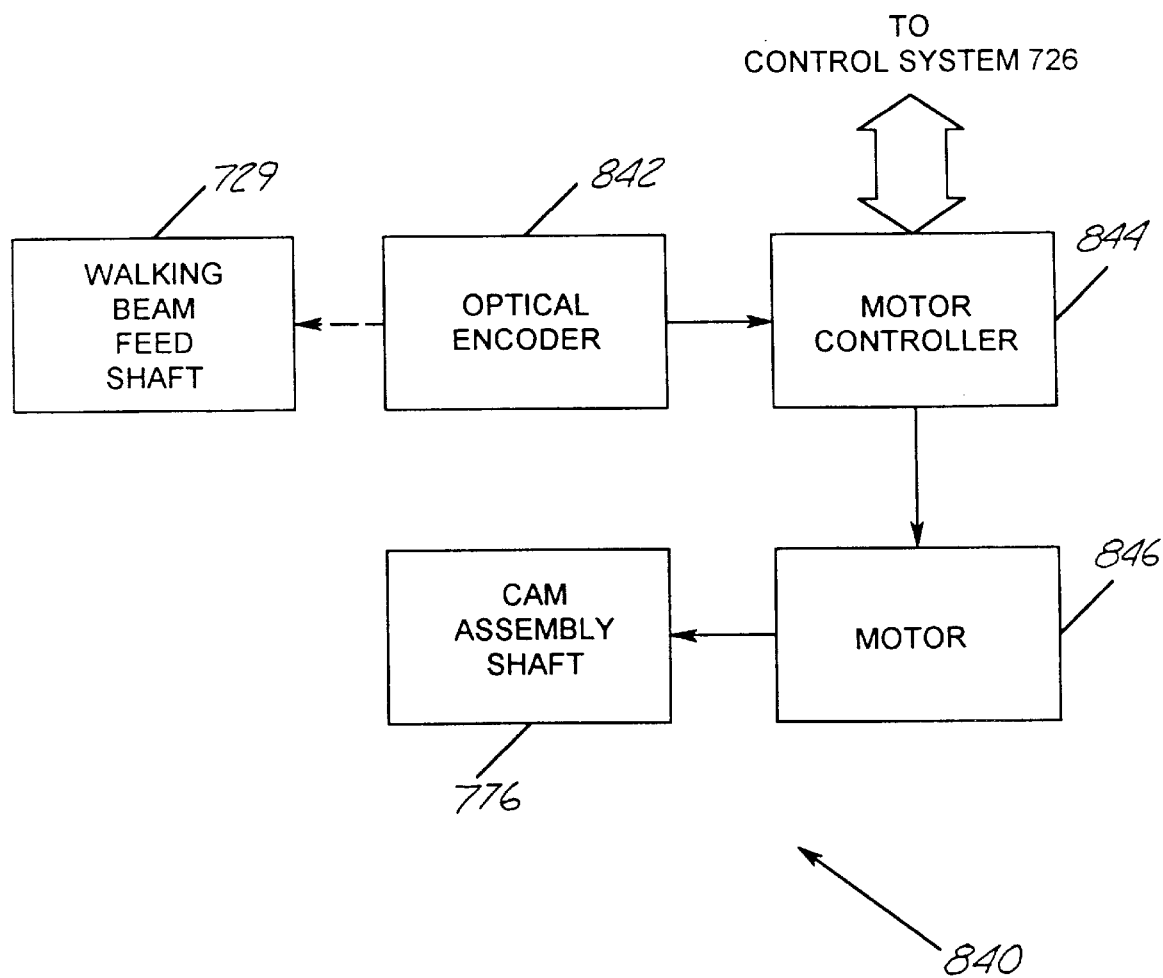
FIG. 44 is a block diagram of the control system of the gram load and height measure station shown in FIG. 40.

As shown diagrammatically in FIG. 40, suspension clamp/actuator assembly 728 includes a control system 840 which interfaces the walking beam feed shaft 729 to the cam assembly 758. The control system 840 is shown in greater detail in FIG. 44 to include optical encoder 842, motor controller 844 and motor 846. The optical encoder 842 is optically coupled to walking beam feed shaft 729 in a conventional manner and generates electrical position signals representative of the position of the feed shaft. Motor controller 844 is a conventional programmable motor controller which is configured to receive the position signals from encoder 842. As shown, motor controller 844 is also interfaced to the control system 726 of the adjust module 704. The control system 726 provides control commands to motor controller 844 and receives information from the motor controller. The control system 726 can thereby synchronize the operation of the functions it controls (i.e, the operation of gram load measurement assembly 730 and Z-height measurement instrument 732 at station 714) to the operation of suspension clamp/actuator assembly 728.

Motor controller 844 is programmed to generate motor drive signals as a function of the position signals received from encoder 842 and control commands received from control system 726. The motor drive signals generated by the controller 844 are applied to motor 846 in a conventional manner (e.g., through a motor driver, not shown). The rotation of cam shaft 776, and therefore the carrier strip guiding operations performed by locating pin block assembly 752, the baseplate clamping operation performed by functional clamping block assembly 754, and the load beam elevating operation performed by load beam actuator block assembly 756 are thereby synchronized to the rotation of feed shaft 729. The relative motion and timing of the carrier strip guiding operations performed by locating block assembly 752, the baseplate clamping operation performed by functional clamping block assembly 754 and the load beam elevating operation performed by load beam actuator block assembly 756 are synchronized by the locating cam 778, clamping cam 780 and actuator cam 782. Since the speed at which suspensions 14 are advanced through the stations 714–719 of the adjust module 704 is directly related to the speed at which the walking beam feed shaft 729 is rotated, the control system 840 of station 714 and the control system 726 of the adjust module 704, and the operations controlled by these control systems, are effectively synchronized to the speed at which suspensions 14 are being advanced through the adjust module.

Gram load and height measure station 714 operates in the following manner. As the walking beam is advancing a suspension 14 into the suspension clamp/actuator assembly 728, control system 840 causes the shaft 776 to be rotated to a position at which cams 778, 780 and 782 drive the locating pin block assembly 752, clamping block assembly 754 and the load beam actuator block assembly 756, respectively, to their extended positions. After the mounting region 18 of the suspension 14 is positioned over the clamp pad 762, and with continued rotation of shaft 776 the locating cam 778 causes the pins 792 are driven through a carrier strip locating stroke toward its extended position. Simultaneously, the clamping cam 780 causes the clamp pad assembly 808 to be driven through its clamping stroke toward the clamping position. The motion of the locating pins 792 leads the motion of the clamp pad assembly 808 so the pins extend through the apertures 35 of the carrier strip 34, and thereby locate the carrier strip with the baseplate 21 of the suspension 14 aligned with the clamp pad 762, before the clamp pad assembly 808 engages the mounting region 18 of the suspension. After the suspension 14 has been located and the clamp pad assembly 808 engaged with the mounting region 18, the locating cam 778 and clamping cam 780 cause the pins 792 and clamp pad assembly to be driven to and held at their extended positions. The mounting region 18 and baseplate 21 of the suspension 14 are thereby rigidly clamped to base 760 between the clamp pad 762 and clamp pad assembly 808.

Actuator cam 782 causes the elevator assembly 830 to be driven through its elevator stroke toward the elevated position while the clamp pad assembly 808 is being driven toward its clamping position, but the motion of the elevator assembly lags the motion of the clamp pad assembly. After the suspension 14 is clamped, the elevator pin 834 will engage the load beam 16 and elevate the load beam to a position slightly beyond fly height when the elevator pin has been driven to its elevated position. As the elevator pin 834 is being driven to its elevated position the motor controller 844 provides instructions to control system 726 of the adjust module 704. In response to the instructions the control system 726 generates control signals which cause the stepper motor 738 to drive the load cell 744 its fly height measurement position. Once the load cell 744 is at the fly height measurement position the actuator cam 782 causes the elevator pin 834 to be driven a short distance toward its retracted position to gently position the flexure 20 of the suspension 14 onto the load cell. A measurement of the fly height gram load of the suspension 14 is then taken. Control system 726 also causes the Z-height measurement instrument 732 to initiate a measurement of the Z-height of the suspension 14 while the suspension is elevated to fly height by the load cell 744. With further rotation of the shaft 776 following the fly height gram load and Z-height measurements, the above-described actions of the locating block assembly 752, clamping block assembly 754 and load beam actuator block assembly 756 are effectively repeated in reverse order to return the locating pins 792, clamp pad assembly 808 and load cell 744 to their retracted positions. The measured suspension 14 can then be advanced to the static attitude measure station 715, and another suspension advanced into the gram load and height measure station 714.

Suspension clamp/actuator assemblies and associated control systems similar to those described immediately above (i.e., similar to assembly 728 and system 840) can be included in the other stations of roll module 702 and adjust module 704. One embodiment of adjust system 700, for example, includes suspension clamp/actuator assemblies and control systems similar to 728 and 840, respectively, at stations 710 and 714–719. Given the modular characteristics of the suspension clamp/actuator assembly 728 and control system 840, they can be efficiently adapted for use in the other stations of adjust system 700. For example, the suspension clamp/actuator assembly 728 can be adapted for use in other stations by mounting different cams such as 778, 780 and 782 on shaft 776 to accommodate varying timing requirements. The control system 840 can also be programmed to accommodate the requirements of the other stations.

The load beam actuator block assembly 756 of the suspension clamp/actuator assembly 728 can also be adapted for use on the other stations of adjust equipment 700. For example, in place of the elevator assembly 830, the embodiment of the suspension clamp/actuator assembly of the pitch adjust station 716 includes a load beam actuator block assembly having a load beam clamp pad functionally similar to the clamp pad 474 of station 206 of adjust equipment 200. The base assembly of the suspension clamp/actuator assembly of the pitch adjust station 716 includes an adjustment clamping region, plunger and spring assembly functionally similar to the clamping region 260, plunger 332 and spring assembly 338 of the station 206 of adjust equipment 200. The load beam actuator block and base of the suspension clamp/actuator assembly of station 716 are thereby configured to rigidly clamp the rigid region 26 of suspensions 14 during the pitch adjust procedures performed by the station.

In place of the elevator assembly 830, the embodiment of the suspension clamp/actuator assembly of the laser adjust station 717 includes a load beam actuator block assembly having a clamp pad assembly structurally and functionally similar to the clamp pad assembly 602 of the laser adjust station 208 of adjust equipment 200. The load beam actuator block of the suspension clamp/actuator assembly of station 714 is thereby configured to cooperate with the load beam positioning assembly of station 720. In this embodiment of laser adjust station 717, the optical fibers are fixedly mounted to the base at a location directly below the spring region 24 of suspensions 14 clamped at the station.

Figure 45:
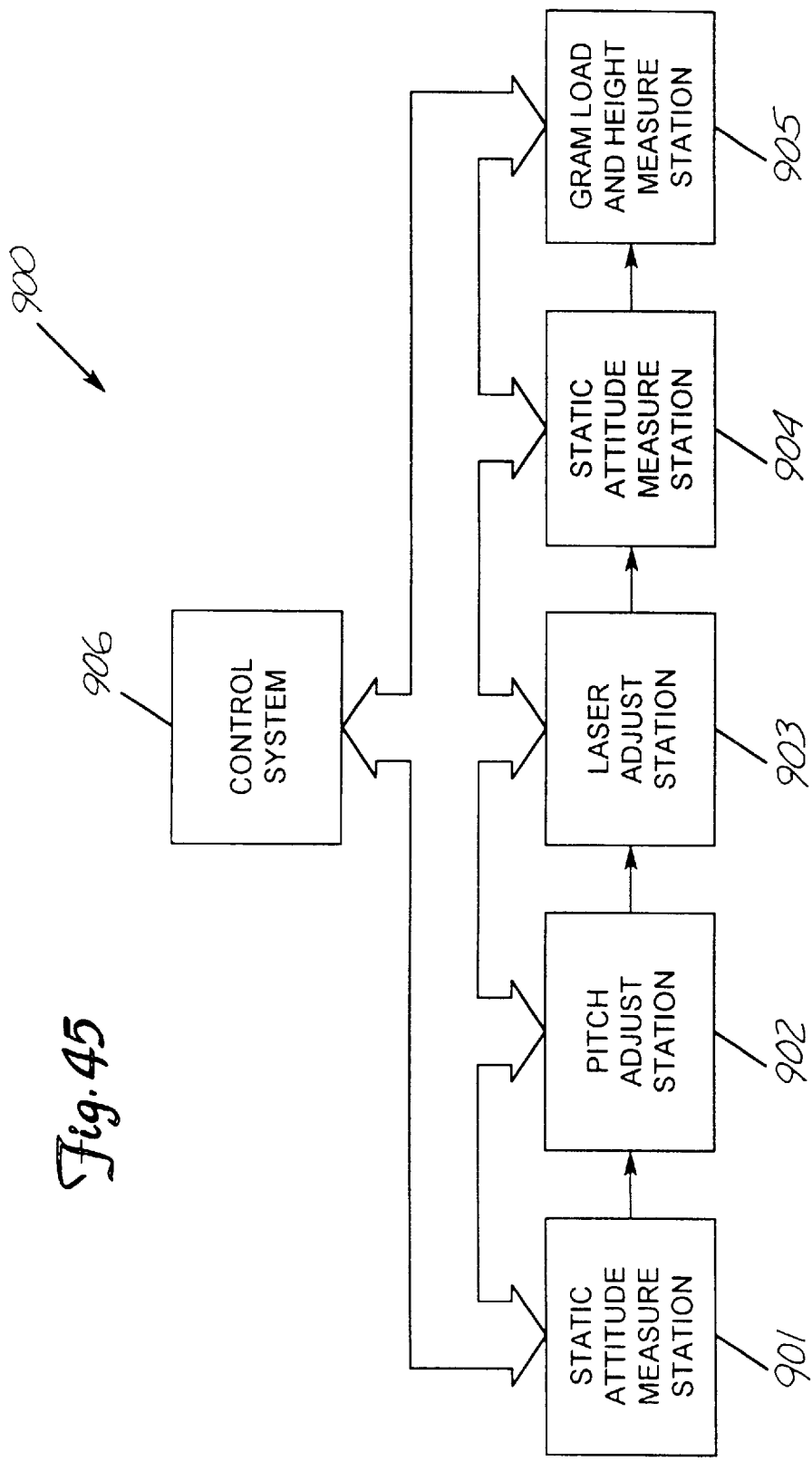
FIG. 45 is a block diagram of suspension adjust equipment in accordance with a fourth embodiment of the present invention.

Suspension adjust equipment 900, another embodiment of the present invention, is illustrated generally in FIG. 45. As shown, equipment 900 includes static attitude measure station 901, pitch adjust station 902, laser adjust station 903, static attitude measure station 904 and gram load and height measure station 905, all of which are interfaced to control station 906. A walking beam (not shown in FIG. 45) such as that described above with respect to suspension adjust equipment 100 advances carrier strips 34 of formed suspensions 14 (also not shown) through equipment 900, and sequentially positions each suspension 14 at stations 901–905. After being positioned at each station 901–905 the suspension 14 is functionally clamped at its mounting region 18 and processed before being unclamped and advanced to the subsequent station. The overall operation of stations 901–905 is coordinated and controlled by control system 906.

At the static attitude measurement station 901 the pre-adjust static attitude of the flexure 20 (both pitch and roll) is measured through the use of a static attitude measurement instrument (not shown in FIG. 45). Static attitude measure station 901 can be structurally and functionally similar to station 715 of the suspension adjust equipment 700 described above (but the suspension is not elevated to fly height for the measurement).

At the pitch adjust station 902 the rigid region 26 of the suspension 14 is rigidly clamped. The flexure 20 is then plastically bent upwardly or downwardly by a pitch adjust mechanism (not shown in FIG. 45) to adjust the pitch of the flexure. Pitch adjust station can be structurally and functionally similar to station 716 of the suspension adjust equipment 700 described above.

At the laser adjust station 903 a load beam positioning assembly (not shown in FIG. 45) orients and positions the rigid region 26 of the suspension 14 at an adjust position to stress the spring region 24. The spring region 24 is then stress relieved by the application of infrared light generated by a laser and directed to the spring region through optical fibers. Since the suspension was not rolled (i.e., was not processed at a roll station such as 708 of adjust equipment 700), a gram load and height are imparted to the suspension 14 at laser adjust station 903. In effect, the laser adjust station 903 induces a radius into the spring region 24. The roll of the suspension 14 is also adjusted at station 903. With the exception of changes in the algorithm used to perform the laser adjust procedure and described below, laser adjust station 903 can be structurally and functionally similar to station 717 of the suspension adjust equipment 700 described above.

At the static attitude measure station 904 the suspension 14 is elevated to fly height. The post-adjust static attitude of the flexure 20 (both roll and pitch) is then measured through the use of a static attitude measurement instrument (not shown in FIG. 45). Static attitude measure station 904 can be structurally and functionally similar to station 901.

At the gram load and height measure station 905 the suspension 14 is again elevated to fly height. The post-adjust gram load and post-adjust height (i.e., a profile geometry characteristic) of the suspension 14 are then measured through the use of a load cell and Z-height measurement instrument, respectively (not shown in FIG. 45). Gram load and height measurement station 905 can be structurally and functionally similar to station 719 of adjust equipment 700.

The control system 906 of adjust system 900 can be similar in structure and operation to the control system 500 of adjust equipment 200. Accordingly, the algorithm executed by control system 906 is similar to the algorithm executed by control system 500. The main difference between the algorithm executed by control system 900 is that unlike control system 500, the algorithm does not make use of a pre-adjust gram load or a pre-adjust height since stations 902 and 903 process unrolled suspensions 14. The measured pre-adjust gram load and pre-adjust height used by the algorithm (i.e., through Equations 2 and 3 in FIG. 38) are therefore effectively zero.

The suspension adjust equipment of the present invention offers important advantages. In particular, suspension characteristics such as gram load, static attitude and profile geometry can be efficiently established and/or adjust to a high degree of accuracy and repeatability. The characteristics of suspensions processed by the invention also exhibit a high degree of stability.

Although the present invention has been described with reference to preferred embodiments, those skilled in the art will recognize that changes can be made if form and detail without departing from the spirit and scope of the invention. In particular, systems 100, 200, 700 and 900 can be used to adjust individual suspensions and head gimbal assemblies.

What is claimed is:

1. A method for adjusting a parameter of suspensions of the type having a load beam with a spring region, a mounting region on a proximal end of the load beam and a head-receiving region on a distal end of the load beam, including:
   providing parameter adjust data representative of suspension parameter value changes as a function of load beam adjust positions;
   receiving information representative of measured pre-adjust parameter values of the suspensions;
   determining load beam adjust positions as a function of the parameter adjust data and the pre-adjust parameter values;
   positioning load beams at the adjust positions with respect to the mounting region; and
   applying heat to at least the spring regions of the load beams to adjust the parameter of the suspensions to a desired parameter value.

2. The method of claim 1 wherein the method is configured to adjust the gram load of the suspensions to a desired gram load value, and wherein:
   receiving information includes receiving pre-adjust gram load measurement data representative of the measured pre-adjust gram load values of the suspensions at a predetermined offset height;
   providing parameter adjust data includes providing load adjust data representative of offset height gram load value changes as a function of load beam adjust positions; and
   determining load beam adjust positions includes determining desired gram load value changes as a function of the measured pre-adjust gram load values and the desired gram load value, and accessing the parameter adjust data as a function of the desired gram load value changes to determine the suspension adjust positions; and
   applying heat includes applying heat to stress relieve at least the spring regions of the load beams while the load beams are positioned at the adjust positions.

3. The method of claim 2 wherein the method further includes:
   receiving post-adjust gram load measurement data representative of the measured post-adjust gram load values of the suspensions at a predetermined offset height; and
   updating the gram load adjust data as a function of the difference between the measured post-adjust gram load values and the desired gram load value.

4. The method of claim 2 wherein providing the gram load adjust data includes providing the gram load adjust data as a linear equation describing gram load value changes as a function of the load beam adjust positions.

5. The method of claim 2 and further including releasing the load beams from the adjust positions after applying heat to the load beams.

6. Adjusting a parameter of rolled suspensions in accordance with the method of claim 1.

7. The method of claim 1 for adjusting the gram load of the suspensions to a desired gram load value, and wherein:
   receiving information includes receiving pre-adjust gram load measurement data representative of measured pre-adjust gram load values of the suspensions at a predetermined offset height;
   providing parameter adjust data includes providing gram load adjust data representative of offset height gram load value changes as a function of load beam adjust positions;
   determining load beam adjust positions includes accessing the parameter adjust data to determine the suspension adjust positions which will cause the suspensions to have the desired gram load after the load beams are stress relieved; and
   applying heat includes applying heat to stress relieve at least the spring regions of the load beams while the load beams are positioned at the adjust positions.

8. The method of claim 7 and further including releasing the load beams from the adjust positions after applying heat to the load beams.

9. The method of claim 7 wherein the method further includes:
   receiving post-adjust gram load measurement data representative of the measured post-adjust gram load values of the suspensions at a predetermined offset height; and
   updating the gram load adjust data as a function of the difference between the measured post-adjust parameter values and the desired parameter value.

10. The method of claim 1 for adjusting the static attitude roll of the suspensions, and wherein providing parameter adjust data includes providing roll adjust data representative of suspension adjust positions which will cause the suspension to have a desired post-adjust static attitude roll value after the load beam is stress relieved.

11. The method of claim 1 for adjusting the radius geometry of the suspensions, and wherein providing parameter adjust data includes providing radius geometry adjust data representative of suspension adjust positions which will cause the suspension to have a desired post-adjust radius geometry value after the load beam is stress relieved.

12. A method for adjusting a parameter of suspensions of the type having a load beam with a spring region, a mounting region on a proximal end of the load beam and a head-receiving region on a distal end of the load beam, including:

providing memory for storing parameter adjust data representative of suspension parameter adjust positions which will cause the suspension to have a desired post-adjust parameter value after the load beam is stress relieved;

accessing the parameter adjust data to determine the suspension adjust position which will cause the suspension to have the desired parameter value after the load beam is stress relieved;

positioning the load beam at the adjust position; and applying heat to stress relieve at least the spring region of the load beam while the load beam is positioned at the adjust position.

13. The method claim 12 and further including releasing the load beam after the load beam is stress relieved.

14. The method of claim 12 wherein the method further includes:

receiving post-adjust parameter measurement data representative of the measured post-adjust parameter value of the suspension; and updating the parameter adjust data as a function of the difference between the measured post-adjust parameter value and the desired parameter value.

15. The method of claim 12 for adjusting the gram load of the suspension, and wherein providing parameter adjust data includes providing gram load adjust data representative of suspension adjust positions which will cause the suspension to have a desired post-adjust gram load value after the load beam is stress relieved.

16. The method of claim 12 for adjusting the roll of the suspension, and wherein providing parameter adjust data includes providing roll adjust data representative of suspension adjust positions which will cause the suspension to have a desired post-adjust roll value after the load beam is stress relieved.

17. The method of claim 12 for adjusting the radius geometry of the suspension, and wherein providing parameter adjust data includes providing radius geometry adjust data representative of suspension adjust positions which will cause the suspension to have a desired post-adjust radius geometry value after the load beam is stress relieved.

18. A method for adjusting the gram load of suspensions of the type having a load beam with a spring region, a mounting region on a proximal end of the load beam and a head-receiving flexure on a distal end of the load beam, the method including:

receiving information representative of measured pre-adjust fly height gram load values of the suspensions;

storing gram load adjust data representative of load beam adjust positions which will cause the suspensions to have a desired post-adjust fly height gram load value after the load beams are stress relieved;

accessing the gram load adjust data to determine the load beam adjust position which will cause the suspension to have the desired fly height gram load value after the load beam is stress relieved;

positioning the load beam at the adjust position;

actuating a heat source to stress relieve at least the spring region of the load beam while the load beam is positioned at the adjust position; and releasing the load beam after the load beam is stress relieved.

19. The method of claim 18 wherein:

storing gram load adjust data includes storing gram load adjust data representative of fly height gram load value changes as a function of load beam adjust positions; and accessing the gram load adjust data includes determining a desired gram load value change as a function of the measured pre-adjust gram load value and the desired gram load value, to determine the suspension adjust position.

20. The method of claim 18 wherein the method further includes:

receiving post-adjust gram load measurement data representative of the measured post-adjust fly height gram load value of the suspension; and updating the gram load adjust data as a function of the difference between the measured post-adjust gram load value and the desired gram load value.

21. The method of claim 18 wherein storing gram load adjust data includes storing the gram load adjust data as data representative of a linear equation.

22. Adjusting the gram load of rolled suspensions in accordance with the method of claim 18.

* * * * *